United States Patent
Jeong et al.

(10) Patent No.: US 9,674,749 B2
(45) Date of Patent: Jun. 6, 2017

(54) METHOD AND APPARATUS FOR SELECTING DEDICATED CORE NETWORK

(71) Applicant: Samsung Electronics Co., Ltd., Suwon-si, Gyeonggi-do (KR)

(72) Inventors: Sangsoo Jeong, Suwon-si (KR); Sung Hwan Won, Seoul (KR); Hyojin Lee, Suwon-si (KR); Seunghoon Choi, Suwon-si (KR); Jinyoung Oh, Seoul (KR); Hyoungju Ji, Seoul (KR); Younsun Kim, Seongnam-si (KR); Cheolkyu Shin, Suwon-si (KR); Donghan Kim, Osan-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 14/825,780

(22) Filed: Aug. 13, 2015

(65) Prior Publication Data
US 2016/0050601 A1  Feb. 18, 2016

Related U.S. Application Data

(60) Provisional application No. 62/037,312, filed on Aug. 14, 2014.

(30) Foreign Application Priority Data

Jul. 30, 2015  (KR) ........................ 10-2015-0108372

(51) Int. Cl.
*H04W 36/14* (2009.01)
*H04W 76/04* (2009.01)
(Continued)

(52) U.S. Cl.
CPC ........... *H04W 36/14* (2013.01); *H04W 28/08* (2013.01); *H04W 76/046* (2013.01);
(Continued)

(58) Field of Classification Search
CPC ......... H04W 36/0033; H04W 36/0066; H04W 36/14; H04W 36/32; H04W 36/0055;
(Continued)

(56) References Cited

U.S. PATENT DOCUMENTS 8,787,909 B2  7/2014  Kim et al.
2010/0120399 A1*  5/2010  Guo .................. H04L 29/12207
455/411

(Continued)

FOREIGN PATENT DOCUMENTS

KR  10-2011-0020166 A  3/2011

OTHER PUBLICATIONS

NTT Docomo et al., Discussion on Core Network Type Selection Based on the Subscription Information, TSG SA WG2 #100, S2-134310, Nov. 11-15, 2013, pp. 1-23, San Francisco, USA.

(Continued)

*Primary Examiner* — Khalid Shaheed
(74) *Attorney, Agent, or Firm* — Jefferson IP Law, LLP

(57) ABSTRACT

Various communication techniques and related systems for a fusion between a 5th generation (5G) communication system and Internet of Things (IoT) technology are provided. A user equipment (UE) is required to select a dedicated core network so as to receive a suitable service. In a method for transmitting and receiving a signal, an enhanced Node B (eNB) of a mobile communication system transmits a first request message to a first mobile management entity (MME), receives a reroute command message based on the first request message from the first MME, and transmits a second message to a second MME based on the reroute command message. Herein, the reroute command message contains the first request message, at least one MME identifier, and a UE identifier.

20 Claims, 34 Drawing Sheets

(51) Int. Cl.
*H04W 28/08* (2009.01)
*H04W 24/04* (2009.01)
*H04W 36/00* (2009.01)
*H04W 8/06* (2009.01)

(52) U.S. Cl.
CPC ............ *H04W 8/065* (2013.01); *H04W 24/04* (2013.01); *H04W 36/0022* (2013.01)

(58) Field of Classification Search
CPC .. H04W 36/0022; H04W 24/04; H04W 28/08
See application file for complete search history.

(56) References Cited

U.S. PATENT DOCUMENTS

| | | | | |
|---|---|---|---|---|
| 2010/0323700 | A1* | 12/2010 | Bachmann | H04W 36/0066 455/436 |
| 2011/0153844 | A1 | 6/2011 | Bovo et al. | |
| 2011/0176530 | A1* | 7/2011 | Vikberg | H04W 8/04 370/338 |
| 2011/0269499 | A1* | 11/2011 | Vikberg | H04W 28/08 455/524 |
| 2012/0063430 | A1* | 3/2012 | Suh | H04W 48/16 370/338 |
| 2012/0302230 | A1* | 11/2012 | Lim | H04W 76/021 455/422.1 |
| 2013/0070710 | A1* | 3/2013 | Guo | H04W 4/005 370/329 |

OTHER PUBLICATIONS

3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 8), 3GPP TS 23.401, V8.0.0, Dec. 13, 2007, pp. 37-45.

NTT Docomo et al., Discussion on Core Network Type Selection Based on the Subscription Information, TSG SA WG2 #100, S2-133909, Nov. 11-15, 2013, pp. 1-21, San Francisco, USA.

* cited by examiner

METHOD AND APPARATUS FOR SELECTING DEDICATED CORE NETWORK

CROSS-REFERENCE TO RELATED APPLICATION(S)

This application claims the benefit under 35 U.S.C. §119(e) of a U.S. provisional patent application filed on Aug. 14, 2014 in the U.S. Patent and Trademark Office and assigned Ser. No. 62/037,312, and under 35 U.S.C. §119(a) of a Korean patent application filed on Jul. 30, 2015 in the Korean Intellectual Property Office and assigned Serial number 10-2015-0108372, the entire disclosure of each of which is hereby incorporated by reference.

TECHNICAL FIELD

The present disclosure relates to a method and an apparatus for selecting user equipment (UE)-dedicated core network having a specific purpose.

BACKGROUND

In order to meet increasing demands for wireless data traffic after the commercialization of 4th generation (4G) communication systems, efforts to develop an improved 5th generation (5G) communication system or a pre-5G communication system have been made. For this reason, a 5G or pre-5G communication system is often referred to as a beyond 4G network communication system or a post-long term evolution (LTE) system. For accomplishing a higher data transfer rate, the 5G communication system considers implementation at a super high frequency (mmWave) band (e.g., 60 GHz band). To relieve a path loss of radio waves at the super high frequency band and to increase a radio propagation distance, the 5G communication system is discussing several technologies, such as beamforming, massive multiple input multiple output (MIMO), full dimensional MIMO, array antenna, analog beam-forming, and large-scale antenna. Additionally, to improve a network in the system, the 5G communication system is developing related technologies, such as an evolved small cell, an advanced small cell, a cloud radio access network (cloud RAN), an ultra-dense network, a device-to-device (D2D) communication, a wireless backhaul, a moving network, a cooperative communication, coordinated multi-points (CoMPs), and interference cancellation. Besides, in the 5G system, hybrid FSK and QAM modulation (FQAM) and sliding window superposition coding (SWSC) are developed as advanced coding modulation schemes, and also a filter bank multi carrier (FBMC), a non-orthogonal multiple access (NOMA), a sparse code multiple access (SCMA), and the like, are developed as advanced access technologies.

Meanwhile, the Internet is now evolving from a human-oriented network in which a person creates and consumes information, into Internet of Things (IoT) in which distributed elements, such as things exchange and process information. Further, IoT technology is being integrated with big data processing technology based on a cloud server, and the like, thus resulting in the advent of Internet of Everything (IoE) technology. For realizing IoT, some technologies related to detecting, wired/wireless communication and network infrastructure, a service interface, and security are required, and also technologies, such as a sensor network, a machine-to-machine (M2M) communication, and a machine type communication (MTC) are being researched. In IoT environments, an intelligent internet technology service for collecting and analyzing data created at connected things and thereby creating new values for a human life can be offered. Additionally, IoT may be applied to various fields, such as a smart home, a smart building, a smart city, a smart car or connected car, a smart grid, health care, smart home appliances, and an advanced medical service through a fusion and integration of typical information technology (IT) and various industries.

Therefore, a variety of attempts for applying the 5G communication system to the IoT network has been made. For example, technologies, such as a sensor network, a M2M communication, and a MTC are implemented based on some techniques, such as beamforming, MIMO, and array antenna which are associated with the 5G communication technology. In addition, one example of a fusion between 5G technology and IoT technology is to apply a cloud RAN to big data processing technology.

If a core network to which a new mobile management entity (MME) receiving a request message from user equipment (UE) belongs is not a suitable network for the UE, the UE is required to select again a dedicated core network so as to receive a suitable service.

Additionally, an effective channel status information (CSI) feedback method for CoMP transmission in which several transmission points cooperatively control a signal of specific UE and interference is not considered.

Therefore, a need exists for a method for creating and reporting feedback at a UE by effectively measuring interference in a multiple CSI feedback situation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for creating and reporting feedback at a user equipment (UE) by effectively measuring interference in a multiple channel status information (CSI) feedback situation.

Another aspect of the present disclosure is to provide a method and an apparatus for transmitting uplink control information at a UE without any resource conflict of a control channel when an enhanced Node B (eNB) reconfigures uplink control information transmission for specific secondary serving cells (SCells) from a control channel of a primary serving cell (PCell) to that of another SCell.

In accordance with an aspect of the present disclosure, a method for transmitting and receiving a signal at an eNB of a mobile communication system is provided. The method includes transmitting a first request message to a first mobile management entity (MME), receiving a reroute command message based on the first request message from the first MME, and transmitting a second message to a second MME based on the reroute command message, wherein the reroute command message contains the first request message, at least one MME identifier, and a UE identifier.

In accordance with another aspect of the present disclosure, a method for transmitting and receiving a signal at a first MME of a mobile communication system is provided. The method includes receiving a first request message from eNB, and transmitting a reroute command message based on the first request message to the eNB, wherein the eNB transmits, based on the reroute command message, a second message to a second MME, and wherein the reroute command message contains the first request message, at least one MME identifier, and a UE identifier.

In accordance with another aspect of the present disclosure, an eNB for transmitting and receiving a signal in a mobile communication system is provided. The eNB includes a transceiver unit configured to transmit and receive a signal, and a control unit configured to control the transceiver unit to transmit a first request message to a first MME, to receive a reroute command message based on the first request message from the first MME, and to transmit a second message to a second MME based on the reroute command message, wherein the reroute command message contains the first request message, at least one MME identifier, and a UE identifier.

In accordance with another aspect of the present disclosure, a first MME for transmitting and receiving a signal in a mobile communication system is provided. The first MME includes a transceiver unit configured to transmit and receive a signal, and a control unit configured to control the transceiver unit to receive a first request message from an eNB, and transmit a reroute command message based on the first request message to the eNB, wherein the eNB transmits, based on the reroute command message, a second message to a second MME, and wherein the reroute command message contains the first request message, at least one MME identifier, and a UE identifier.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
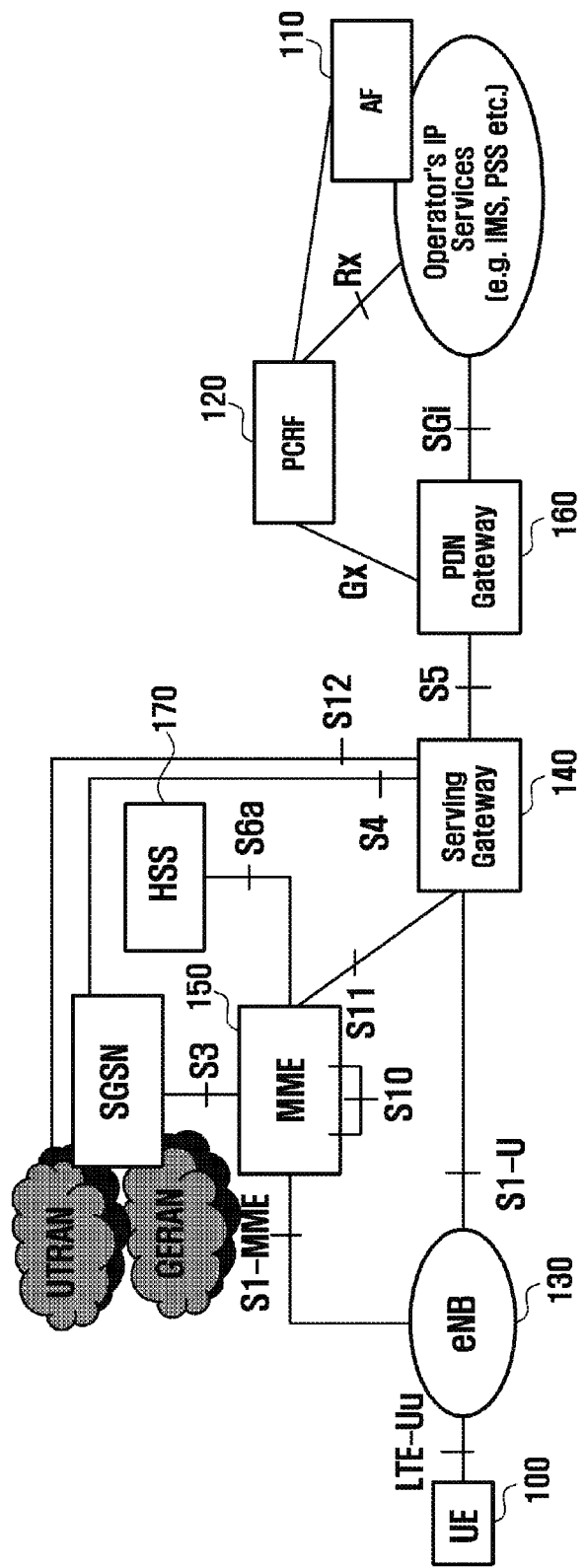
FIG. 1 is a diagram illustrating a structure of a long term evolution (LTE)-based mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create a procedure for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction for implementing the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Although various embodiments of the present disclosure will be described hereinafter by mainly targeting orthogonal frequency division multiplexing (OFDM)-based wireless communication systems, especially 3rd generation partnership project evolved universal mobile telecommunications system terrestrial radio access network (3GPP E-UTRAN) standards, the essential concept of this disclosure may be favorably applied to any other communication system having a similar technical background and channel form without departing from the scope of this disclosure as will be understood by those skilled in the art.

First Embodiment

FIG. 1 is a diagram illustrating a structure of a long term evolution (LTE)-based mobile communication system according to an embodiment of the present disclosure.

Referring to FIG. 1, a wireless access network of LTE mobile communication system is formed of an evolved Node B (also referred to as an eNB, a base station, E-UTRAN, a RAN node, and the like) 130, a mobility management entity (MME) 150, and a serving gateway (S-GW) 140.

A user equipment (also referred to as a UE, a terminal, a user device, a mobile station, and the like) 100 accesses an external network through the eNB 130, the S-GW 140, and a packet data network (PDN) gateway (P-GW) 160. In order to transmit or receive data through the P-GW, the UE 100 should create a PDN connection, which may include at least one evolved packet system (EPS) bearer.

An application function (AF) 110 is an apparatus that exchanges application-related information with a user at the level of application.

A policy charging and rules function (PCRF) 120 is an apparatus that controls a policy associated with quality of service (QoS). A policy and charging control (PCC) rule corresponding to the above policy is delivered and applied to the P-GW 160.

The eNB 130 is a RAN node and corresponds to radio network controller (RNC) of a UTRAN system and to base station controller (BSC) of a global system for mobile communications (GSM) enhance data rates for GSM evolution (EDGE) radio access network (GERAN) system. The eNB 130 is connected to the UE 100 in a radio channel and performs a role similar to that of the existing RNC/BSC.

Since all user traffic including a real-time service, such as a voice over internet protocol (VoIP) is offered through a shared channel in LTE, an apparatus for collecting status information of UEs 100 and performing scheduling is needed. The eNB 130 is in charge of this.

The S-GW 140 is an apparatus that offers a data bearer, and creates or removes the data bearer under the control of the MME 150.

The MME 150 is an apparatus that performs various control functions, and a single MME 150 may be connected with a plurality of eNBs. In this disclosure, a certain MME newly accessed by the UE 100 is referred to as a new MME 150. In addition, an MME accessed before attachment and a corresponding network entity are referred to as old MME/serving general packet radio service (GPRS) support node (SGSN) 152. In addition, an MME accessed by the UE 100 to access a dedicated core network is referred to as a dedicated MME 154.

The PCRF 120 is an entity that controls QoS of traffic and charging.

Meanwhile, as mentioned above, the LTE system supports interworking with any access network other than 3GPP as well as E-UTRAN. If any non-3GPP access network is interworked, the non-3GPP access network may be connected to the P-GW 160 directly or through an additional evolved packet data gateway (ePDG). For processing subscriber information or authentication with regard to the non-3GPP access network, a home subscriber server (HSS) 170 and an authentication, authorization and accounting (AAA) server may exchange information with each other and may also be realized as a signal entity. Although the term ePDG is exemplarily used for convenience, any other node, e.g., the S-GW, may be used alternatively.

Figure 2A:
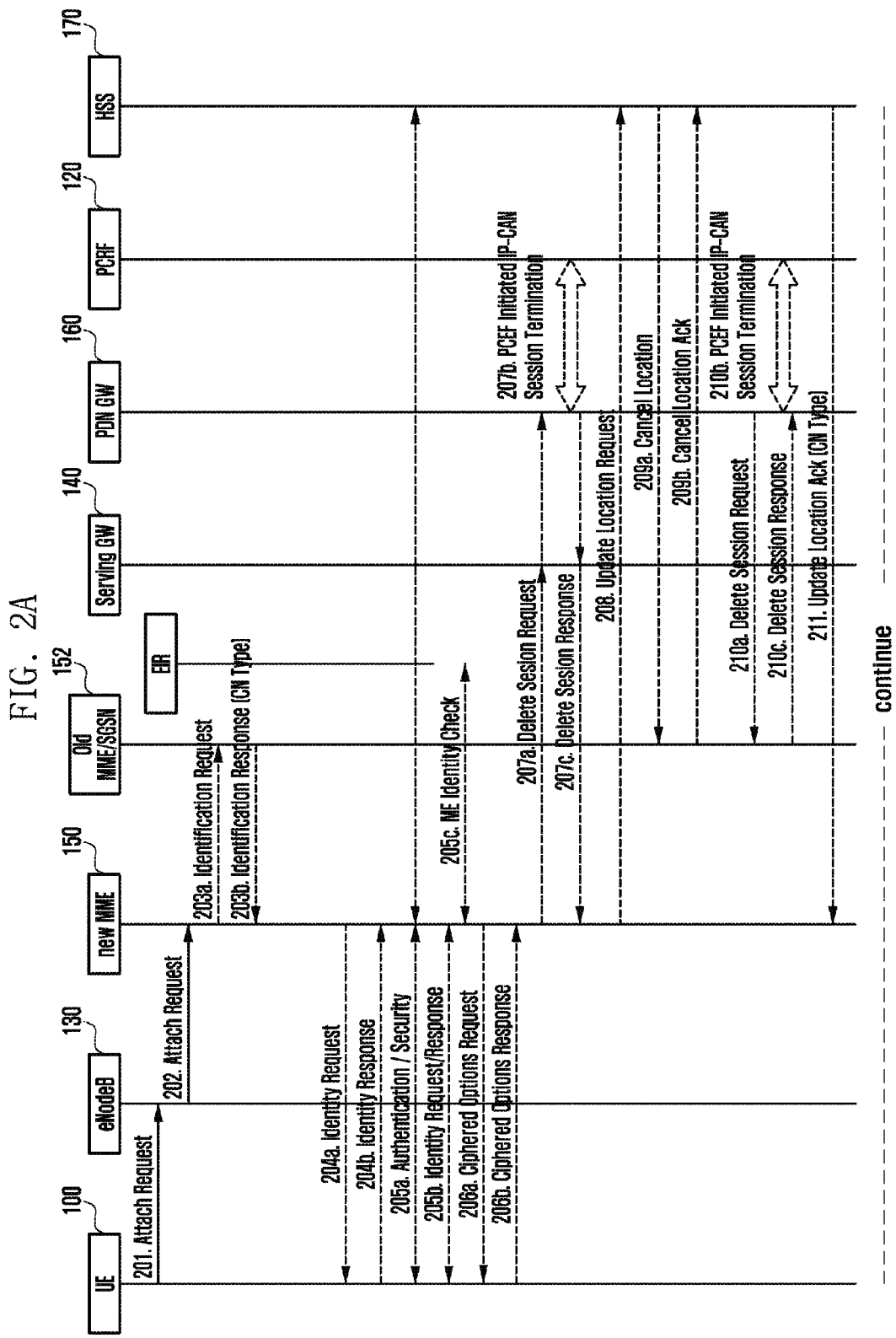
FIGS. 2A and 2B are flow diagrams illustrating a procedure in which a user equipment (UE) registers with a network according to an embodiment of the present disclosure.
Figure 2B:
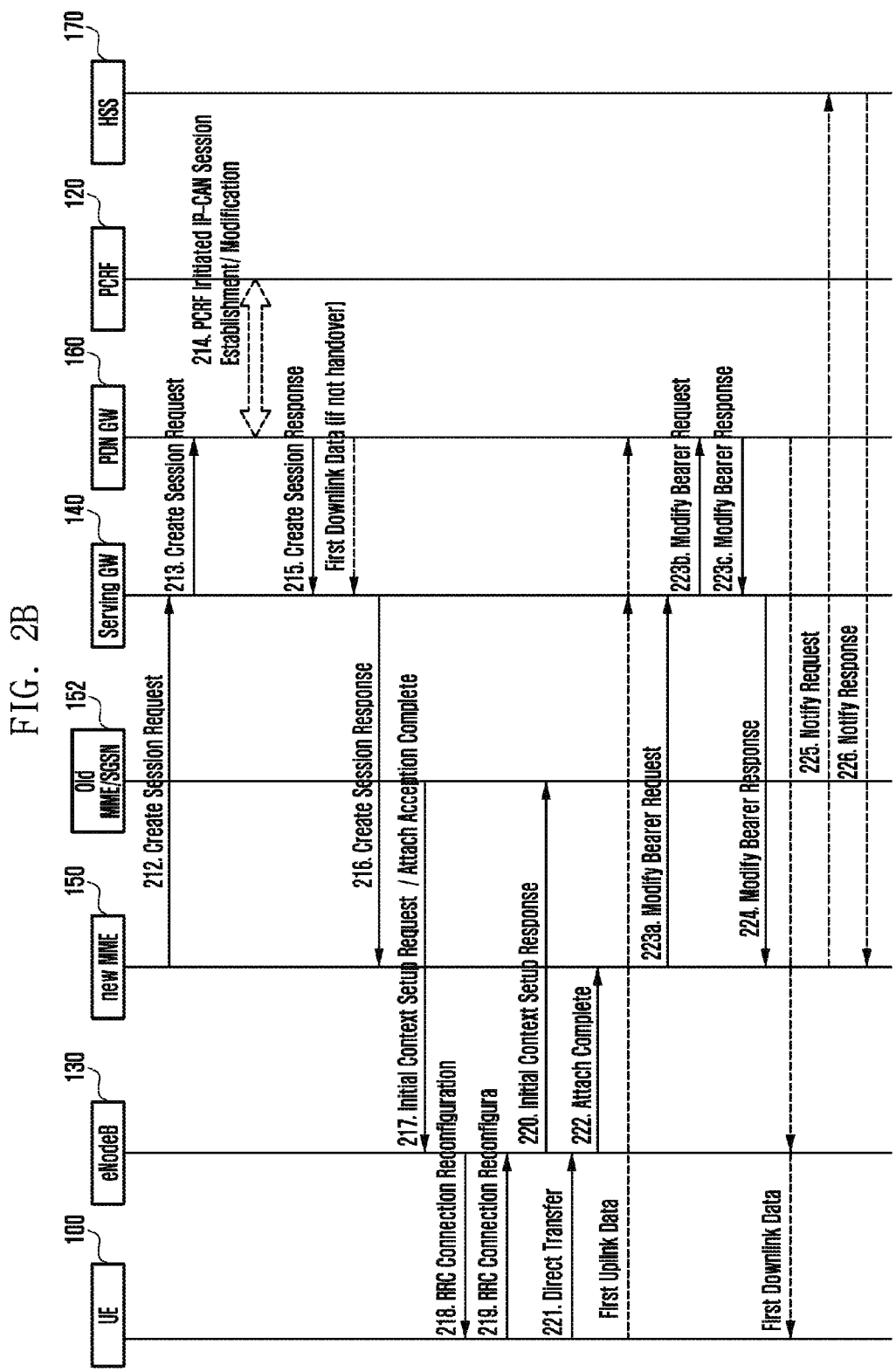

FIGS. 2A and 2B are flow diagrams illustrating a procedure in which a UE registers with a network according to an embodiment of the present disclosure. This registration procedure is also referred to as a network attachment. During this procedure, a default EPS bearer is created for always-on IP connectivity.

Referring to FIGS. 2A and 2B, at operation 201, the UE 100 transmits an attach request message to the eNB 130. At operation 202, the eNB 130 transmits the attach request message to a new MME 150. The new MME 150 transmits an identification request message to an old MME or SGSN 152 at operation 203a and receives an identification response message from the old MME/SGSN 152 at operation 203b. If the old MME/SGSN 152 and the new MME 150 are unaware of the UE 100, the new MME 150 transmits an identity request message to the UE 100 at operation 204a and receives an identity response message containing an international mobile subscriber identity (IMSI) from the UE 100 at operation 204b.

If context of the UE 100 does not exist in the network, the UE 100, the new MME 150 and the HSS 170 perform an authentication/security procedure at operation 205a. At operation 205b, the UE 100 transmits a ciphered identity request message to the new MME 150 and receives a ciphered identity response message from the new MME 150. This operation may be performed together with operation 205a. At operation 205c, an ME identity check operation is performed between the new MME 150 and an EIR. Thereafter, if the UE 100 sets a ciphered options transfer flag in the attach request message, the new MME 150 transmits a ciphered options request message to the UE 100 at operation 206a and receives a ciphered options response message from the UE 100 at operation 206b.

If there is activated bearer context for the UE 100 in the new MME 150, the new MME 150 transmits a delete session request message to the S-GW 140 at operation 207a. Thereafter, the S-GW 140, the P-GW 160, and the PCRF 120 terminate a session at operation 207b, and the S-GW 140 transmits a delete session response message to the new MME 150 at operation 207c.

If the MME is changed after the final detach, or if there is no valid subscriber context for the UE 100 in the MME, the new MME 150 transmits an update location request message to the HSS 170 at operation 208. Thereafter, the HSS 170 transmits a cancel location message to the old multimedia messaging service (MMS)/SGSN 152 at operation 209a and receives a cancel location acknowledgement (ACK) message from the old MMS/SGSN 152 at operation 209b. If there is activated bearer context for the UE 100 in the old MME/SGSN 152, the old MME/SGSN 152 transmits a delete session request message to the S-GW 140 at operation 210a. Thereafter, the S-GW 140, the P-GW 160, and the PCRF 120 terminate a session at operation 210b, and the S-GW 140 transmits a delete session response message to the old MME 150 at operation 210c. Thereafter, the HSS 170 transmits an update location ACK message to the new MME 150 at operation 211.

At operation 212, the new MME 150 transmits a create session request message to the S-GW 140. Thereafter, the S-GW 140 creates a session with the P-GW 160 and the PCRF 120 at operations 213, 214, and 215, and transmits a create session response message to the new MME 150 at operation 216. Thereafter, the new MME 150 transmits an initial context setup request message, by inserting an attach accept message therein, to the eNB 130 at operation 217.

The eNB 130 transmits a radio resource control (RRC) connection reconfiguration message to the UE 100 at operation 218. If the UE 100 transmits an RRC connection reconfiguration complete message to the eNB 130 at operation 219, the eNB 130 transmits an initial context setup response message to the new MME 150 at operation 220. Thereafter, the UE 100 transmits a direct transfer message containing an attach complete message to the eNB 130 at operation 221, and the eNB 130 delivers the attach complete message to the new MME 150 at operation 222.

The new MME 150 that receives the initial context response message and the attach complete message transmits a modify bearer request message to the S-GW 140 at operation 223a. The S-GW 140 and the P-GW 160 perform a bearer modification at operations 223b and 223c, and the S-GW 140 transmits a modify bearer response message to the new MME 150 at operation 224.

Thereafter, if a mobile equipment identity of the UE 100 is changed, the new MME 150 transmits a notify request message to the HSS 170 at operation 225 and receives a notify response message from the HSS 170 at operation 226.

When the UE 100 transmits the attach request message to the eNB 130 at operation 201, this attach request is contained in an RRC connection setup complete message that is transmitted from the UE 100 to the eNB 130. In addition, at operation 202, the eNB 130 transmits an initial UE message, which is an S1-MME control message containing the attach request message, to the new MME 150.

At this time, a core network to which the new MME 150 receiving the attach request message from the UE 100 belongs may be identical to a dedicated core network (DCN) of UE. This dedicated core network may be used for allowing an operator to offer a particular function or for separating a specific UE or subscriber. For example, the dedicated core network may be used for separating subscribers for machine-to-machine (M2M) communication or separating subscribers of a specific company.

Therefore, the UE 100 needs to access a suitable dedicated core network so as to receive a suitable service.

Figure 3A:
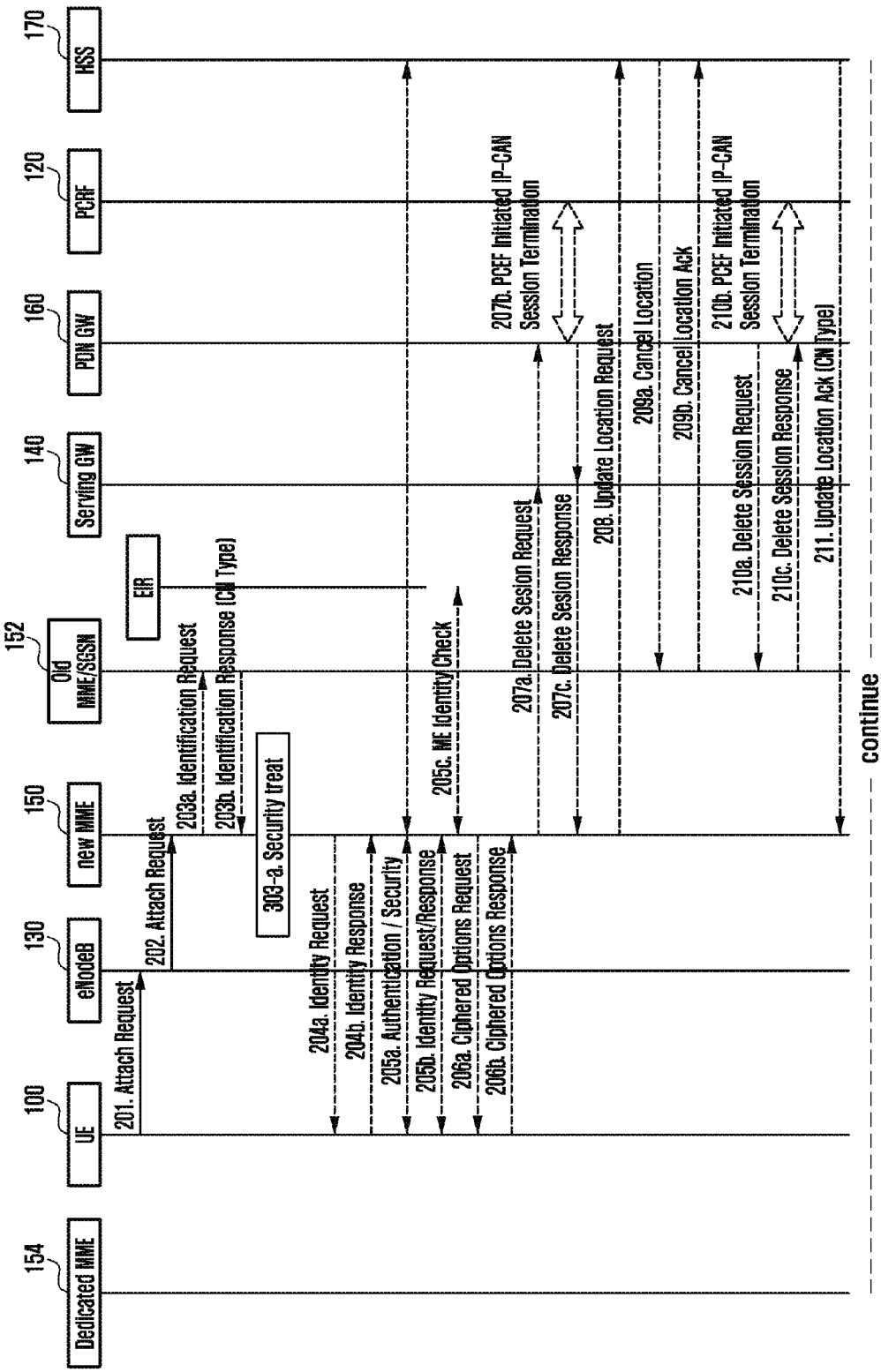
FIGS. 3A, 3B, and 3C are flow diagrams illustrating an attach procedure of a UE according to an embodiment of the present disclosure.
Figure 3B:
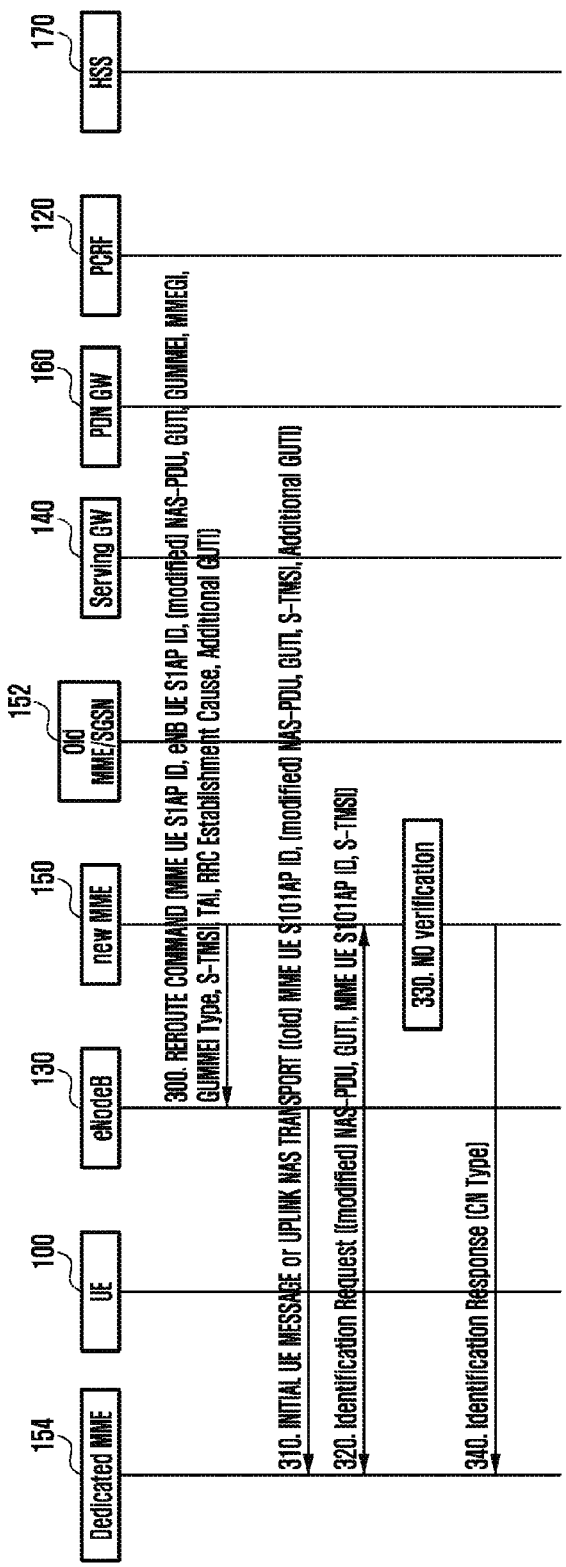
Figure 3C:
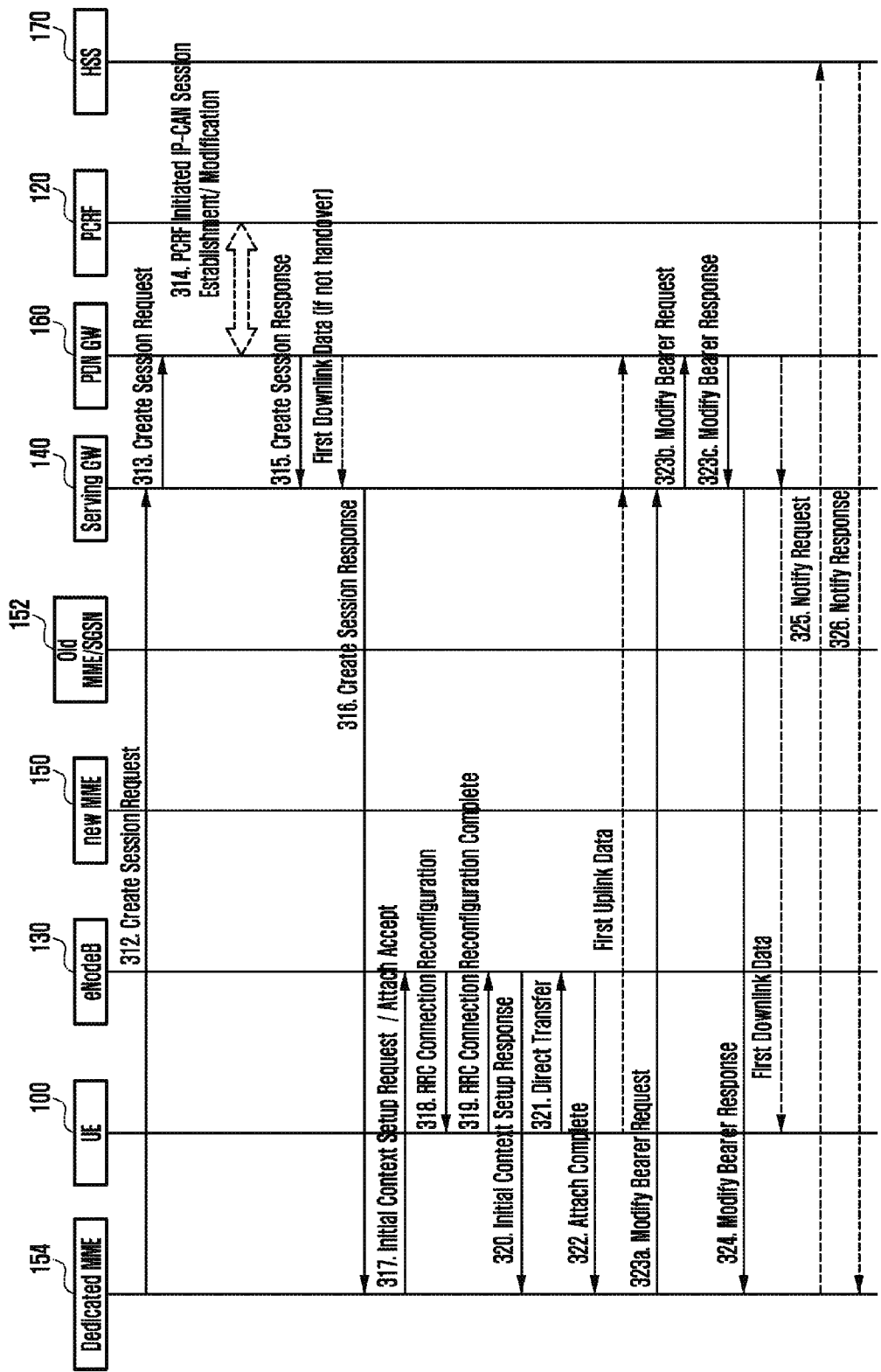

FIGS. 3A, 3B, and 3C are flow diagrams illustrating an attach procedure of a UE according to an embodiment of the present disclosure. Operations which are not described herein may follow, partially or totally, a normal EPS attach procedure.

Referring to FIGS. 3A, 3B, and 3C, the new MME/SGSN 150 may receive an attach request message from the UE 100 through the eNB 130 at operations 201 and 202. This attach request message may contain a globally unique temporary UE identity (GUTI)/P-temporary mobile subscriber identity (P-TMSI) and/or additional GUTI/P-TMSI. When a GUTI is created from a P-TMSI and a routing area identifier (RAI) (this GUTI may be referred to as a mapped GUTI), or when a P-TMSI is created from a GUTI (this P-TMSI may be referred to as a mapped P-TMSI), additional GUTI/P-TMSI may be contained. Before a dedicated core network is considered, it is possible to find whether there is context of the UE 100 identified using such additional GUTI/P-TMSI in the new MME/SGSI 150. The attach request message may be delivered to the eNB 130 in the form of being contained in any RRC message (e.g., an RRC connection setup complete message) and then delivered to the MME/SGSN 150 in the form of being contained in an RAN message.

The new MME 150 may transmit an identification request message to the old MME/SGSN 152 at operation 203a and receive an identification response message having mobility management (MM) context from the old MME/SGSN 152 at operation 203b. This message having MM context may contain a UE usage type. In various embodiments disclosed herein, the UE usage type may refer to information about UE. Specifically, the UE usage type may be used for steering the UE to a suitable dedicated core network. Namely, the UE usage type may be information that indicates a usage character of the UE. A mobile communication network operator may deploy a dedicated core network which is suitable for such a UE usage character. The UE usage type may be delivered in the form of being contained in the MM context or as an information element which is independent of the MM context.

At operation 303-a, the new MME/SGSN 150 may have already obtained information about the UE usage type of the UE 100, and thus can determine whether to support a dedicated core network depending on the UE usage type of the UE 100. As a result, it is determined that the new MME/SGSN 150 fails to support a dedicated core network of the UE, the new MME/SGSN 150 may reroute (also referred to as redirect) the attach request message such that the UE 100 can receive a service from a suitable dedicated MME/SGSN 154. Information about the UE usage type may be delivered through the identification response message transmitted from the old MME/SGSN 152 to the new MME 150 at operation 203b or delivered through an update location acknowledgement message transmitted from the HSS 170 to the new MME 150 at operation 211. At operation 211, the HSS 170 may deliver subscription data to the new MME 150. At this time, the UE usage type information may be contained in the subscription data or delivered separately from the subscription data. Namely, a redirection process of a non-access stratum (NAS) message to be described below may be performed after operation 203b or after operation 211.

When the new MME/SGSN 150 that becomes aware of the UE usage type applied to the UE 100 through operation 203b and/or operation 211 fails to support a dedicated core network of the UE 100, the new MME/SGSN 150 may deliver, at operation 300, a message for redirecting the NAS message to the dedicated MME/SGSN 154 in a dedicated core network suitable for the UE usage type of the UE 100 such that a suitable MME/SGSN can service the UE. In this case, a new RAN message named a reroute command or a reroute NAS message request may be defined. This RAN message may contain at least one of MME UE S1AP ID, eNB UE S1AP ID, (revised) NAS-protocol data unit (PDU), GUTI, globally unique MME identity (GUMMEI), MME group identifier (MMEGI) or Null network resource identifier (NRI)/SGSN group ID, GUMMEI type, SAE temporary mobile subscriber identity (S-TMSI), tracking area identity (TAI) and RRC establishment cause, and additional GUTI/P-TMSI.

MME UE S1AP ID is an identifier allocated by the new MME/SGSN 150 to identify the UE 100 on the S1 interface. In addition, eNB UE S1AP ID is an identifier allocated by the eNB 130 to identify the UE 100 on the 51 interface. Using eNB UE S1AP ID, the eNB 130 may determine which UE 100 needs redirection. This eNB UE S1AP ID added by the new MME/SGSN 150 may be identical to eNB UE S1AP ID contained in an S1 message received through at least one of operations 202, 204b, 205a, 205b, and 206b.

NAS-PDU contained in the reroute NAS message request 300 may be an attach request message. This attach request message may be identical to the attach request message received by the new MME/SGSN 150 at operation 202 or a slightly revised version thereof. For example, the EPS mobile identity field of the attach request message may be revised to GUTI allocated by the new MME/SGSN 150. In another example, NAS-PDU may not be revised and GUTI may be delivered as an independent information element. In this case, at operation 310, the eNB 130 may deliver GUTI, received at operation 300, as an independent information element.

GUMMEI, MMEGI or null-NRI/SGSN group ID, GUMMEI type, S-TMSI, and additional GUTI/P-TMSI are information that may be required for selecting the dedicated MME/SGSN 154 by the RAN node 130. The new MME/SGSN 150 may set at least one of GUMMEI, MMEGI or null-NRI/SGSN group ID, GUMMEI type, and S-TMSI as a value associated with the dedicated MME/SGSN 154 and then transmit the set value to the RAN node 130. Namely, MMEGI or null-NRI/SGSN group ID may be used to identify a dedicated core network in the PLMN. GUMMEI may directly indicate the dedicated MME 154. Regarding a public land mobile network (PLMN) identifier, MMEGI, and MME code (MMEC) that constitute GUMMEI, the new MME 150 may set a PLMN identifier as a serving PLMN of the UE 100 (namely, identical to a PLMN part of TAI at operation 102), set MMEGI as a value corresponding to a dedicated MME group, and set MMEC as a value corresponding to MMEC of the new MME. The eNB 130 may select a dedicated MME group by using PLMN and MMEGI, and also select specific MME by referring to MMEC. In another example, GUMMEI may be a GUMMEI part of additional GUTI contained in the attach request message. MMEGI may be information corresponding to a dedicated MME group. This may be MMEGI included in MMEI contained in GUMMEI of additional GUTI contained in the attach request message. TAI and RRC establishment cause may be information received by the new MME 150 together with the attach request message from the eNB 130. Additional GUTI/P-TMSI transmittable at operation 300 may be contained in the reroute NAS message request only when the attach request message received by the MME/SGSN 150 at operation 202 contains the additional GUTI/P-TMSI. Namely, if additional GUTI/P-TMSI is contained in the attach request message received at operation 202, the MME/SGSN 150 may insert the additional GUTI/P-TMSI into the reroute NAS message request to be transmitted at operation 300.

At operation 310, the eNB 130 that receives at least one kind of information mentioned above may insert the received TAI and/or RRC establishment cause into a message transmitted to the dedicated MME 154. The new MME 150 may also transmit additional GUTI contained in the attach request message. This additional GUTI may be delivered only when the new MME 150 fails to find UE context based on additional GUTI and when old GUTI denotes that GUTI is mapped with P-TMSI and RAI.

For selecting the dedicated MME/SGSN 154, the RAN node 130 may use at least one of GUMMEI, MMEGI or null-NRI/SGSN group ID, GUMMEI type, S-TMSI, and additional GUTI/P-TMSI which are received at operation 300. Specifically, it is possible to select MME/SGSN in a dedicated core network indicated by MMEGI or null-NRI/SGSN group ID. If additional GUTI/P-TMSI identifies MME/SGSN in a dedicated core network indicated by MMEGI or null-NRI/SGSN group ID, MME/SGSN identified by additional GUTI/P-TMSI may be selected. The RAN node 130 that selects the dedicated MME/SGSN 154 may transmit an initial UE message or uplink NAS transport message to the dedicated MME/SGSN 154 at operation 310. If it is not possible to find selectable MME/SGSN in a dedicated core network identified based on MMEGI or null-NRI/SGSN group ID, the RAN node 130 may select MME/SGSN in the default dedicated core network or select again the MME/SGSN 150. The message at operation 310 may include therein information contained in the existing initial UE message and also at least one of MME UE S1AP ID, NAS-PDU, GUTI, S-TMSI, and additional GUTI. Namely, the message being delivered at operation 310 may include the attach request message delivered to the MME/SGSN 150 at operation 202. The dedicated MME 154 that receives the above message may determine, using at least one of additional GUTI and S-TMSI, whether there is context of the UE 100 therein. If there is context of the UE 100, the existing UE context is reused without obtaining context from any other node (the new MME 150 and/or the HSS 170). For example, context of the UE 100 may be used for mobility management of the UE. At least one of NAS-PDU, GUTI, MME UE S1AP ID, and S-TMSI delivered at operation 300 may be also delivered at operation 320 through operation 310.

At operation 320, the new MME 150 may receive an MM context request message from the dedicated MME 154. At this time, the MM context request message may be an identification request message. The dedicated MME 154 may transmit the attach request message received from the new MME 150 through the eNB 130, and the new MME 150 may verify the attach request message. In order to prevent errors, an uplink NAS count in an MME may be adjusted at operation 303c. For example, even in case of verification, the uplink NAS count may be not increased. The operation related to operation 303c may be performed after operation 205a.

When the MME transmitting an identification request message at operation 320 is the dedicated MME 154, and/or when the reroute command message has been already transmitted to the UE 100 identified based on information contained in the identification request message, the new MME 150 may skip verification at operation 330 through NAS-PDU. Alternatively, an indicator for indicating a verification skip may be delivered at operation 320. When the NAS count manipulation is performed at operation 303c as discussed above, verification is performed. The new MME 150 may identify the UE 100 by using at least one of GUTI, MME UE S1AP ID, and S-TMSI contained in the identification request message for requesting MM context, and then deliver MM context corresponding to the UE by using an identification response message at operation 340.

Thereafter, operations 204 to 211 shown in FIG. 2A may be performed. The difference is that the dedicated MME 154 is involved instead of the new MME 150. Thereafter, operations 312 to 326 in which the dedicated MME 154 is involved may be performed as shown in FIG. 3C.

Figure 4:
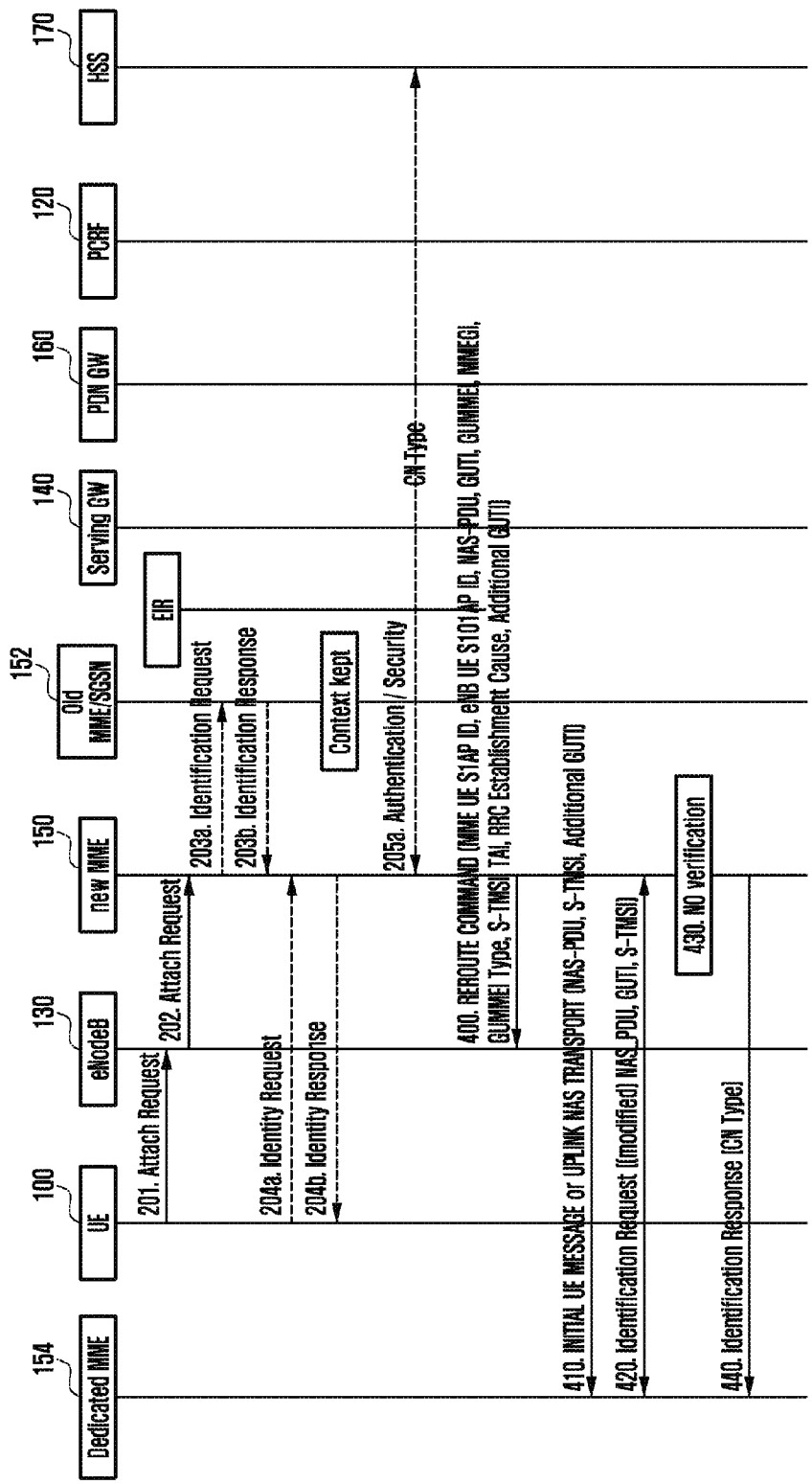
FIG. 4 is a flow diagram illustrating an attach procedure of a UE according to an embodiment of the present disclosure.

FIG. 4 is a flow diagram illustrating an attach procedure of a UE according to an embodiment of the present disclosure. Operations which are not described herein may follow, partially or totally, a normal EPS attach procedure.

Referring to FIG. 4, if the new MME 150 is an MME that fails to support a UE usage type, the old MME/SGSN 152 may not delete MM context after operations 204a and 204b even though MM context is delivered to the new MME 150. The reason is that the old MME/SGSN 152 may receive again a request for MM context from the dedicated MME 154. In order to induce operations 207a, 207b, 207c, and 208, when the new MME 150 that does not correspond to a core network type of the UE identified by GUTI received at operation 203 requests MM context based on an identification request message at operation 203a, the old MME 152 may not insert an authentication vector into MM context when transmitting MM context by using an identification response message at operation 203b. For example, the old MME 152 may not transmit an authentication vector by setting the number of quintuplets field and/or the number of quadruplets field to zero. Here, quintuplets refer to five kinds of information used for authentication, i.e., a random number RAND, an expected response XRES, a cipher key CK, an integrity 1K, and an authentication token AUTN.

At operation 205a, the new MME 150 may exchange the UE usage type with the HSS 170 and thereby recognize the necessity of rerouting the UE.

Alternatively, the old MME/SGSN 152 may recognize through the content of the identification response message that the new MME 150 fails to support the UE usage type of the UE 100, and thereby induce rerouting. For example, the old MME/SGSN 152 may add, to a cause value, a value indicating that the MME receiving the identification response message does not support a core network type of the UE, or add a new information element indicating a core network type of the UE.

When the new MME 150 that becomes aware of a core network type of the UE 100 through operation 205a or any other equivalent fails to support a UE usage type of the UE 100, the new MME 150 may transmit, at operation 400, the attach request message to other MME through redirection such that the MME suitable for the UE 100 can service. In this case, a new S1 message named a reroute command may be defined. This S1 message may contain at least one of MME UE S1AP ID, eNB UE S1AP ID, NAS-PDU, GUMMEI, MMEGI, GUMMEI type, S-TMSI, TAI and RRC establishment cause, and additional GUTI.

MME UE S1AP ID is an identifier allocated by the new MME 150 to identify the UE 100 on the S1 interface. In addition, eNB UE S1AP ID is an identifier allocated by the eNB 130 to identify the UE 100 on the S1 interface. Using eNB UE S1AP ID, the eNB 130 may determine which UE needs redirection. This eNB UE S1AP ID added by an MME may be identical to eNB UE S1AP ID contained in an S1 message received through at least one of operations 202 and 204b.

NAS-PDU may be an attach request message. This attach request message may be identical to the attach request message received by the new MME/SGSN 150 at operation 202. GUMMEI, MMEGI, GUMMEI type, S-TMSI, and additional GUTI are information that may be required for selecting the dedicated MME by the eNB 130. The new MME 150 may set at least one of GUMMEI, MMEGI, GUMMEI type, and S-TMSI as a value associated with the dedicated MME 154 and then transmit the set value to the eNB 130. GUMMEI may directly indicate the dedicated MME 154. PLMN of GUMMEI may be set as a serving PLMN of the UE 100 (namely, a PLMN part of TAI at operation 202), MMEGI may be set as a value corresponding to a dedicated MME group, and MMEC may be set as a value corresponding to MMEC of the new MME 150. The eNB 130 may select a dedicated MME group by using PLMN and MMEGI, and also select specific MME by referring to MMEC.

In another example, GUMMEI may be a GUMMEI part of additional GUTI of the attach request message. MMEGI, information corresponding to a dedicated MME group, may be an MMEGI part of MMEI contained in GUMMEI of additional GUTI of the attach request message. TAI and RRC establishment cause may be information received by the new MME 150 together with the attach request message from the eNB 130. At operation 410, the eNB 130 that receives at least one kind of information mentioned above may insert the received TAI and/or RRC establishment cause into a message transmitted to the dedicated MME 154.

The new MME 150 may also transmit additional GUTI contained in the attach request message. This additional GUTI may be delivered only when the new MME 150 fails to find UE context based on additional GUTI and when old GUTI denotes that GUTI is mapped with P-TMSI and RAI.

For selecting the dedicated MME 154, the eNB 130 may use at least one of GUMMEI, MMEGI, GUMMEI type, S-TMSI, and additional GUTI which are received at operation 400. After selecting the dedicated MME 154, the eNB 130 may transmit an initial UE message or uplink NAS transport message to the dedicated MME 154 at operation 410. The message at operation 410 may include therein information contained in the existing initial UE message and also at least one of NAS-PDU, S-TMSI, and additional GUTI. The dedicated MME 154 that receives the above message may determine, using at least one of additional GUTI and S-TMSI, whether there is context of the UE 100 therein. If there is context of the UE 100, the existing UE context is reused without obtaining context from any other node (the new MME 150 and/or the HSS 170). For example, context of the UE 100 may be used for mobility management of the UE. At least one of NAS-PDU and S-TMSI delivered at operation 400 may be also delivered at operations 420 through 410. GUTI delivered at operation 420, which is GUTI information extracted from NAS-PDU, may correspond to EPS mobile identity information element of NAS message.

At operation 430, the new MME 150 may skip verification through NAS-PDU. When the NAS count manipulation is performed at operation 303c, verification may be performed. The new MME 150 may identify the UE 100 by using at least one of GUTI, MME UE S1AP ID, and S-TMSI contained in the identification request message for requesting MM context, and then deliver MM context corresponding to the UE 100 at operation 440. At operation 430, the new MME 150 may skip verification when the MME transmitting an identification request message is the dedicated MME 154 and/or when the reroute command message has been already transmitted to the UE 100 identified. Alternatively, an indicator for indicating a verification skip may be delivered at operation 420.

Thereafter, operations 204 to 211 shown in FIG. 2A may be performed. The difference is that the dedicated MME 154 is involved instead of the new MME 150. Thereafter, operations 312 to 326 in which the dedicated MME 154 is involved may be performed as shown in FIG. 3C.

Various embodiments shown in FIGS. 3A, 3B, 3C, and 4 may be also applied to a tracking area update (TAU) procedure. By comparison with FIGS. 3A, 3B, 3C, and 4, one difference is that NAS-PDU corresponds to a TAU request message. Another difference is that instead of exchanging identification request/response messages in a signal flow where the new MME/SGSN 150 requests UE context from the old MME/SGSN 152, the new MME/SGSN 150 transmits a context request message and then the old MME/SGSN 152 transmits a context response message. Here, the context response message may carry UE context including UE usage type information. The new MME/SGSN 150 may understand the UE usage type information and then determine rerouting to MME/SGSN in a dedicated core network. Therefore, the new MME/SGSN 150 may set a cause value in a context acknowledge message to a suitable one and transmit the set cause value to the old MME/SGSN 152. At present, an explicitly defined cause value is "user authentication failed". Since a case discussed herein is not an authentication failed case, a suitable cause value may be, for example, "redirection required" or any other similar value. GPRS tunneling protocol (GTP) entity (e.g., the MME/SGSN 150) may use a cause value "redirection required" for indicating that the request fails (or is refused) in redirection of the UE 100 to a dedicated core network. Operations 300 and 310 in FIG. 3B may be performed, and then the dedicated MME/SGSN 154 may request again UE context from the old MME/SGSN 152. The old MME/SGSN 152 that receives a context acknowledge message containing already a suitable cause value may preserve context of the UE 100 without deletion. Therefore, the old MME/SGSN 152 may deliver UE context in response to a request of the dedicated MME/SGSN 154.

Figure 5A:
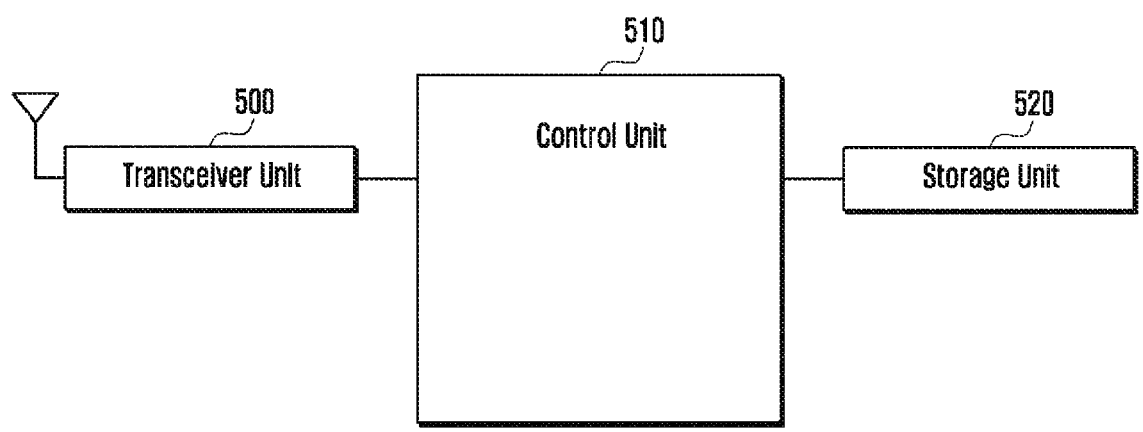
FIG. 5A is a block diagram illustrating an internal structure of a network entity according to an embodiment of the present disclosure.

FIG. 5A is a block diagram illustrating an internal structure of a network entity according to an embodiment of the present disclosure.

Referring to FIG. 5A, the network entity in this embodiment may be one of the eNB 130, the MMEs 150, 152 and 154, the S-GW 140, the P-GW 160, the PCRF 120, and the HSS 170. The network entity includes a transceiver unit 500, a control unit 510, and a storage unit 520.

When the network entity is the eNB 130, the transceiver unit 500 transmits and receives a signal, and the control unit 510 controls the transceiver unit 500 to transmit the first request message to the first mobile management entity (MME), to receive a reroute command message based on the first request message from the first MME, and to transmit the second message to the second MME based on the reroute command message. The reroute command message contains the first request message, at least one MME identifier, and a UE identifier. The at least one MME identifier and the UE identifier may be MMEGI and additional GUTI, respectively. Based on the MMEGI and the additional GUTI contained in the reroute command message, the control unit 510 may determine the second MME.

Additionally, the control unit 510 may control the transceiver unit 500 to further receive the first request message from a UE. The first request message transmitted from the UE to the eNB 130 may be contained in an RRC connection setup complete message, and the first request message transmitted from the eNB 130 to the first MME may be contained in an initial UE message. The first request message may be an attach request message or a tracking area update request message, and the second message may be an initial UE message.

When the network entity is the new MME 150, in the first MME of a mobile communication system, the transceiver unit 500 transmits and receives a signal, and the control unit 510 controls the transceiver unit 500 to receive the first request message from the eNB 130, and to transmit a reroute command message based on the first request message to the eNB 130. Based on the reroute command message, the eNB 130 transmits the second message to the second MME. The reroute command message contains the first request message, at least one MME identifier, and UE identifier. The at least one MME identifier and the UE identifier may be MMEGI and additional GUTI, respectively. Based on the MMEGI and the additional GUTI contained in the reroute command message, the eNB 130 may determine the second MME.

Additionally, the eNB 130 may receive the first request message from the UE. The first request message transmitted from the UE to the eNB 130 may be contained in an RRC connection setup complete message, and the first request message transmitted from the eNB 130 to the first MME may be contained in an initial UE message. The first request message may be an attach request message or a tracking area update request message, and the second message may be an initial UE message.

Figure 5B:
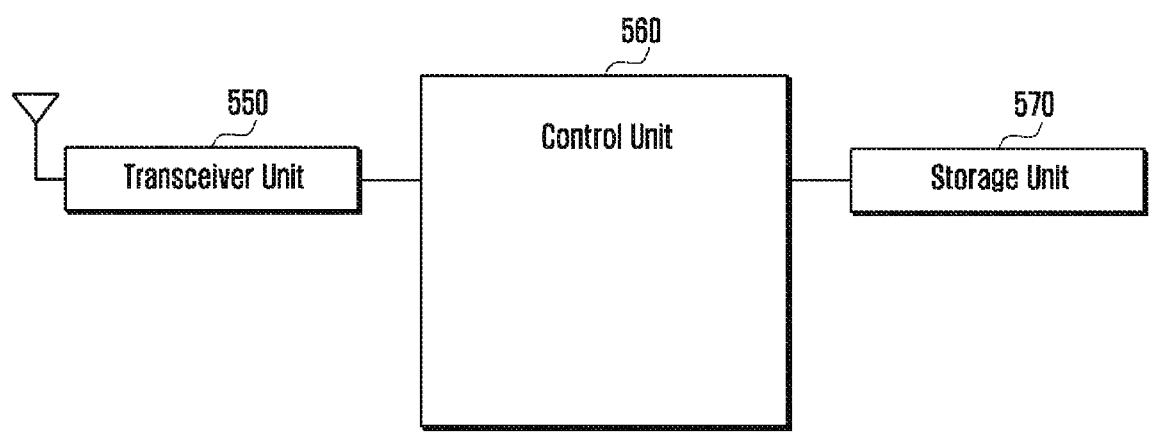
FIG. 5B is a block diagram illustrating an internal structure of a UE according to an embodiment of the present disclosure.

FIG. 5B is a block diagram illustrating an internal structure of a UE according to an embodiment of the present disclosure.

Referring to FIG. 5B, the UE 100 may include a transceiver unit 550, a control unit 560, and a storage unit 570. The transceiver unit 550 may transmit and receive a signal to and from a network entity, especially the eNB 130. This signal may include a control signal, data, and the like. The storage unit 570 may store therein various programs required for the operation of the UE. More particularly, the storage unit 570 according to an embodiment of this disclosure may store information associated with a message for access to a core network. The control unit 560 controls a signal flow between respective blocks for the operation of the UE. Specifically, the control unit 560 may control the transceiver unit 550 for access to the network.

Second Embodiment

A mobile communication system is being developed to a high-speed, high-quality radio packet data communication system in order to provide a data service and a multimedia service, outgrowing a voice-based service. Further, various mobile communication standards, such as 3GPP high speed downlink packet access (HSDPA), high speed uplink packet access (HSUPA), LTE, LTE advanced (LTE-A), 3GPP2 high rate packet data (HRPD), and institute of electrical and electronics engineers (IEEE) 802.16 has been developed to support a high-speed, high-quality radio packet data transfer service.

The LTE system which is developed to effectively support high-speed radio packet data transmission may maximize the capacity of radio system by utilizing various radio access techniques. Additionally, the LTE-A system which is an advanced radio system of the LTE system has improved data transmission ability in comparison with LTE.

The existing radio packet data communication system, such as HSDPA, HSDPA, HRPD, and the like, uses adaptive modulation and coding (AMC) technique and channel sensitive scheduling technique so as to improve transmission efficiency. These techniques may apply a suitable modulation and coding scheme at the most optimal time point determined by receiving feedback of partial CSI from a receiver.

In the radio packet data communication system to which AMC technique is applied, a transmitter may adjust the amount of transmitting data depending on a channel status. Namely, in a poor channel status, the transmitter may reduce the amount of transmitting data and thereby fit the probability of reception error to a desired level. In addition, in a good channel status, the transmitter may increase data transmission thereby effectively transmit more information while fitting the probability of reception error to a desired level.

In the radio packet data communication system to which channel sensitive scheduling resource management technique is applied, the transmitter selectively offers a service to a user having a better channel status from among several users. Therefore, the system capacity is increased in comparison with other case of allocating a channel and offering a service to a single user. This increase in capacity is referred to as multi-user diversity gain. AMC technique may include a function to determine the number or rank of spatial layers of transmitting signals when using multiple input multiple output (MIMO) transmission scheme together. In this case, the radio packet data communication system considers how many layers will be used for transmission using MIMO, rather than simply considering coding rate and modulation scheme so as to determine the optimal data rate.

Normally, in orthogonal frequency division multiple access (OFDMA) scheme, an increase in capacity is expected through frequency domain scheduling, and the like, in comparison with code division multiple access (CDMS) scheme. As a capacity gain is obtained through channel sensitive scheduling technique according to time-dependent variable characteristics of channel, the utilization of frequency-dependent characteristics may allow much more capacity gain to be obtained. Thus, OFDMA that replaces CDMA has been studied recently, and the standardization about evolved systems based on OFDMA has been also performed in 3GPP and 3GPP2.

Figure 6:
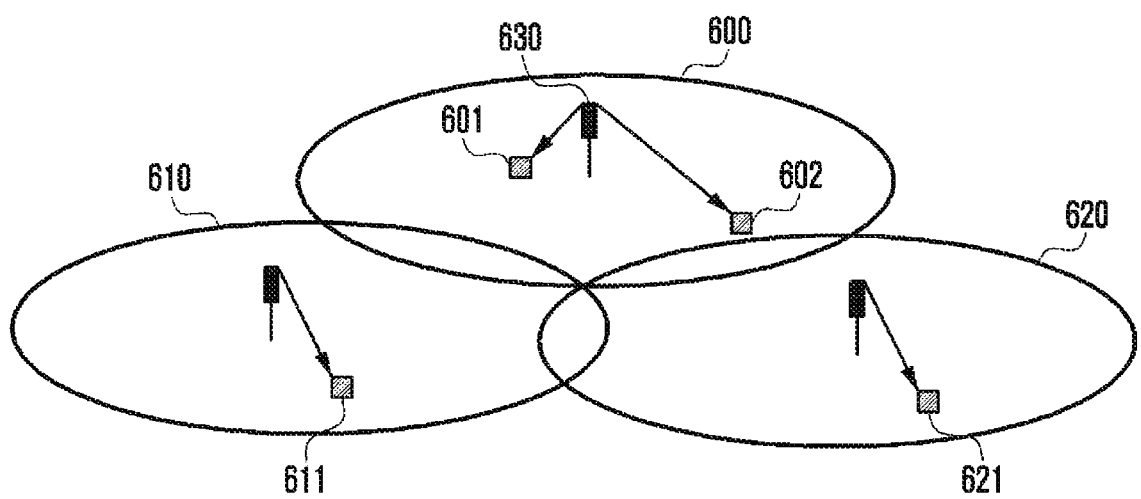
FIG. 6 is a diagram illustrating a typical cellular mobile communication system in which a transceiver antenna is deployed at a center of each cell according to an embodiment of the present disclosure.

FIG. 6 is a diagram illustrating a typical cellular mobile communication system in which a transceiver antenna is deployed at a center of each cell according to an embodiment of the present disclosure.

Referring to FIG. 6, in the cellular mobile communication system formed of a plurality of cells, a UE is offered a mobile communication service from a selected one cell during semi-static long time spans. For example, the cellular mobile communication system may include three cells 600, 610, and 620. Further, the cell 600 may offer a mobile communication service to a UE 601 and a UE 602, the cell 610 may offer such a service to a UE 611, and the cell 620 may offer such a service to a UE 621.

The UE 602 that is provided with a mobile communication service using the cell 600 is located at a longer distance from an antenna 630 than the UE 601. Further, the UE 602 undergoes interference with a central antenna of another cell 620. Therefore, a data transfer rate of the UE 602 in cell 600 becomes relatively lower.

When a mobile communication service is offered independently in the respective cells 600, 610, and 620, a reference signal (RS) for channel estimation is transmitted at each cell so as to measure a downlink channel status. In addition, in a case of a 3GPP LTE-A system, the UE 602 measures the status of a channel with the eNB by using a CSI reference signal (CSI-RS).

Figure 7:
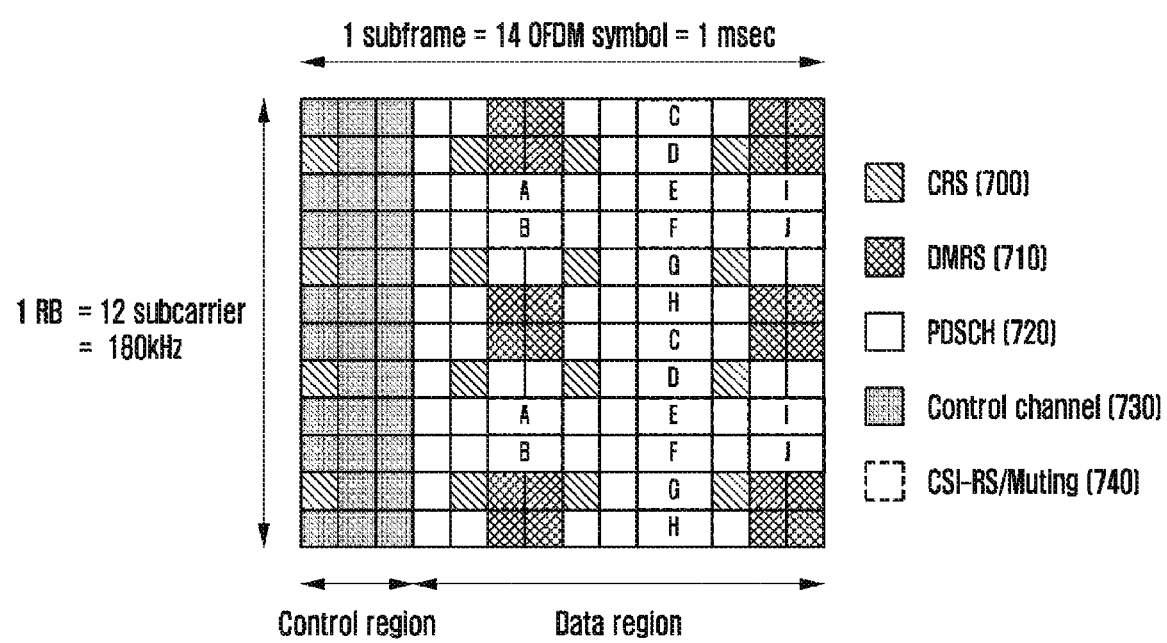
FIG. 7 is a diagram illustrating a downlink radio resource of LTE/LTE-advanced (LTE-A) system according to an embodiment of the present disclosure.

FIG. 7 is a diagram illustrating a downlink radio resource of LTE/LTE-A system according to an embodiment of the present disclosure.

Referring to FIG. 7, a radio resource is formed of a single subframe on the time axis and a single resource block (RB) on the frequency axis. This radio resource is also formed of twelve subcarriers in the frequency domain and fourteen OFDM symbols in the time domain, thus having total 168 natural frequency and time positions. In LTE/LTE-A, each natural frequency and time position is referred to as a resource element (RE). A single subframe and a single RB, shown in FIG. 7, correspond to the minimum unit at downlink scheduling.

In the radio resource shown in FIG. 7, a plurality of different kinds of signals may be transmitted as follows.

1. cell specific reference signal (CRS) 700: This is a reference signal transmitted periodically for all UEs that belong to a single cell. This signal may be used in common by a plurality of UEs.

2. demodulation reference signal (DMRS) 710: This is a reference signal transmitted for a specific UE and used only for data transmission to that UE. DMRS may be formed of total eight DMRS antenna ports. In LTE/LTE-A, ports 7 to 14 correspond to DMRS antenna ports, each of which maintains orthogonality by using code division multiplexing (CDM) or frequency division multiplexing (FDM) so as not to cause interference.

3. physical downlink shared channel (PDSCH) 720: This is a data channel transmitted at downlink and used by the eNB to transmit traffic to the UE. This is transmitted using RE through which no reference signal is transmitted in a data region shown in FIG. 7.

4. CSI-RS 740: This is a reference signal transmitted for UEs in a single cell and used for channel estimation. A plurality of CSI-RSs may be transmitted in a single cell. In the LTE-A system, a single CSI-RS may correspond to one, two, four, or eight antenna ports.

5. Other Control Channel 730, such as physical hybrid-ARQ indicator channel (PHICH), physical control format indicator channel (PCFICH), or physical downlink control channel (PDCCH): This is used for offering control information required for the UE to receive PDSCH or used for transmitting ACK/NACK for operating Hybrid-ARQ (HARQ) with regard to uplink data transmission.

In addition to the above signals, the LTE-A system may set muting 740 such that CSI-RS transmitted by any other eNB may be received at UEs in relevant cell without interference. This muting may be applied to a location allowing CSI-RS transmission, and normally the UE receives a traffic signal by jumping over such a radio resource. In the LTE-A system, muting may be also referred to as zero-power CSI-RS since muting is applied equally to the location of CSI-RS without transmission power.

Referring to FIG. 7, CSI-RS may be transmitted using a part of locations denoted as A, B, C, D, E, F, G, H, I and J, depending on the number of antennas that transmit CSI-RS. Similarly, muting may be applied to a part of locations denoted as A, B, C, D, E, F, G, H, I and J. More particularly, CSI-RS may be transmitted using two, four and eight REs, depending on the number of antenna ports for transmission. If the number of antenna ports is two, CSI-RS is transmitted using the half of a specific pattern in FIG. 7. In addition, CSI-RS is transmitted using the entire specific pattern in a case of four antenna ports and using two patterns in a case of eight antenna ports. On the contrary, muting is always formed in the unit of a single pattern. Namely, muting can be applied to a plurality of patterns and, in a case of being not overlapped with CSI-RS in location, cannot be applied to only a part of a single pattern. However, only in a case of being overlapped with CSI-RS, muting may be applied to a part of a single pattern.

When CSI-RS is transmitted for two antenna ports, a signal of each antenna port is transmitted at two REs connected on the time axis, and this signal of each antenna port is distinguished as an orthogonal code. Additionally, when CSI-RS is transmitted for four antenna ports, two REs are further used in the same manner. This is the same for CSI-RS transmission for eight antenna ports.

In a case of the cellular mobile communication system formed of a plurality of cells as shown in FIG. 6, CSI-RS is transmitted though different locations allocated to each cell. For example, CSI-RS in a case of cell 600 may be transmitted at the location A of FIG. 7, CSI-RS in a case of cell 610 may be transmitted at the location B, and CSI-RS in a case of cell 620 may be transmitted at the location C. Namely, in order to prevent interference of CSI-RS in different cells, time and frequency resources for CSI-RS transmission are allocated to different locations for respective cells.

As discussed above, in the cellular system, the eNB should transmit a reference signal to the UE so as to measure a downlink channel status. In a case of the 3GPP LTE-A system, the UE measures the status of a channel with the eNB by using CSI-RS transmitted by the eNB. A channel status should consider some factors including the amount of interference at downlink. This amount of downlink interference includes interference signals and thermal noise caused by an antenna of neighboring eNB, and is important for the UE to determine a downlink channel status. For example, when the eNB having a single transmission antenna transmits a signal to the UE having a single reception antenna, the UE should determine, using a reference signal received from the eNB, energy per symbol capable of being received at downlink and the amount of interference to be received simultaneously in the section receiving the symbol, and then determine the ratio of energy to interference, Es/Io. The determined Es/Io is converted into a data transfer rate or a corresponding value and then notified to the eNB by the UE in the form of channel quality indicator (CQI). Therefore, the eNB can determine a data transfer rate to be used for downlink transmission to the UE.

In a case of the LTE-A system, the UE offers feedback of information about a downlink channel status to the eNB so as to be utilized in downlink scheduling of the eNB. Namely, the UE measures a reference signal transmitted at downlink by the eNB and then feeds back extracted information to the eNB in a form defined in LTE/LTE-A standard. In LTE/LTE-A, feedback information of the UE is mainly three types as follows.

rank indicator (RI): RI refers to the number of spatial layers which can be received by the UE in a current channel status.

precoder matrix indicator (PMI): PMI refers to an indicator regarding a precoding matrix which is preferred by the UE in a current channel status.

CQI: CQI refers to the maximum data rate which can be received by the UE in a current channel status. CQI may be replaced with a signal to interference and noise ratio (SINR), the maximum error correction code rate and modulation scheme, data efficiency per frequency, and the like.

The above-discussed RI, PMI and CQI have meanings in connection with each other. For example, a precoding matrix supported in LTE/LTE-A is defined differently according to ranks. Therefore, a PMI value in a case an RI value is one is interpreted differently from a PMI value in a case an RI value is two even though both values are the same. Additionally, when determining CQI, the UE assumes that RI and PMI values notified to the eNB by the UE are applied to the eNB. Namely, if the UE notifies RI_X, PMI_Y and CQI_Z to the eNB, and if a rank and a precoding matrix are RI_X and PMI_Y respectively, it indicates that the UE can receive a data rate corresponding to CQI_Z. Therefore, when calculating CQI, the UE assumes which transmission type to be used for the eNB such that optimized performance can be obtained when actual transmission is performed in such a transmission type.

In LTE/LTE-A, periodical feedback of the UE is set as one of the following four feedback or reporting modes, depending on which information is contained.

1. Mode 1-0: RI, wideband CQI (wCQI)
2. Mode 1-1: RI, wCQI, PMI
3. Mode 2-0: RI, wCQI, subband CQI (sCQI)
4. Mode 2-1: RI, wCQI, sCQI, PMI Feedback timing of information regarding the above four feedback modes is determined according to values, such as $N_{pd}$, $N_{OFFSET,CQI}$, $M_{RI}$, and $N_{OFFSET,RI}$ delivered through higher layer signals. In feedback mode 1-0, a transmission cycle of wCQI is $N_{pd}$ subframe, and feedback timing is determined using a subframe offset value of $N_{OFFSET,CQI}$. In addition, a transmission cycle of RI is $N_{pd} \cdot M_{RI}$ subframe, and offset is $N_{OFFSET,CQI} + N_{OFFSET,RI}$.

Figure 8:
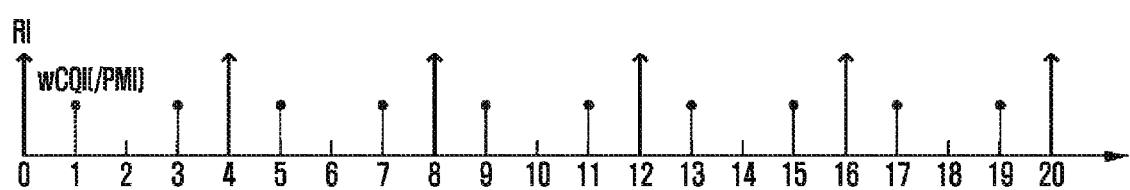
FIG. 8 is a diagram illustrating feedback timing of RI and wCQI in a case of $N_{pd}=2$, $M_{RI}=2$, $N_{OFFSET,CQI}=1$, and $N_{OFFSET,RI}=-1$ according to an embodiment of the present disclosure.

FIG. 8 is a diagram illustrating feedback timing of RI and wCQI in a case of, $N_{pd}$=2, $M_{RI}$=2, $N_{OFFSET,CQI}$=1, and $N_{OFFSET,RI}$=−1 according to an embodiment of the present disclosure.

Referring to FIG. 8, each timing indicates subframe index.

Feedback mode 1-1 has the same feedback timing as mode 1-0, however having a difference in that wCQI and PMI are transmitted together at wCQI transmission timing with regard to one or two antenna ports or, in part, four antenna ports.

In feedback mode 2-0, a feedback cycle of sCQI is $N_{pd}$ subframe, and an offset value is $N_{OFFSET,CQI}$. In addition, a feedback cycle of wCQI is $H \cdot N_{pd}$ subframe, and an offset value is $N_{OFFSET,CQI}$ like that of sCQI. Here, h=J·K+1 in which K is transmitted to a higher signal and J is a value determined according to a system bandwidth. For example, the value of J is defined as 3 in a case of 10 MHz system. Eventually, wCQI is transmitted, as replacement, once every H times of sCQI transmission. Additionally, an RI cycle is $M_{RI} \cdot H \cdot N_{pd}$ subframe, and offset is $N_{OFFSET,CQI} + N_{OFFSET,RI}$.

Figure 9:
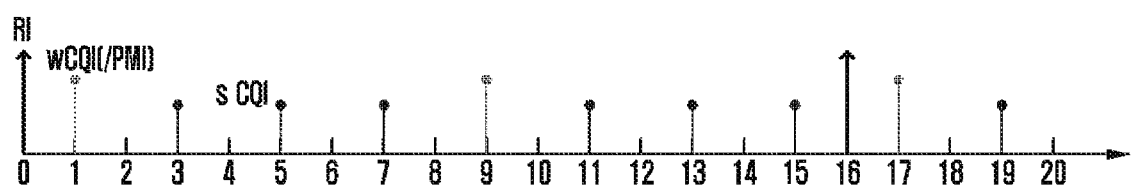
FIG. 9 is a diagram illustrating feedback timing of RI, sCQI, and wCQI in a case of $N_{pd}=2$, $M_{RI}=2$, J=3 (10 MHz), K=1, $N_{OFFSET,CQI}=1$, and $N_{OFFSET,RI}=-1$ according to an embodiment of the present disclosure.

FIG. 9 is a diagram illustrating feedback timing of RI, sCQI, and wCQI in a case of $N_{pd}$=2, $M_{RI}$=2, J=3 (10 MHz), K=1, $N_{OFFSET,CQI}$=1, and $N_{OFFSET,RI}$=−1 according to an embodiment of the present disclosure.

Referring to FIG. 9, feedback mode 2-1 has the same feedback timing as mode 2-0, however having a difference in that PMI is transmitted together at wCQI transmission timing with regard to one or two antenna ports or, in part, four antenna ports.

The above-discussed feedback timing is a case in which the number of CSI-RS antenna ports is one, two or, in part, four. In another case in which the UE allocated CSI-RS for other four antenna ports or eight antenna ports, two types of PMI information is fed back contrary to the above feedback timing. Further in this case, feedback mode 1-1 is divided again into two sub-modes. In the first sub-mode, RI is transmitted together with the first PMI information, and the second PMI information is transmitted together with wCQI. Here, feedback cycle and offset regarding wCQI and the second PMI are defined respectively as $N_{pd}$ and $N_{OFFSET,CQI}$, whereas feedback cycle and offset regarding RI and the first PMI information are defined respectively as $M_{RI} \cdot N_{pd}$ and $N_{OFFSET,CQI} + N_{OFFSET,RI}$. All of the first PMI ($i_1$) and the second PMI ($i_2$) are reported from the UE to the eNB, the UE and the eNB confirm that a precoding matrix $W(i_1, i_2)$ corresponding to a combination of the first and second PMIs in a codebook which is a set of shared precoding matrices is a precoding matrix preferred by the UE. According to another interpretation, if a precoding matrix corresponding to the first PMI is $W_1$ and if a precoding matrix corresponding to the second PMI is $W_2$, the UE and the eNB share information that a UE-preferring precoding matrix is determined as the product of two matrices, $W_1 W_2$.

When feedback mode for eight CSI-RS antenna ports is 2-1, precoding type indicator (PTI) information is added to feedback information. At this time, PTI is fed back together with RI, and also cycle and offset thereof are defined as $M_{RI} \cdot H \cdot N_{pd}$ subframe and $N_{OFFSET,CQI} + N_{OFFSET,RI}$.

Specifically, when PTI is zero, the first and second PMIs and wCQI are fed back. At this time, wCQI and the second PMI are transmitted at the same timing, and cycle and offset thereof are given as $N_{pd}$ and $N_{OFFSET,CQI}$ The cycle and offset of the first PMI are $H' \cdot N_{pd}$ and $N_{OFFSET,CQI}$, respectively. Here, H' is delivered to a higher layer signal.

On the contrary, when PTI is one, wCQI is transmitted together with the second wideband PMI, and sCQI is fed back together with the second subband PMI at different timing. In this case, the first PMI is not transmitted, and the second PMI and CQI are calculated and reported by assuming the first PMI reported as the newest when PIT is zero. The cycle and offset of PTI and RI are the same as when PTI is zero. The cycle of sCQI is defined as $N_{pd}$ subframe, and offset is defined as $N_{OFFSET,CQI}$. The second PMI and wCQI are fed back, having a cycle of $H \cdot N_{pd}$ and offset of $N_{OFFSET,CQI}$. Here, H is defined as when the number of CSI-RS antenna ports is two.

Figure 10:
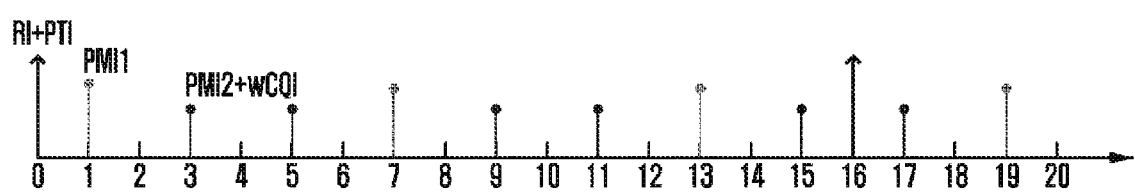
FIG. 10 is a diagram illustrating feedback timing when PTI=0 and in a case of $N_{pd}=2$, $M_{RI}=2$, J=3 (10 MHz), K=1, H'=3, $N_{OFFSET,CQI}=1$, and $N_{OFFSET,RI}=-1$ according to an embodiment of the present disclosure.

FIG. 10 is a diagram illustrating feedback timing when PTI=0 and in a case of $N_{pd}$=2, $M_{RI}$=2, J=3 (10 MHz), K=1, H'=3, $N_{OFFSET,CQI}$=1, and $N_{OFFSET,RI}$=−1 according to an embodiment of the present disclosure.

Figure 11:
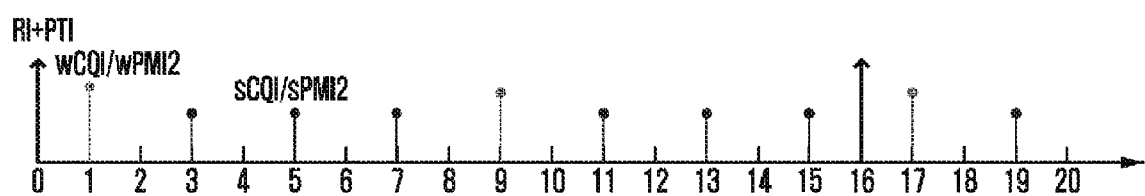
FIG. 11 is a diagram illustrating feedback timing when PTI=1 and in a case of $N_{pd}=2$, $M_{RI}=2$, J=3 (10 MHz), K=1, H'=3, $N_{OFFSET,CQI}=1$, and $N_{OFFSET,RI}=-1$ according to an embodiment of the present disclosure.

FIG. 11 is a diagram illustrating feedback timing when PTI=1 and in a case of $N_{pd}$=2, $M_{RI}$=2, J=3 (10 MHz), K=1, H'=3, $N_{OFFSET,CQI}$=1, and $N_{OFFSET,RI}$=−1 according to an embodiment of the present disclosure.

Referring to FIGS. 10 and 11, LTE/LTE-A supports non-periodic feedback as well as periodic feedback of the UE. When the eNB desires to know non-periodic feedback information about the specific UE, the eNB performs uplink data scheduling of the UE by setting a non-periodic feedback indicator contained in downlink control information (DCI) for uplink data scheduling of the UE to instruct the execution of specific non-periodic feedback. If such an indicator for a non-periodic feedback is received from the n-th subframe through PDCCH, the UE performs uplink transmission by adding non-periodic feedback information to data transmission at the (n+k)-th subframe through PUSCH. Here, k is parameter defined in the 3GPP LTE Release 11 standard. In frequency division duplexing (FDD), k is 4. In time division duplexing (TDD), k is defined as Table 1 that shows k values for respective subframes in TDD UL/DL setting.

TABLE 1

| TDD UL/DL | Subframe number n | | | | | | | | | |
|---|---|---|---|---|---|---|---|---|---|---|
| Setting | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When non-periodic feedback is set, feedback information includes RI, PMI and CQI as in a case of periodic feedback. RI and PMI may not be fed back, depending on feedback setting. CQI may include all of wCQI and sCQI, or include wCQI only.

In a prior art, only a case where a single CSI feedback is given for a specific UE is considered. Namely, an effective CSI feedback method for coordinated multi-point (CoMP) transmission in which several transmission points cooperatively control a signal and interference of the specific UE is not considered. The present disclosure considers a method in which the UE effectively measures interference in a multiple CSI feedback situation and then creates and reports feedback. In a case of the cellular mobile communication system shown in FIG. 6, the UE located near a cell edge confronts limitations in having the benefit of a higher data transfer rate due to interference from other cells. Namely, in the cellular mobile communication system, a data transfer rate is greatly affected by the location of the UE within a cell. Therefore, a typical cellular mobile communication system has a problem that the UE located at a longer distance from the cell center may transmit or receive data at a poor data transfer rate.

Accordingly, the present disclosure is to construct a simple CoMP scheme based on the LTE-A system and also to provide a feedback creation method, together with a related apparatus, for effectively operating CoMP transmission.

According to this disclosure, in the cellular mobile communication system, neighboring cells may cooperatively transmit data through CoMP transmission to the UE located near a cell edge. In addition, cells may offer an improved mobile communication service in comparison with no cooperation of cells. When the UE is located near a cell edge, the UE may dynamically determine a cell from which data will be received. Further, some cell causing considerable interference may turn off their power in order to help such UE. In addition, several cells may transmit information simultaneously to such UE so as to increase a reception rate of information at the UE. Therefore, all UEs in the cellular mobile communication system may obtain a higher data transfer rate regardless of their locations in a cell. Meanwhile, the cellular mobile communication system is formed of a plurality of cells constructed in a limited area. In each cell, the eNB offers a mobile communication service to UEs in a cell. In this case, the specific UE is offered a mobile communication service from only a selected one cell during long time spans. This system is referred to as a non-CoMP system.

In the non-CoMP system, a data transfer rate offered to all UEs that exist in a cell is greatly varied depending on the locations of such UEs. Namely, a certain UE located near the cell center may be offered a higher data transfer rate, whereas another UE located near the cell edge may fail to be offered a higher data transfer rate.

Contrary to the non-CoMP system, there is a CoMP system. The CoMP system is a system in which a plurality of cells may cooperatively transmit data so as to support the UE located near a cell edge. In this case, it is possible to offer an improved mobile communication service in comparison with the non-CoMP system. This disclosure provide a feedback method and related apparatus, considering a dynamic cell selection (DS) scheme, a dynamic cell blanking (DB) scheme, a joint transmission (JT) scheme, and the like, in the CoMP system.

A DS scheme refers to technique in which when the UE measures a channel status of each cell and delivers feedback to the eNB, the eNB transmits data by dynamically selecting a specific cell that will transmit downlink data to that the UE. A DB scheme refers to technique of allowing specific cell to perform no data transmission in order to reduce interference to other cells. A JT scheme refers to technique of transmitting data simultaneously to the specific UE at some cells. Additionally, this disclosure further considers a combination of DS, DB and JT schemes. Namely, this disclosure designs a feedback structure so as to effectively apply transmission schemes of DS, DB, JT or any combination thereof to the LTE-A system.

Figure 12:
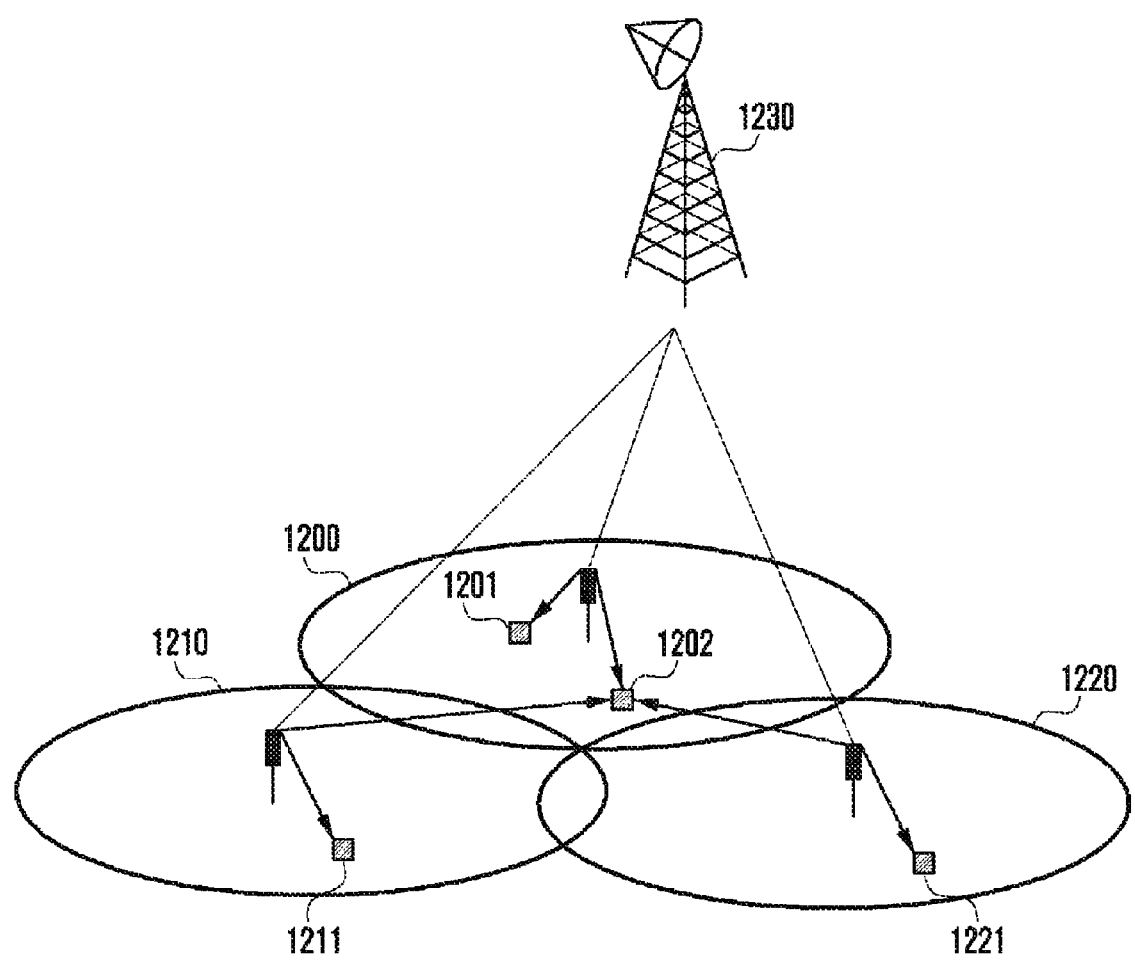
FIG. 12 is a diagram illustrating a cellular mobile communication system according to an embodiment of the present disclosure.

FIG. 12 is a diagram illustrating a cellular mobile communication system according to an embodiment of the present disclosure.

Referring to FIG. 12, the cellular mobile communication system may formed of three cells. A cell used in various embodiments of this disclosure refers to a data transmission area covered by a specific transmission point. Each transmission point may be a remote radio head (RRH) having a cell ID in common with a macro eNB in a macro region, or a macro or pico cell having difference cell IDs.

A central control apparatus refers to an apparatus capable of transmitting or receiving data to or from the UE and also processing such data. If each transmission point is an RRH having a cell ID in common with a macro eNB, the macro eNB may be referred to as a central control apparatus. If each transmission point is a macro or pico cell having different cell IDs, a device that performs an integrated management for respective cells may be referred to as a central control apparatus.

Referring to FIG. 12, the cellular mobile communication system includes one or more cells 1200, 1210, and 1220, UEs 1201, 1211, and 1221 each of which receives data from the nearest cell, and the UE 1202 which receives CoMP transmission from the cells 1200, 1210, and 1220. The UE 1201, 1211, or 1221 that receives data from the nearest cell estimates a channel through CSI-RS regarding a cell in which the UE 1202 is located, and then transmits related feedback to the relevant eNB or a central control apparatus 1230. On the contrary, the UE 1202 that receives data from three cells 1200, 1210, and 1220 through a CoMP scheme should estimate channels from all of three cells. Therefore, for channel estimation performed at the UE 1202, the eNB or the central control apparatus 1230 allocates three CSI-RS resources corresponding to respective cells. Now, a method for allocating CSI-RS to the UE 1202 by the central control apparatus 1230 will be described with reference to FIG. 13.

Figure 13:
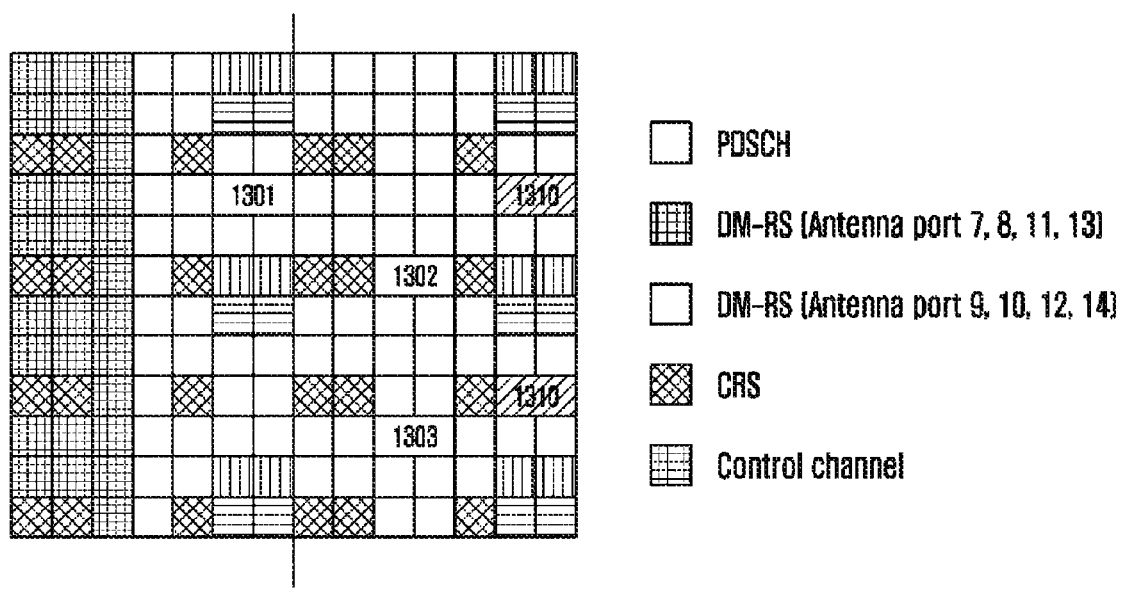
FIG. 13 is a diagram illustrating an operation of allocating channel status information reference signal (CSI-RS) to a UE that receives data in a coordinated multi-point (CoMP) scheme from a plurality of cells according to an embodiment of the present disclosure.

FIG. 13 is a diagram illustrating an operation of allocating CSI-RS to a UE that receives data in a CoMP scheme from a plurality of cells according to an embodiment of the present disclosure.

Referring to FIG. 13, the central control apparatus allocates three CSI-RSs to resources 1301, 1302, and 1303 such that the UE 1202 can estimate a channel from each of three cells 1200, 1210, and 1220 and also estimate a channel for control information and system information. Thereafter, the central control apparatus transmits CSI-RS to the UE 1202 by using such resources. Namely, a resource to which CSI-RS for channel estimation of the cell 1200 is allocated is indicated by a reference number 1301, a resource to which CSI-RS for channel estimation of the cell 1210 is allocated is indicated by a reference number 1302, and a resource to which CSI-RS for channel estimation of the cell 1220 is allocated is indicated by a reference number 1303. A set including such resources to which at least one CSI-RS transmitted for channel estimation of CoMP UE is allocated, or a set including cells corresponding to such CSI-RS resources is referred to as a measurement set.

As discussed above, in order to estimate channels of relevant cells by using at least one CSI-RS allocated, the UE 1202 that operates by CoMP receives, from the eNB or the central control apparatus, at least one CSI-RS allocation information as follows.

CSI-RS allocation information:
    CSI-RS index
    CSI-RS antenna port information (1, 2, 4, or 8)
    Location information about resources in RB
    CSI-RS transmission timing information (cycle and offset)
    CSI-RS sequence information
    CRS information of cell for which CSI-RS is transmitted
      Cell identifier (cell ID)
      CRS antenna port information
      Information about subframe with no CRS transmission in data region The above CSI-RS allocation information is allocated as much as the number of eNBs that need to be allocated to a specific UE on the network, and may contain all or part of the above listed information.

Further, the central control apparatus 1230 may allocate an additional resource for interference measurement to the UE 1202. The amount of data, the UE 1202 can receive per time, is affected by the size of interference as well as the strength of signal. Therefore, for an exact measurement of interference at the UE 1202, the eNB or the central control apparatus 120 may separately allocate interference measurement resource (IMR) to be used for measuring interference. The eNB may allocate a single IMR to the UE 1202 so as to allow the UE 1202 to measure the amount of interference applied in common to signal components of all CSI-RSs in the measurement set, or allocate several IMRs to the UE 1202 so as to allow the UE to measure various interference states.

Referring to FIG. 13, the UE may measure a signal from three cells by using three allocated CSI-RS resources 1301, 1302 and 1303, and also measure interference, which occurs at signal transmission from three cells, by using an allocated IMR 1310. In this case, the eNB controls signal transmission of neighboring cells at the IMR 1310 such that interference in the UE is reflected well in the IMR 1310.

As discussed above, the UE that operates by CoMP is allocated one or more IMRs through the following allocation information and then measures interference at relevant resource.

IMR allocation information:
    IMR index
    Location information about resources in RB
    IMR transmission timing information (cycle and offset)

The above IMR allocation information may be allocated as much as the number of interference types that need to be allocated to the specific UE on the network, and may contain all or part of the above listed information.

When the UE is allocated CSI-RSs corresponding to several cells and also allocated one or more IMRs, a method for setting, creating and reporting feedback according to the first embodiment of this disclosure is as follows.

1. The eNB allocates, to the UE, additional feedback setting information associated with CSI process information regarding a combination of CSI-RS and IMR that correspond respectively to signal and interference states that should be reported by the UE.

2. The UE estimates a channel matrix regarding a signal from CSI-RS corresponding to a signal component contained in the allocated CSI process information, estimates an interference matrix and interference power from CSI-RS and IMR corresponding to an interference component, creates UE-preferring RI, PMI, and CQI information by reflecting the additional feedback setting information, and then reports the created information to the eNB.

Now, the above-discussed method for setting, creating and reporting feedback according to the first embodiment will be described.

For example, a measurement set allocated to the UE is {CSI-RS-1, CSI-RS-2} in which CSI-RS-1 and CSI-RS-2 are transmitted from cells 1 and 2, respectively. In addition, the UE may be allocated a single IMR from the eNB and that this IMR reflects interference from cells other than the measurement set. Thereafter, the UE can be allocated four CSI processes as shown in Table 2 given below, and then create corresponding feedback.

TABLE 2

| CSI process | Signal component | Interference component | Consideration |
|---|---|---|---|
| 1 | CSI-RS-1 | IMR + CSI-RS-2 | Data transmission at cell 1, interference of cell 2 |
| 2 | CSI-RS-1 | IMR | Data transmission at cell 1, blanking of cell 2 |
| 3 | CSI-RS-2 | IMR + CSI-RS-1 | Data transmission at cell 2, interference of cell 1 |
| 4 | CSI-RS-2 | IMR | Data transmission at cell 2, blanking of cell 1 |

In Table 2, CSI process 1 indicates that the UE considers as a signal component a channel matrix estimated at CSI-RS-1 corresponding to a cell 1, considers as an interference component both interference power measured at IMR and an interference matrix estimated at CSI-RS-2 corresponding to a cell 2, and thereby can create related feedback. Namely, CSI process 1 indicates that the UE can create and report feedback information about a state in which a signal is received from a cell 1 and interference occurs at a cell 2 and cells other than a measurement set reflected in IMR (i.e., cells other than cells 1 and 2).

On the other hand, CSI process 2 indicates that when the UE receives a signal from a cell 1 corresponding to CSI-RS-1, a cell 2 is in a blanking state of transmitting no signal so as not to cause interference to a cell 1. Namely, CSI process 2 indicates that the UE can create and report feedback information about a state where the UE undergoes interference from only cells other than a measurement set reflected in IMR. Similarly, both CSI processes 3 and 4 correspond to feedback when receiving a signal from a cell 2, and also respectively correspond to feedback in a case of interference from a cell 1 and feedback in a case of no interference due to blanking of a cell 1.

Table 2 shows all possible cases of feedback when an allocated measurement set is {CSI-RS-1, CSI-RS-2} and a single IMR is allocated from the eNB. However, depending on CoMP technique realized in an actual network, any feedback in Table 2 may not be needed for the eNB. Namely, if the UE always receives data from only a single cell during long time spans, and if a network constructs DB that allows specific cells to support only blanking with regard to specific resources so as to control interference in the entire network, there is no need to allocate feedback, considering a cell 2 as a signal, to UEs that access a cell 1. Therefore, UEs accessing the cell 1 have no need of creating/reporting feedback corresponding to CSI processes 3 and 4 in which CSI-RS-2 transmitted from the cell 2 is considered as a signal. However, since the cell 2 can support blanking for UEs accessing the cell 1, there is a need of creating/reporting feedback corresponding to CSI processes 1 and 2.

Additionally, if the UE creates and delivers all feedbacks corresponding to combinations of the measurement set and interference, considerable feedback overhead may be caused in a case of many CSI-RSs contained in the measurement set or in a case of many IMRs. For example, when a measurement set having three CSI-RSs {CSI-RS-1, CSI-RS-2, CSI-RS-3} and a single IMR are allocated to the UE, types of feedbacks that can be created by the UE are twelve as shown in Table 3. If the UE creates and reports all feedbacks, the complexity of feedback creation by the UE and the uplink overhead of system are increased.

TABLE 3

| CSI process | Signal component | Interference | Consideration |
|---|---|---|---|
| 1 | Cell 1 | IMR + Cell 2 + Cell 3 | No blanking |
| 2 | Cell 1 | IMR + Cell 2 | Blanking of cell 3 |
| 3 | Cell 1 | IMR + Cell 3 | Blanking of cell 2 |
| 4 | Cell 1 | IMR | Blanking of cells 2 & 3 |
| 5 | Cell 2 | IMR + Cell 1 + Cell 3 | No blanking |
| 6 | Cell 2 | IMR + Cell 1 | Blanking of cell 3 |
| 7 | Cell 2 | IMR + Cell 3 | Blanking of cell 1 |
| 8 | Cell 2 | IMR | Blanking of cells 1 & 3 |
| 9 | Cell 3 | IMR + Cell 1 + Cell 2 | No blanking |
| 10 | Cell 3 | IMR + Cell 1 | Blanking of cell 2 |
| 11 | Cell 3 | IMR + Cell 2 | Blanking of cell 1 |
| 12 | Cell 3 | IMR | Blanking of cells 2 & 3 |

Therefore, the first embodiment of this disclosure considers case of allocating, to the UE, additional feedback setting information associated with CSI process information regarding CSI-RS and IMR combinations corresponding to signal and interference states that need to be reported to the eNB by the UE, rather than case where the UE creates and delivers all feedbacks regarding possible signal and interference states. In response to this, the UE estimates a channel matrix regarding a signal from only CSI-RS corresponding to a signal component contained in the allocated CSI process information, estimates an interference matrix and interference power from only CSI-RS and IMR corresponding to an interference component, creates UE-preferring RI, PMI, and CQI information by reflecting the additional feedback setting information, and then reports the created information to the eNB.

The above-discussed additional feedback setting information associated with CSI process information regarding CSI-RS and IMR combinations corresponding to signal and interference states that need to be reported to the eNB by the UE is as follows.

CSI process allocation information:
        CSI process index
        Signal component information: CSI-RS index information
        Interference component information
            IMR index information for measuring interference power
            One or more CSI-RS index information for measuring interference matrix
        Power correction parameter to be applied to signal component
        Power correction parameter to be applied to interference component
        Periodic feedback information (feedback mode, feedback timing, and the like)
        Non-periodic feedback information (feedback mode, and the like)

The above CSI process allocation information may be allocated as much as the number of combinations of signal and interference that need to be allocated to the specific UE on the network, and may contain all or part of the above listed information. In addition, power correction parameter to be applied to an interference component contained in each CSI process may be allocated separately for one or more CSI-RSs to be considered as an interference component, or set as a single value applied in common to one or more CSI-RSs to be considered as an interference component.

Now, a method for creating feedback information at the UE that is allocated the above CSI process information will be described. For example, a measurement set allocated to the UE may be {CSI-RS-1, CSI-RS-2} in which CSI-RS-1 and CSI-RS-2 are transmitted from cells 1 and 2, respectively. In addition, the UE may be allocated a single IMR from the eNB and that this IMR reflects interference from cells other than the measurement set. In addition, the UE may be allocated specific CSI process in which CSI-RS-1 is a signal component and also CSI-RS-2 and IMR are set as an interference component.

The UE having M receiving antennas estimates an N×M channel matrix $\tilde{H}_1$ from the eNB having N transmitting antenna ports through N port CSI-RS-1. Additionally, the UE estimates an interference matrix $\tilde{H}_2$ through CSI-RS-2 and also estimates receiving power $\tilde{\sigma}_e^2$ of interference from IMR. Thereafter, considering the estimated channel matrix, interference matrix, and receiving power of interference, the UE may create optimal feedback information RI, PMI, and CQI with regard to a signal and perform a report to the eNB at given timing. For example, when the UE uses an MMSE-IRC (Minimum Mean Squared Error-Interference Rejection) receiver, the UE selects optimal RI and PMI and creates a CQI value by calculating SINR of each transport layer from the estimated $\tilde{H}_1$, $\tilde{H}_2$ and $\tilde{\sigma}_e^2$ values as shown in Equation 1 given below.

$$SINR_i^{MMSE} = \frac{1}{\tilde{\sigma}_i^2} - 1,$$

$$\tilde{\sigma}_i^2 = \left[\left(I + \frac{1}{\tilde{\sigma}_e^2}\begin{pmatrix} P_c^{(signal)}P_1^H \tilde{H}_1^H \tilde{H}_1 P_1 + \\ P_c^{(interference)}P_2^H \tilde{H}_2^H \tilde{H}_2 P_2 \end{pmatrix}\right)^{-1}\right]_{i,i}$$

Equation 1

In Equation 1, i denotes an index of transport layer and has a value from 1 to r with regard to UE-assuming RI=r. Additionally, $P_c^{(signal)}$ and $P_c^{(interference)}$ are values determined from power correction parameter to be applied respectively to signal and interference components contained in the CSI process allocation information, and denote power correction values for inducing a channel corresponding to a data channel from a channel estimation value obtained from CSI-RS. In addition, $P_1$ is a precoding matrix assumption value for a signal corresponding to a specific PMI value, $P_2$ denotes a UE assumption value of a precoding matrix to be applied to an interference channel, and I denotes a unit matrix.

Here, a UE assumption value for a precoding matrix to be applied to an interference channel may be set in various manners. In the first manner, the UE assumes a precoding matrix fixed for an interference channel, calculates SINR as shown in Equation 1, and creates RI, PMI, and CQI regarding a signal. Here, the fixed precoding matrix may be a unit matrix or a precoding matrix corresponding to RI=0 and PMI=0. In the second manner, the UE sets a precoding matrix through a certain cycling with regard to time/frequency resources that create RI, PMI and CQI for an interference channel. For example, the UE sets RI=0 and PMI=0 with regard to RB index 0, sets RI=0 and PMI=1 with regard to RB index 1, assumes another precoding matrix by using a certain technique with regard to time and frequency resources, and creates feedback information. In the third manner, the eNB instructs the UE to assume certain RI and PMI with regard to an interference channel, and hence the UE sets a precoding matrix and creates feedback.

Here, RI and PMI set by the eNB may be a specific single value or a set of precoding matrices preferred by the eNB.

In another method for creating feedback information at the UE that is allocated CSI process information, a measurement set allocated to the UE may be {CSI-RS-1, CSI-RS-2, CSI-RS-3} in which CSI-RS-1, CSI-RS-2 and CSI-RS-3 are transmitted from cells 1, 2, and 3, respectively. In addition, the UE may be allocated a single IMR from the eNB and that this IMR reflects interference from cells other than the measurement set. In addition, the UE may be allocated specific CSI process in which CSI-RS-1 is a signal component and also CSI-RS-2, CSI-RS-3 and IMR are set as an interference component.

Similar to the above-discussed first example, the UE having M receiving antennas estimates an N×M channel matrix $\tilde{H}_1$ from the eNB having N transmitting antenna ports through N port CSI-RS-1. Additionally, the UE estimates an interference matrix $\tilde{H}_2$ and $\tilde{H}_3$ through CSI-RS-2 and CSI-RS-3, and also estimates receiving power $\tilde{\sigma}_e^2$ of interference from IMR. Thereafter, considering the estimated channel matrix, interference matrix, and receiving power of interference, the UE creates optimal feedback information RI, PMI, and CQI with regard to a signal and performs a report to the eNB at given timing. For example, when the UE uses an MMSE-IRC receiver, the UE selects optimal RI and PMI and creates a CQI value by calculating SINR of each transport layer from the estimated $\tilde{H}_1$, $\tilde{H}_2$, $\tilde{H}_3$ and $\tilde{\sigma}_e^2$ values as shown in Equation 2 given below.

[Equation 2]

$$SINR_i^{MMSE} = \frac{1}{\tilde{\sigma}_i^2} - 1,$$

$$\tilde{\sigma}_i^2 = \left[\left(I + \frac{1}{\tilde{\sigma}_e^2}\begin{pmatrix} P_c^{(signal)}P_1^H \tilde{H}_1^H \tilde{H}_1 P_1 + \\ P_c^{(interfernece1)}P_2^H \tilde{H}_2^H \tilde{H}_2 P_2 + \\ P_c^{(interfernece2)}P_3^H \tilde{H}_3^H \tilde{H}_3 P_3 \end{pmatrix}\right)^{-1}\right]_{i,i}$$

Equation 2

In Equation 2, i denotes an index of transport layer and has a value from 1 to r with regard to UE-assuming RI=r. Additionally, $P_c^{(signal)}$, $P_c^{(interference1)}$ and $P_c^{(interference2)}$ are values determined from power correction parameter to be applied respectively to signal and interference components contained in the CSI process allocation information, and denote power correction values for inducing a channel corresponding to a data channel from a channel estimation value obtained from CSI-RS. As mentioned above, power correction parameter to be applied to an interference component may be allocated separately for each of CSI-RSs to be considered as an interference component, or set as a single value applied in common to one or more CSI-RSs to be considered as an interference component. In the former case, $P_c^{(interfernece1)}$ and $P_c^{(interfernece2)}$ may have different values. In the latter case, $P_c^{(interfernece1)}$ and $P_c^{(interfernece2)}$ may be set as the same value. In addition, $P_1$, $P_2$, and $P_3$ respectively denote the UE assumption values of a precoding matrix to be applied to signal and interference channels, and I denotes a unit matrix.

Figure 14:
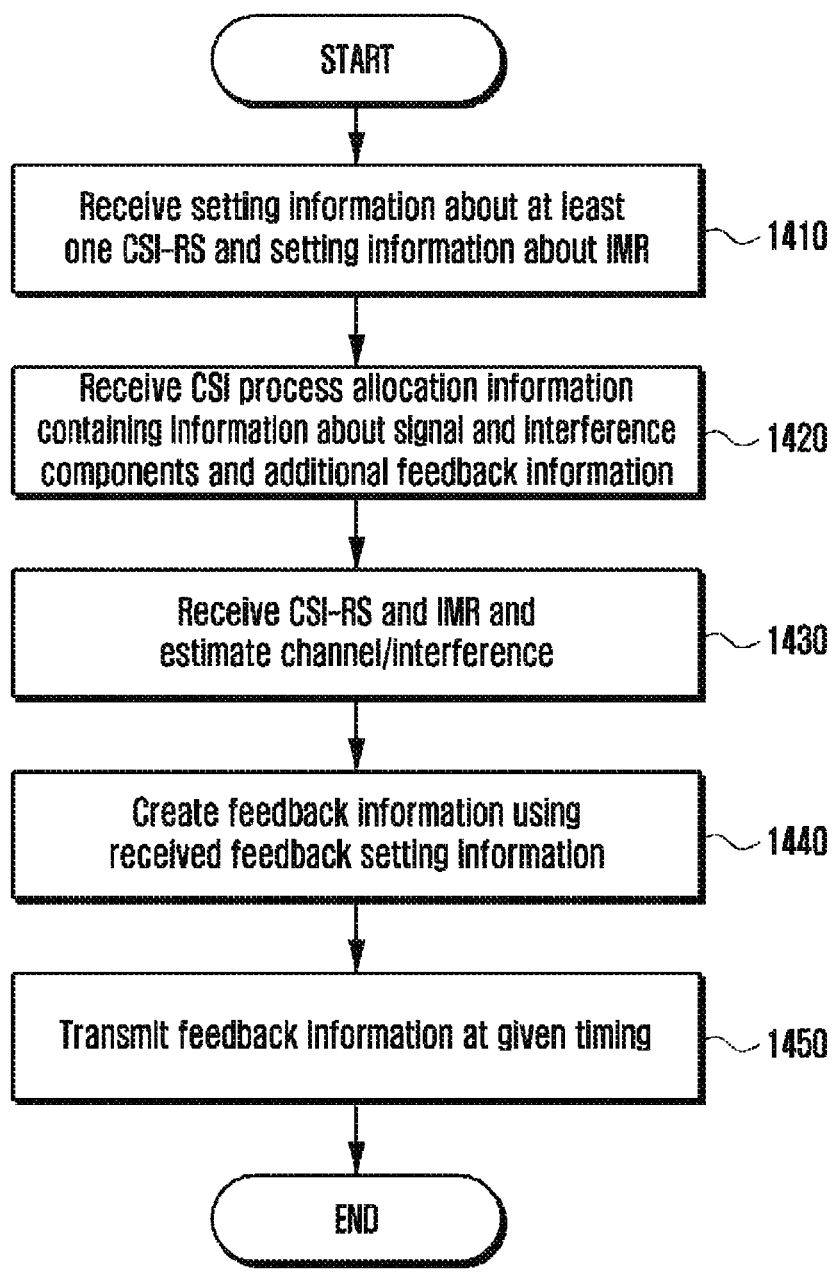
FIG. 14 is a flow diagram illustrating an operation of a UE that creates an interference channel and creates/reports feedback information according to a first embodiment of the present disclosure.

FIG. 14 is a flow diagram illustrating an operation of a UE that creates an interference channel and creates/reports feedback information according to a first embodiment of the present disclosure.

Referring to FIG. 14, at operation 1410, the UE receives, for channel estimation, setting information about at least one CSI-RS and setting information about IMR from the eNB. The received setting information may be CSI-RS allocation information and IMR allocation information as discussed above. Namely, the UE ascertains, totally or partially, the number of antenna ports for each CSI-RS, timing and resource location for transmission of each CSI-RS, sequence information, CRS information of a relevant cell, and the like, through CSI-RS allocation information, and also ascertains transmission timing and resource location for each IMR through IMR allocation information.

Thereafter, at operation 1420, the UE receives, from the eNB, one or more kinds of CSI process allocation information that contains information about signal and interference components and additional feedback information. The received CSI process allocation information may be the CSI process allocation information discussed above in the first embodiment.

Thereafter, the UE estimates a channel and interference at the ascertained resource locations and transmission timings of CSI-RS and IMR at operation 1430, and creates feedback information at operation 1440. These operations 1430 and 1440 correspond to the above-discussed estimation process in Equations 1 and 2 and the creation process after such Equations, respectively. Finally, at operation 1450, the UE reports feedback information to the eNB according to given timing.

Figure 15:
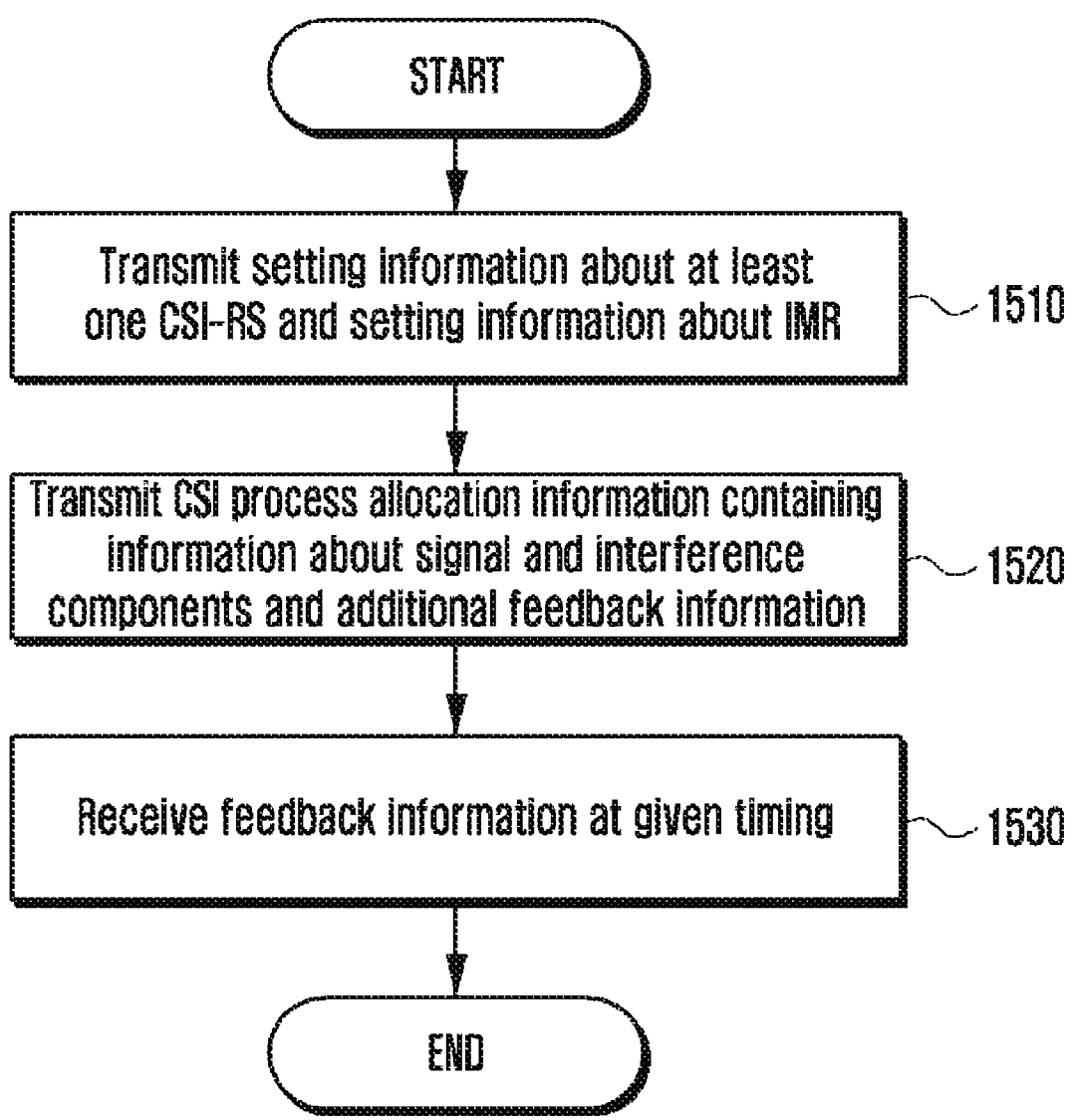
FIG. 15 is a flow diagram illustrating an operation of an enhanced Node B (eNB) according to the first embodiment of the present disclosure.

FIG. 15 is a flow diagram illustrating an operation of an eNB according to the first embodiment of the present disclosure.

Referring to FIG. 15, at operation 1510, the eNB transmits setting information about at least one CSI-RS and setting information about IMR to the UE.

At operation 1520, the eNB transmits, to the UE, CSI process allocation information that contains information about signal and interference components and additional feedback information. Thereafter, operation 1530, the eNB receives, from the UE, feedback information created by the UE based on the setting information and allocation information, and uses the feedback information for determining a channel status between the UE and the eNB.

The second embodiment of this disclosure considers a case in which the UE is allocated CSI-RSs for several cells and one or more IMRs and further different interference states are reflected in respective time resources.

Figure 16:
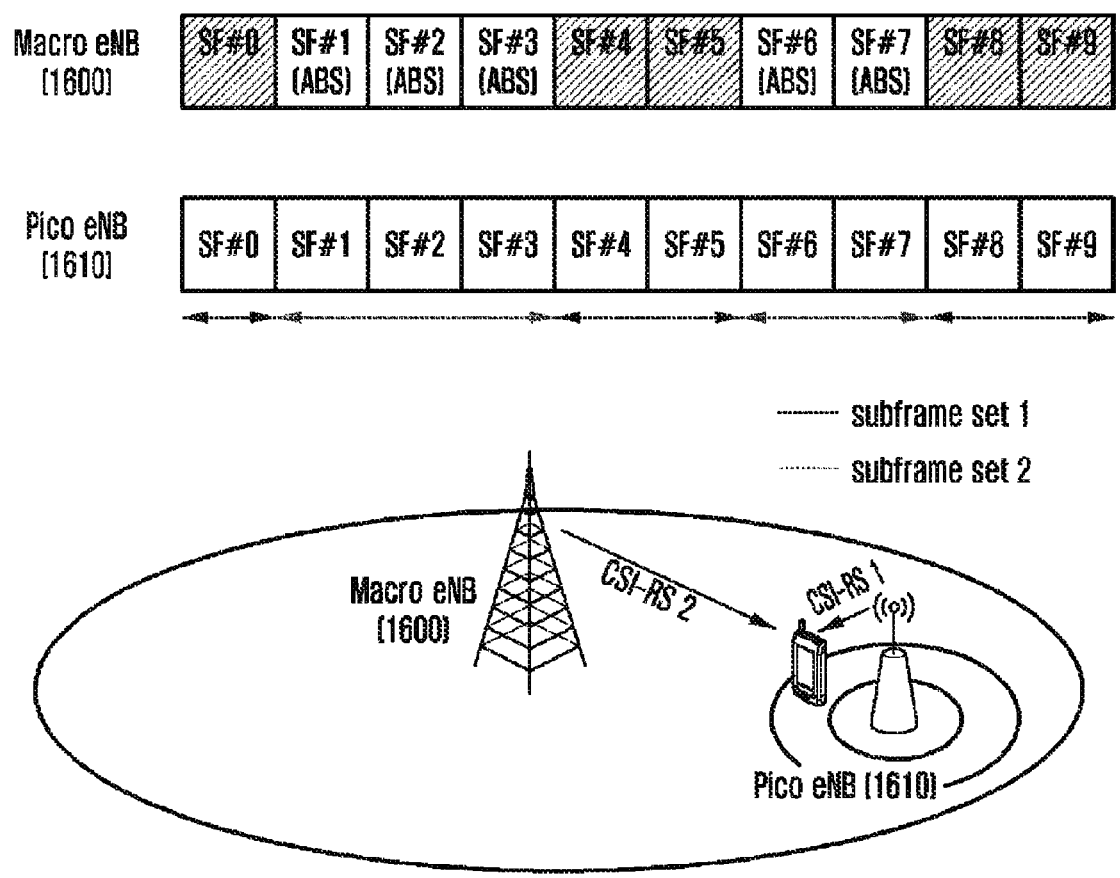
FIG. 16 is a diagram illustrating a pico eNB installed in a region of a macro eNB according to an embodiment of the present disclosure.

FIG. 16 is a diagram illustrating a pico eNB installed in a region of a macro eNB according to an embodiment of the present disclosure.

Referring to FIG. 16, a plurality of pico eNBs 1610 that perform transmission with smaller power may be installed within a region of a macro eNB 1600 that performs transmission with greater power. In this network, the macro eNB 1600 may stop data transmission in specific time resources such that UEs accessing the plurality of pico eNBs 1610 can effectively receive data.

Referring to FIG. 16, in five subframes 0, 4, 5, 8, and 9 among ten subframes, macro and pico eNBs perform data transmission at the same time so that a pico UE may undergo interference from a macro cell. On the contrary, in the other subframes 1, 2, 3, 6, and 7, the macro eNB 1600 stops data transmission, and pico cells only perform data transmission/reception without interference from the macro cell.

A subframe in which the macro cell stops data transmission is referred to as an almost blank subframe (ABS). In such time resources, since interference from the macro eNB 1600 is reduced, UEs accessing pico cells have an excellent channel than in a case of a normal subframe. Therefore, the UE is required to estimate a channel by distinguishing ABS from normal subframes, to create individual feedback information, and to report the created individual feedback information to the eNB. Namely, the eNB should deliver, to the UE, subframe set division information for dividing a subframe set corresponding to ABS and another subframe set corresponding to normal subframes, and also the UE should create and report feedback information in different manners according to subframe sets.

Regarding a case where different interference states are reflected depending on time resources, a method for setting, creating and reporting feedback for CoMP operation at the UE will be described hereinafter.

For example, a measurement set allocated to the UE may be {CSI-RS-1, CSI-RS-2} in which CSI-RS-1 and CSI-RS-2 are transmitted from a pico cell and a macro cell, respectively. In addition, the UE may be allocated a single IMR from the eNB and that this IMR reflects interference from cells other than the measurement set. In addition, the UE may not only be set to create feedback by considering CSI-RS-1 corresponding to a pico cell as a signal component and also considering both an interference matrix estimated from CSI-RS-2 corresponding to a macro cell and interference power measured from IMR as an interference component, but also allocated a subframe set 1 corresponding to ABS and a subframe set 2 having normal subframes.

In this case, the UE should create feedback information about the subframe set 2 corresponding to normal subframes on the assumption that an interference matrix estimated from CSI-RS-2 corresponding to a macro cell is included in interference. However, in time resources of the subframe set 1 corresponding to ABS, the UE should create feedback information by considering only interference of IMR except for an interference matrix of CSI-RS-2.

The UE may use an MMSE-IRC receiver. Regarding a channel matrix $\tilde{H}_1$ estimated through CSI-RS-1, an interference matrix $\tilde{H}_2$ estimated through CSI-RS-2, and receiving power $\tilde{\sigma}_e^2$ of interference estimated from IMR, in the subframe set 1 corresponding to ABS, the UE should calculate SINR of each transport layer as shown in Equation 3 given below by considering $\tilde{\sigma}_e^2$ only as interference without considering the interference matrix $\tilde{H}_2$ corresponding to a macro cell, select optimal RI and PMI for the subframe set 1, and then create and report a CQI value in such a state.

$$SINR_i^{MMSE} = \frac{1}{\tilde{\sigma}_i^2} - 1, \qquad \text{Equation 3}$$

$$\tilde{\sigma}_i^2 = \left[\left(I + \frac{1}{\tilde{\sigma}_e^2}\left(P_c^{(signal)} P_1^H \tilde{H}_1^H \tilde{H}_1 P_1\right)\right)^{-1}\right]_{i,i}$$

On the contrary, in the normal subframe set 2 in which a macro cell acts as interference, the UE should calculate SINR of each transport layer as shown in Equation 4 given below by considering the interference matrix $\tilde{H}_2$ corresponding to the macro cell together with $\tilde{\sigma}_e^2$, select optimal RI and PMI for the subframe set 2, and then create and report a CQI value in such a state.

$$SINR_i^{MMSE} = \frac{1}{\tilde{\sigma}_i^2} - 1, \qquad \text{Equation 4}$$

$$\tilde{\sigma}_i^2 = \left[\left(I + \frac{1}{\tilde{\sigma}_e^2}\left(\begin{array}{c} P_c^{(signal)} P_1^H \tilde{H}_1^H \tilde{H}_1 P_1 + \\ P_c^{(interfernece)} P_2^H \tilde{H}_2^H \tilde{H}_2 P_2 \end{array}\right)\right)^{-1}\right]_{i,i}$$

Namely, although the UE is set to estimate an interference matrix from one or more CSI-RSs and then create feedback information, a method for reflecting interference is varied with regard to respective subframe sets, depending on whether such CSI-RSs have specific CSI-RS corresponding to a macro cell and further depending on which CSI-RS corresponds to a macro cell. As a result, a method for creating feedback is also varied.

As discussed above, a method for setting the UE to create feedback by reflecting different interferences according to respective subframe sets and the operation of the UE according to such setting are considered. As the first method related to this, the eNB may insert CSI-RSs corresponding to interference components for respective subframe sets into CSI process allocation information while allocating a CSI process to the UE. In this method, CSI process information regarding CSI-RS and IMR combinations corresponding to signal and interference states that need to be reported to the eNB by the UE may be formed as follows in a case subframe sets reflecting different interference states are set to UEs.

CSI process allocation information:
   CSI process index
   Signal component information: CSI-RS index information corresponding to signal
   Interference component information
     IMR index information for measuring interference power
     Regarding subframe set 1
       One or more CSI-RS index information for measuring interference matrix
     Regarding subframe set 2
       One or more CSI-RS index information for measuring interference matrix
   Power correction parameter to be applied to signal component
   Power correction parameter to be applied to interference component
   Periodic feedback information (feedback mode, feedback timing, and the like)
   Non-periodic feedback information (feedback mode, and the like)

The above CSI process allocation information may be allocated as much as the number of combinations of signal and interference that need to be allocated to a specific UE on the network, and may contain all or part of the above listed information. Further, the CSI process allocation information is formed to reflect different interference states in respective subframe sets by inserting separate CSI-RS setting information into respective subframe sets with regard to an interference component. The above example is based on the assumption that the UE has two subframe sets. This disclosure is, however, not limited to the above example and can be extended to other cases of having three or more subframe sets. In addition, power correction parameter to be applied to an interference component contained in each CSI process may be allocated separately for one or more CSI-RSs to be used for measuring an interference matrix, or set as a single value applied in common to one or more CSI-RSs to be used for measuring an interference matrix.

Now, a method for creating feedback information at the UE that is allocated the above CSI process information will be described. CSI-RS-1 and CSI-RS-2 are transmitted from a pico cell and a macro cell, respectively. The UE is allocated a single IMR from the eNB, and this IMR reflects interference from cells other than a measurement set. In addition, the UE is allocated two subframe sets which contain ABS and normal subframes, respectively. If the UE is allocated specific CSI process in which CSI-RS-1 is a signal component, in which CSI-RS-2 and IMR are set as an interference component for the subframe set 1, and in which IMR only is contained as an interference component for the subframe set 2, the UE follows the feedback creation method of Equation 4 when creating feedback for the subframe set 1, and follows the feedback creation method of Equation 3 when creating feedback for the subframe set 2.

As the second method for setting the UE to create feedback by reflecting different interferences according to respective subframe sets, the eNB may add bit information while allocating a CSI process to the UE and also inserting CSI-RSs corresponding to interference components into CSI process allocation information. This bit information indicates whether each CSI-RS will be contained as interference in each subframe set. In this method, CSI process information regarding CSI-RS and IMR combinations corresponding to signal and interference states that need to be reported to the eNB by the UE may be formed as follows in a case subframe sets reflecting different interference states are set to UEs.

CSI process allocation information:
   CSI process index
   Signal component information: CSI-RS index information
   Interference component information
     IMR index information for measuring interference power
     One or more CSI-RS index information for measuring interference matrix
       Bit information about whether to apply regarding subframe set 2 (or 1) of each CSI-RS
   Power correction parameter to be applied to signal component
   Power correction parameter to be applied to interference component
   Periodic feedback information (feedback mode, feedback timing, and the like)
   Non-periodic feedback information (feedback mode, and the like)

The above CSI process allocation information may be allocated as much as the number of combinations of signal and interference that need to be allocated to a specific UE on the network, and may contain all or part of the above listed information. The CSI process allocation information further contain bit information that indicates whether each CSI-RS contained in an interference component is applied as interference to specific subframe set. For example, bit information having one bit may be represented as 0 or 1 to indicate whether to be contained in a specific subframe set. In this example, all CSI-RSs may be contained as interference in any subframe set other than the specific subframe set. In another example, such bit information may have bits corresponding to the number of subframe sets so as to indicate whether each CSI-RS will be applied as interference to each subframe set. In addition, power correction parameter to be applied to an interference component contained in each CSI process may be allocated separately for one or more CSI-RSs to be used for measuring an interference matrix, or set as a single value applied in common to one or more CSI-RSs to be used for measuring an interference matrix.

Figure 17:
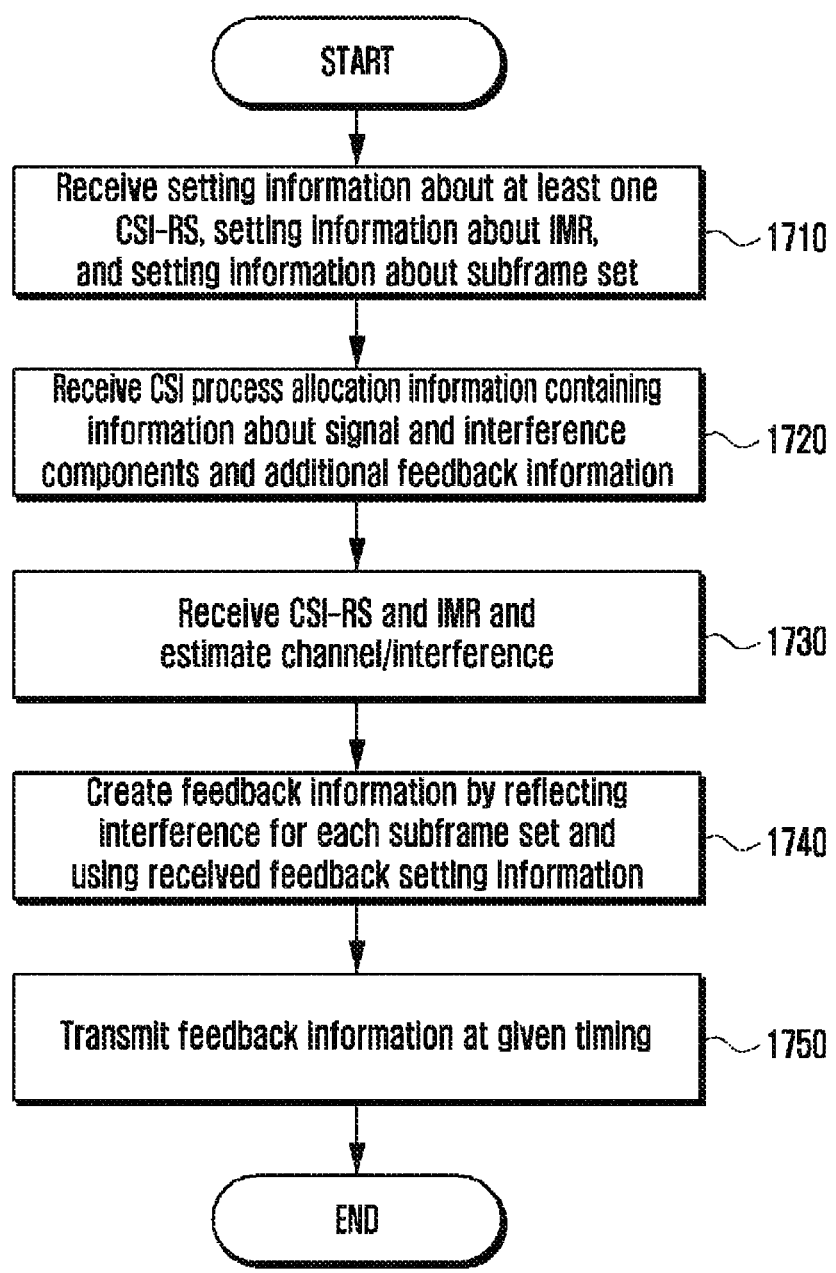
FIG. 17 is a flow diagram illustrating an operation of a UE that creates an interference channel and creates/reports feedback information according to a second embodiment of the present disclosure.

FIG. 17 is a flow diagram illustrating an operation of a UE that creates an interference channel and creates/reports feedback information according to a second embodiment of the present disclosure.

Referring to FIG. 17, at operation 1710, the UE receives, for channel estimation, setting information about at least one CSI-RS, setting information about IMR, and setting information about a subframe set corresponding to different interference states from the eNB. The received setting information may be CSI-RS allocation information and IMR allocation information as discussed above. Thereafter, at operation 1720, the UE receives, from the eNB, one or more kinds of CSI process allocation information that contains information about signal and interference components and additional feedback information. The received CSI process allocation information may be one of examples of the CSI process allocation information discussed above in the second embodiment. Thereafter, the UE estimates a channel and interference at allocated resource locations and transmission timings of CSI-RS and IMR at operation 1730, and creates feedback information according to a method defined for each subframe set at operation 1740. Finally, at operation 1750, the UE reports feedback information to the eNB according to given timing.

Figure 18:
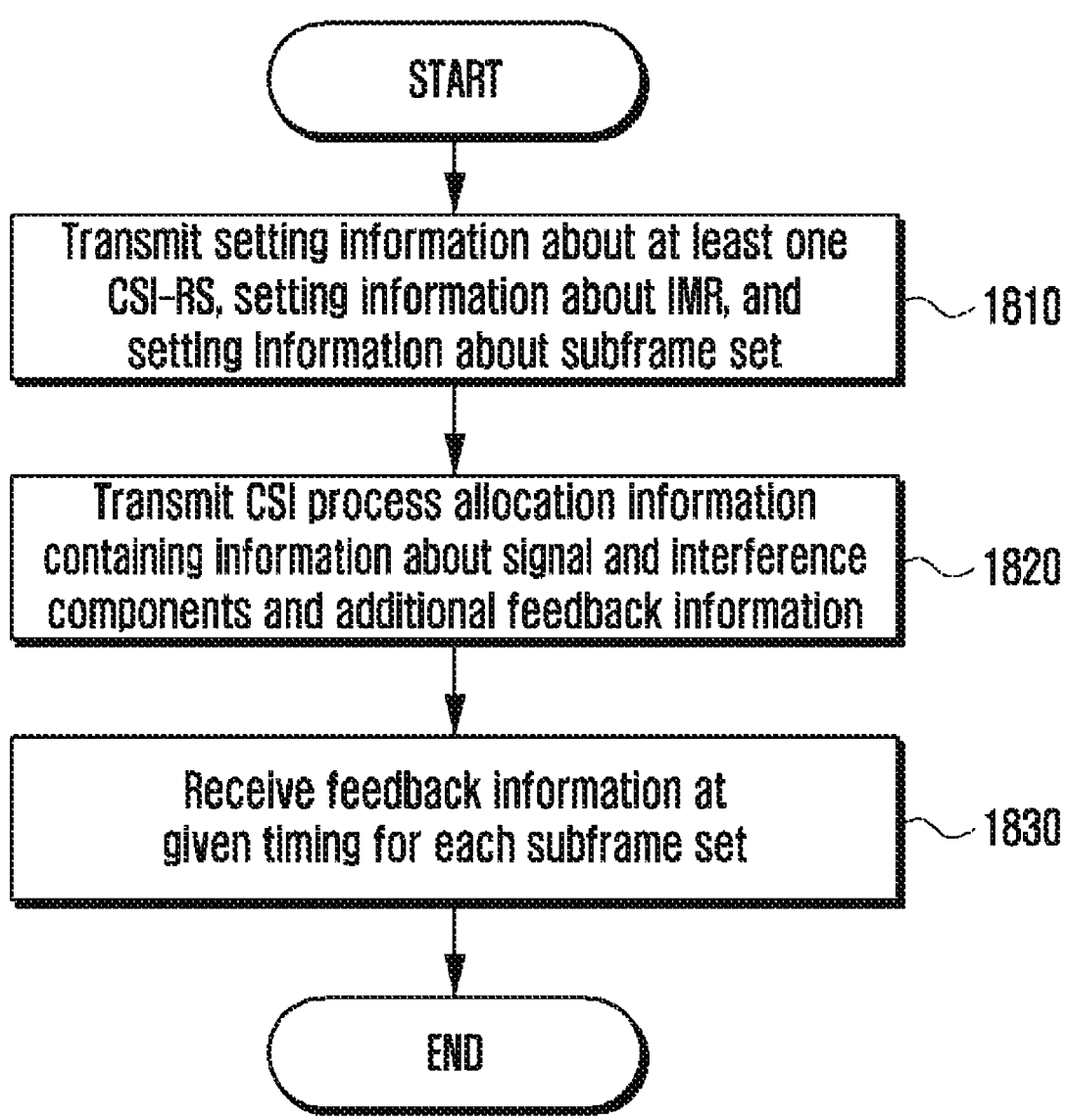
FIG. 18 is a flow diagram illustrating an operation of an eNB according to the second embodiment of the present disclosure.

FIG. 18 is a flow diagram illustrating an operation of an eNB according to the second embodiment of the present disclosure.

Referring to FIG. 18, at operation 1810, the eNB transmits setting information about at least one CSI-RS, setting information about IMR, and setting information about a subframe set corresponding to different interference states to a UE.

At operation 1820, the eNB transmits, to the UE, CSI process allocation information that contains information about signal and interference components and additional feedback information. Thereafter, operation 1830, the eNB receives, from the UE, feedback information at timing defined for each subframe set, and uses the feedback information for determining a channel status between the UE and the eNB for each subframe set.

Figure 19:
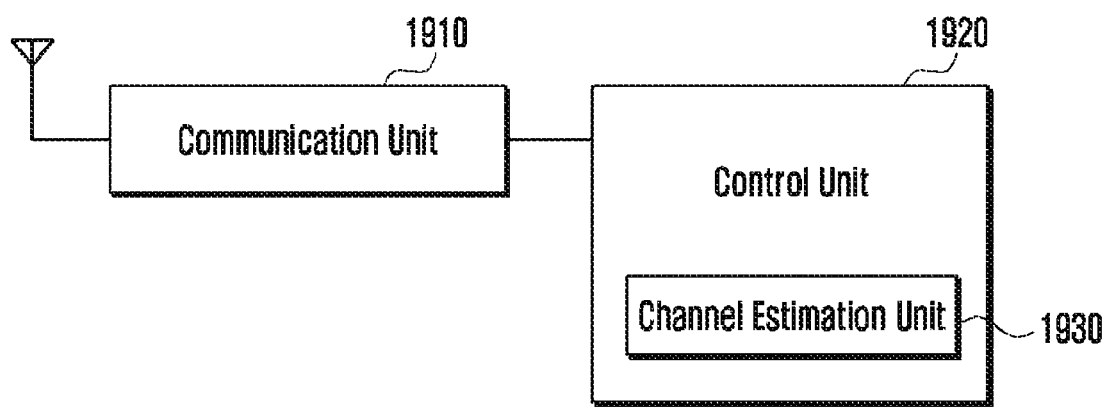
FIG. 19 is a block diagram illustrating a configuration of a UE according to an embodiment of the present disclosure.

FIG. 19 is a block diagram illustrating a configuration of a UE according to an embodiment of the present disclosure.

Referring to FIG. 19, the UE is configured to include a communication unit 1910 and a control unit 1920.

The communication unit 1910 performs a function to transmit or receive a reference signal, a control signal, and data to or from any external entity. More particularly, the communication unit 1910 may transmit channel information for CoMP transmission to the central control apparatus under the control of the control unit 1920, and also receive CSI-RS and IMR setting information, CSI process allocation information, and CSI-RS depending on such setting information and allocation information from the eNB.

The control unit 1920 controls the state and operation of all elements of the UE. More particularly, the control unit 1920 may select feedback information for cooperative communication according to information currently shared between the UE and a cell, and feeds back channel information about a selected cell to the central control apparatus. For this, the control unit 1920 includes a channel estimation unit 1930.

The channel estimation unit 1930 determines necessary feedback information through information related to a measurement set received from the central control apparatus, and then estimates a signal and interference by using received CSI-RS and IMR. Additionally, the channel estimation unit 1930 may report CoMP-related channel information to the eNB and the central control apparatus by controlling the communication unit 1910.

Although the UE is described herein as being formed of the communication unit 1910 and the control unit 1920, this is not to be construed as a limitation. Namely, the UE may further include a great variety of elements depending on inherent or selected functions thereof. For example, the UE may include a display unit for visually offering any information, such as a state of the UE, an input unit for creating an input signal based on user's manipulations, a memory unit for storing data, and the like.

Figure 20:
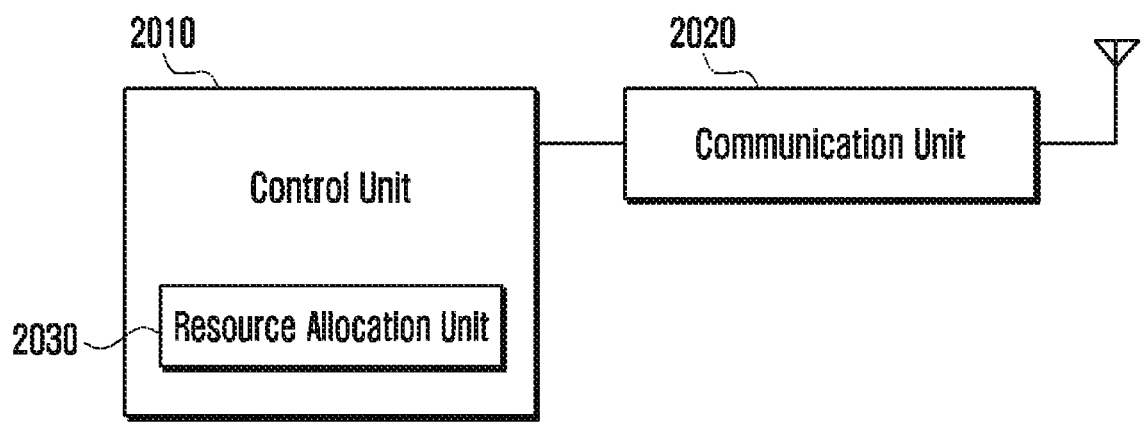
FIG. 20 is a block diagram illustrating a configuration of a central control apparatus according to an embodiment of the present disclosure.

FIG. 20 is a block diagram illustrating a configuration of a central control apparatus according to an embodiment of the present disclosure.

Referring to FIG. 20, the central control apparatus is configured to include a control unit 2010 and a communication unit 2020.

The control unit 2010 controls the state and operation of all elements of the central control apparatus. More particularly, in order to assist channel estimation at the UE, the control unit 2010 allocates CSI-RS and IMR for each cell to respective resources. For this, the control unit 2010 includes a resource allocation unit 2030.

The resource allocation unit 2030 allocates CSI-RS to resources such that the UE can estimate a channel for each cell, and then controls the communication unit 2020 to transmit CSI-RS using such resources. The resources allocated for each cell correspond to CSI-RS for channel estimation in each cell. In addition, suitable IMR is defined for each cell such that interference can be favorably reflected through such IMR.

The communication unit 2020 performs a function to transmit or receive a reference signal, control information, and data to or from the UE or a relevant cell. More particularly, the communication unit 2020 transmits CSI-RS and IMR to the UE through resources allocated under the control of the control unit 2010, and also receives feedback regarding channel information from the UE.

Third Embodiment

Normally, a mobile communication system has been developed for providing a voice service and ensuring user's activity. The mobile communication system gradually expands its field to a data service as well as a voice service and now reaches a level capable of providing a high-speed data service. However, due to resource shortages and users' demands for higher-speed services, a more enhanced mobile communication system is still required.

In 3GPP, LTE-A is technology that realizes a high-speed packet-based communication having the maximum transmission rate of about 1 Gbps. LTE-A adopts a scheme for increasing the number of cells accessible by a UE but for transmitting, at a primary serving cell (PCell) only, feedback that occurs at each cell. Additionally, in LTE Rel-10 (LTE-A), all cells extended to the UE have the same duplex structure. Therefore, all cells may have an FDD structure or have a TDD structure. This TDD structure may be a static TDD structure in which UL-DL setting is maintained, or may be a dynamic TDD structure in which UL-DL setting is changed by system information or a higher-layer signal or a downlink common control channel.

When a single cell controlled by an eNB has an FDD structure and also when a single frequency band is added, the added frequency band is easy to apply a TDD structure. The reason is that two different frequency bands are required between DL and UL so as to use FDD.

Therefore, in LTE Rel-12, a duplex structure of cells extended to the UE may be an FDD structure or a TDD structure. In this case, if the UE has the ability to increase the number of cells even in uplink, it is possible to transmit feedback in a plurality of uplinks. If PCell is a TDD structure when different cells have different duplex structures, uplink subframe exists partially. Therefore, if a secondary serving cell (SCell) is an FDD structure, the feedback transmission in the SCell may reduce feedback timing or block the concentration of feedback to the PCell by dispersing feedback to several cells. Therefore, when the SCell is set to transmit an uplink control channel at any cell other than the PCell, a scheme for maintaining the data transmission at another SCell is required.

The present disclosure proposes a method for transmitting control information through an uplink control channel in a carrier aggregation system and also proposes an apparatus for implementing the method. Through this, when the eNB reconfigures the uplink control information transmission of specific SCells from a control channel of the PCell to a control channel of another SCell, a method and an apparatus for allowing the UE to transmit the uplink control information without resource conflict of a control channel in the uplink control information transmission.

Hereinafter, preferred embodiments of the present disclosure will be described with reference to the accompanying drawings. In this disclosure, well known functions or structures may not be described or illustrated further to avoid obscuring the subject matter of the present disclosure. Additionally, the terms used herein are defined in view of functions in this disclosure and may be varied according to a user or operator's intention or custom. Therefore, such a definition should be made based on the contents of this disclosure.

Although the LTE system and the LTE-A system are described in this disclosure, the present disclosure may be applied, without special adjustments, to any other communication system to which the eNB scheduling is applied.

An OFDM transmission scheme is to transmit data by using multi-carrier. This is a sort of multi-carrier modulation schemes for parallelizing symbol sequences entered in series and modulating them to a plurality of multi-carriers, i.e., sub-carrier channels, with an inter-orthogonal relationship.

In the OFDM scheme, a modulation signal is located on a two-dimensional resource formed of time and frequency. Resources on the time axis are formed of different OFDM symbols which are orthogonal to each other. Resources on the frequency axis are formed of different subcarriers which are also orthogonal to each other. Namely, in the OFDM scheme, if a specific OFDM symbol is designated on the time axis and if a specific subcarrier is designated on the frequency axis, a single minimum unit resource can be indicated. This is referred to as a RE. Since different REs have the attribute of being orthogonal to each other even though passing a frequency selective channel, signals transmitted with different REs may be received by a receiving end without any mutual interference.

A physical channel is a channel of a physical layer that transmits a modulation symbol modulated from a single or more encoded bit sequences. In an OFDMA system, a plurality of physical channels are configured and transmitted according to the use of transmitting information sequences or a receiver. A transmitter and a receiver should promise in advance which RE will be allocated to a single physical channel to be transmitted. This rule is referred to as mapping.

In the OFDM communication system, a downlink bandwidth is formed of a plurality of RBs, and each physical RB (PRB) may be formed of twelve subcarriers arranged along the frequency axis and fourteen or twelve OFDM symbols arranged along the time axis. Here, the PRB is a basic unit of resource allocation.

An RS is received from the eNB and allows the UE to estimate a channel. In the LTE communication system, a common RS (CRS) and a DMRS, as one of dedicated reference signals, are included.

A CRS is a reference signal transmitted over the entire downlink band and can be received by every UE. A CRS is used for channel estimation, feedback information configuration of the UE, or demodulation of a control channel and a data channel. A DMRS is also a reference signal transmitted over the entire downlink band and used for data channel demodulation and channel estimation of a specific UE. However, contrary to a CRS, a DMRS is not used for feedback information configuration. Therefore, a DMRS is transmitted through PRB resources to be scheduled by UE.

On the time axis, a subframe is formed of two slots of 0.5 msec, namely the first slot and the second slot. A PDCCH which is a control channel region, a PDSCH which is a data channel region, and an enhanced PDCCH (ePDCCH) which is located in the data channel region are transmitted in a divided form on the time axis. This is for receiving and demodulating a control channel signal quickly. Additionally, physical uplink control channel (PUCCH) is located over the entire downlink band, and a single control channel is divided into small units and dispersed over the entire downlink band.

Physical channels of uplink are mainly classified into a PUCCH and a physical uplink shared channel (PUSCH). A response to a downlink data channel and other feedback information are transmitted through a control channel when there is no data channel and transmitted through a data channel when there is a data channel.

Figure 21:
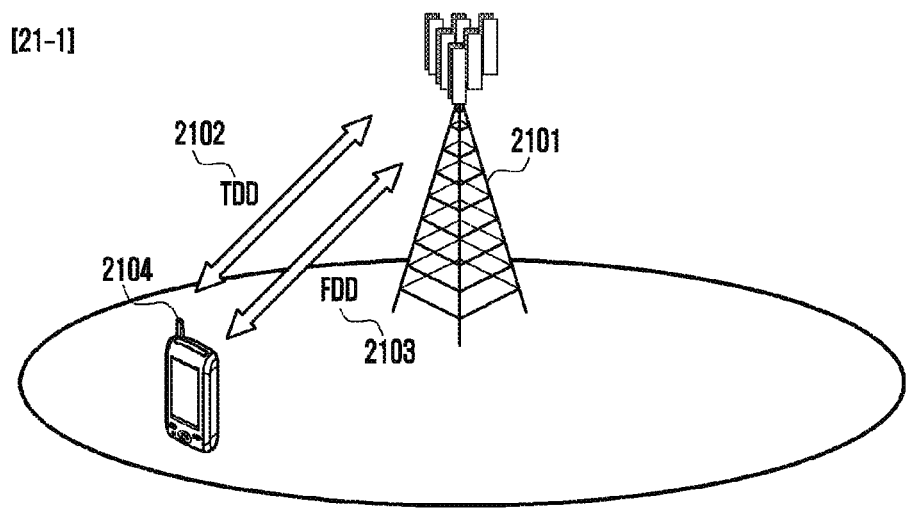
FIG. 21 is a diagram illustrating a communication system according to an embodiment of the present disclosure.
Figure 21:
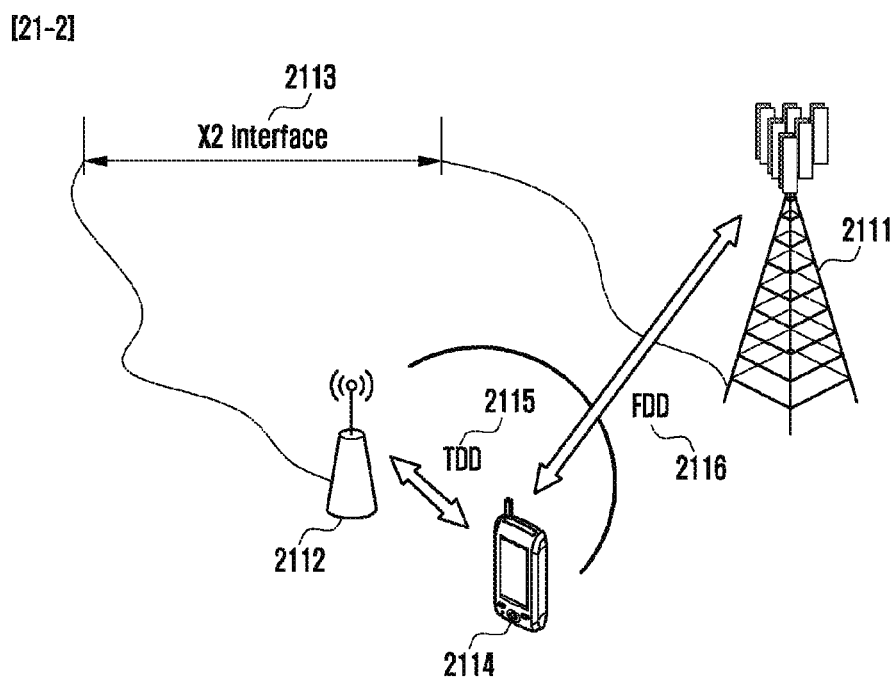

FIG. 21 is a diagram illustrating a communication system according to the present disclosure.

Referring to FIG. 21, part 21-1 shows an example in which a TDD cell 2102 and an FDD cell 2103 coexist within a single eNB 2101 in a network. A UE 2104 transmits or receives data to or from eNB 2101 through the TDD cell 2102 and the FDD cell 2103. The UE 2104 transmits uplink data or control information through PCell or SCell. Namely, if the TDD cell 2102 is PCell, uplink transmission is performed through the TDD cell 2102 or the FDD cell 2103. If the FDD cell 2103 is PCell, uplink transmission is performed through the FDD cell 2103 or the TDD cell 2102. Although a case where cells have different duplex structures is described above, the above discussion may be also applied to another case where cells have the same duplex structure.

Part 21-2 shows an example in which a macro eNB 2111 for offering a wider coverage area and a pico eNB 2112 for increasing data transmission volume are installed in a network. In this case, for transmitting or receiving data to or from the UE 2114, the macro eNB 2111 may use an FDD scheme 2116, and the pico eNB may use a TDD scheme 2115. If the macro eNB 2111 and the pico eNB 2112 have an ideal backhaul network, the UE 2114 can perform uplink transmission through the macro eNB 2111 or the pico eNB 2112 when the macro eNB is a PCell. In this case, a faster X2 communication 2113 between eNBs is possible. On the contrary, even if the macro eNB 2111 and the pico eNB 2112 fail to have an ideal backhaul network, the UE 2114 can perform uplink transmission to the macro eNB and the pico eNB. Although a case where cells have different duplex structures is described above, the above discussion may be also applied to a case where cells have the same duplex structure.

Although a proposed solution of this disclosure will be mainly described with regard to the system in part 21-1, it may be also applied to the system in part 21-2.

The UE capable of performing uplink transmission through two or more uplink carriers reports its capability to the macro or pico eNB. The UE may perform control information transmission using PUCCH through two or more uplink carriers directly without instructions of the macro or pico eNB. Alternatively, after the macro or pico eNB instructs the UE to perform control information transmission using PUCCH through two or more uplink carriers by higher layer signaling, the UE may perform control information transmission using PUCCH through two or more uplink carriers.

Figure 22:
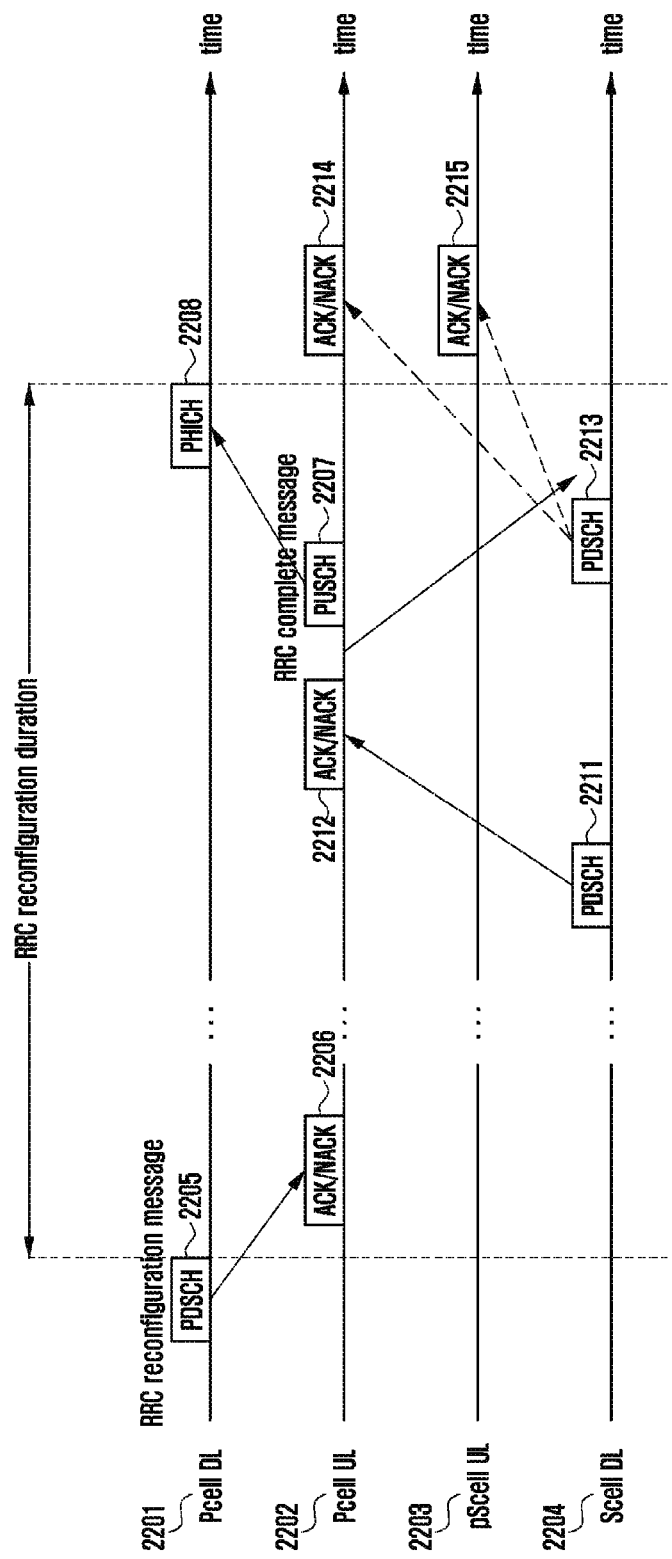
FIG. 22 is a diagram illustrating a process in which an eNB reconfigures a physical uplink control channel (PUCCH) transmission cell of a UE from primary serving cell (PCell) to primary secondary serving cell (pSCell) according to an embodiment of the present disclosure.

FIG. 22 is a diagram illustrating a process in which an eNB reconfigures a PUCCH transmission cell of a UE from a PCell to a primary secondary cell (pSCell) according to an embodiment of the present disclosure. Although FIG. 22 shows a process of reconfiguring a PUCCH transmission cell from the PCell to the pSCell, this process may be also applied to another case of reconfiguring a PUCCH transmission cell from the pSCell to the PCell.

Referring to FIG. 22, the UE capable of carrier aggregation performs initial access to the PCell and then adds the SCell through higher layer signaling. When PDSCH is transmitted at all cells including the PCell and the SCell, the UE transmits hybrid acknowledgement/non-acknowledgement (HARQ-ACK/NACK, or simply referred to as HARQ-ACK or A/N) at the PCell. Thereafter, the eNB may reconfigure to transmit HARQ-ACK on PUCCH of the SCell for offloading of PUCCH. At this time, the SCell configured for the UE to transmit control information on PUCCH may be referred to as the pSCell. As shown in FIG. 22, the UE which transmits control information of the SCell at the PCell using PDCCH may be reconfigured to transmit the control information using PUCCH of the pSCell. Now, a process of performing control information transmission using PUCCH with regard to data transmission using PDSCH of the SCell will be described. Hereinafter, uplink control information (UCI) or control information may include HARQ-ACK and/or CSI.

FIG. 22 separately depicts downlink transmission 2201 and uplink transmission 2202 of the PCell, and this may be applied to an FDD scheme or a TDD scheme. In addition, depicted are uplink transmission 2203 of the pSCell and downlink transmission 2204 of the SCell to be reconfigured to transmit control information using PUCCH at the pSCell when transmission of control information on PUCCH is reconfigured from the PCell to the pSCell. This may be also applied to an FDD scheme or a TDD scheme.

At the outset, the eNB transmits an RRC reconfiguration message 2205, which is a higher-layer signal, to the UE at the PCell such that control information may be transmitted on PUCCH of the pSCell. At this time, the RRS reconfiguration message 2205 may contain an indicator that indicates a cell, including the PCell, having to transmit control information using PUCCH at the PCell, or index of such a cell. Similarly, the RRS reconfiguration message 2205 may contain an indicator that indicates a cell having to transmit control information using PUCCH at the pSCell, or index of such a cell.

The UE transmits HARQ-ACK 2206 in response to PDSCH 2205 containing the RRC reconfiguration message at the PCell. After the UE reconfigures PUCCH, which has been transmitted at the PCell with regard to data of specific SCells, to be transmitted at the pSCell, the UE transmits an RRC complete message 2207 by using PUSCH with a higher-layer signal, and the eNB transmits a response to the RRC complete message by using a PHICH 2208. At this time, before the eNB transmits a response to the RRC complete message by using the PHICH 2208, downlink data transmission may be performed at the SCell 2204. The SCell 2204 is assumed as the SCell that has transmitted control information using PUCCH at the PCell and then transmits control information using PUCCH at the pSCell.

Before RRC reconfiguration is completed at the PCell, a PDSCH 2211 is scheduled on the SCell, and the eNB transmits downlink data. In addition, the UE transmits HARQ-ACK 2212 regarding PDSCH at the PCell, and then retransmitted data is transmitted on PDSCH 2213 of the SCell 2204. Although a case where a PDSCH 2213 transmits retransmitted data is described herein, the same is applied to another case where data transmitted by the PDSCH 2213 is initial transmission. If the UE should transmit HARQ-ACK regarding the PDSCH 2213 before a response to RRC reconfiguration on the PHICH 2208 transmitted by the eNB at the PCell is received at the UE, it is not clear whether the UE will transmit a HARQ-ACK at PCell 2214 or at a pSCell 2215. This also affects PUCCH transmission resources to transmit control information.

Therefore, this disclosure provides a method for transmitting HARQ-ACK using PUCCH at the UE without affecting resources for PUCCH transmission in a case of scheduling downlink data transmission using the SCell during reconfiguration for control information transmission using PUCCH of the pSCell and also having to transmitting HARQ-ACK regarding the SCell data after such reconfiguration or in a case of scheduling downlink data transmission using the SCell during reconfiguration for control information transmission using PUCCH of the PCell and also having to transmitting HARQ-ACK regarding the SCell data after such reconfiguration.

In the first embodiment of this disclosure, if there is downlink data on PDSCH scheduled before receiving a response on PHICH regarding the RRC complete message transmitted by a specific SCell, the UE defers HARQ-ACK transmission using PUCCH of the pSCell even after control information transmission for SCells is reconfigured to use the pSCell, and performs HARQ-ACK transmission for PDSCH at the PCell.

PUCCH transmission resources regarding downlink data on PDSCH of the SCell are determined through PDCCH scheduling PDSCH. Additionally, since there is downlink data scheduled before transmitting a response on PHICH regarding the RRC complete message, the eNB performs mapping of PUCCH transmission resources to the PCell by assuming PCell PUCCH transmission of the UE. Therefore, if the UE defers HARQ-ACK transmission using PUCCH of the pSCell and transmits HARQ-ACK for PDSCH to the PCell by using PUCCH, it is possible to use the PCell PUCCH transmission resources configured by the eNB.

Figure 23A:
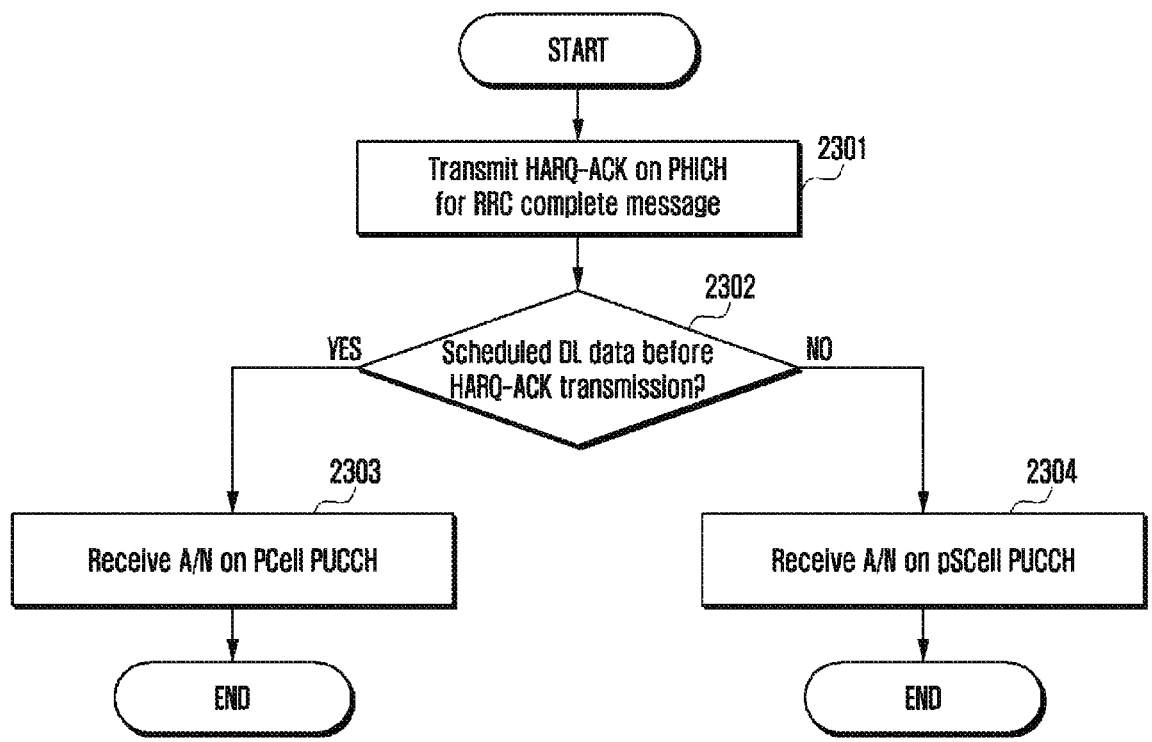
FIG. 23A is a flow diagram illustrating an operation of an eNB according to the first embodiment for maintaining data transmission of secondary serving cell (SCell) when a PUCCH transmission cell is reconfigured according to an embodiment of the present disclosure.

FIG. 23A is a flow diagram illustrating an operation of an eNB according to the first embodiment for maintaining data transmission of an SCell when a PUCCH transmission cell is reconfigured according to an embodiment of the present disclosure.

Referring to FIG. 23A, after performing an RRC reconfiguration by transmitting, to a UE, an RRC reconfiguration message for shifting control information transmission on PUCCH of specific SCells from a PCell to a pSCell, the eNB receives an RRC complete message from the UE and then transmits an HARQ-ACK response on PHICH at operation 2301. At operation 2302, the eNB determines whether there is downlink data scheduled before response transmission on PHICH in response to the RRC complete message transmitted at SCells having to shift control information transmission using PUCCH to the pSCell. If there is scheduled downlink data at operation 2302, the eNB receives, on PUCCH of the PCell at operation 2303, HARQ-ACK for downlink data transmitted from the SCells. Thereafter, HARQ-ACK for downlink data scheduled to be transmitted at the SCell is received using PUCCH of the pSCell. If there is no downlink data scheduled to be transmitted at the SCells before response transmission on PHICH at operation 2302, the eNB receives, on PUCCH of the pSCell at operation 2304, HARQ-ACK for downlink data scheduled to be transmitted at the SCells.

Figure 23B:
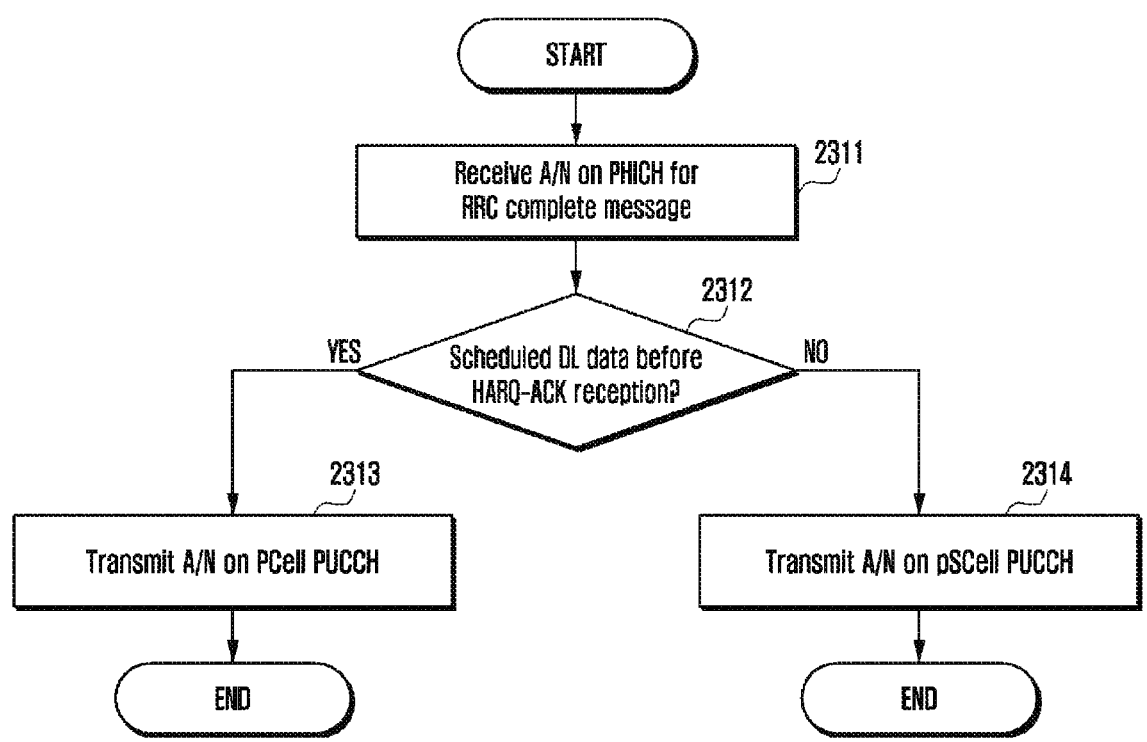
FIG. 23B is a flow diagram illustrating an operation of a UE according to the first embodiment for maintaining data transmission of an SCell when a PUCCH transmission cell is reconfigured according to an embodiment of the present disclosure.

FIG. 23B is a flow diagram illustrating an operation of a UE according to the first embodiment for maintaining data transmission of an SCell when a PUCCH transmission cell is reconfigured according to an embodiment of the present disclosure.

Referring to FIG. 23B, at operation 2311, the UE transmits the RRC complete message in response to an RRC configuration instructions for shifting, from PUCCH of a PCell to PUCCH of a pSCell, control information transmission for downlink data transmitted by the eNB at a specific SCell, and receives an HARQ-ACK response on PHICH. At operation 2312, the UE determines whether there is downlink data scheduled before receiving a response to the RRC complete message at SCells having to shift control information to PUCCH of the pSCell. If there is scheduled downlink data at operation 2312, the UE transmits, on PUCCH of the PCell at operation 2313, HARQ-ACK regarding downlink data transmitted from the SCells. Thereafter, HARQ-ACK for downlink data scheduled to be transmitted at the SCells is transmitted to PUCCH of the pSCell. If there is no downlink data scheduled to be transmitted at the SCells before receiving a response to the RRC complete message on PHICH at operation 2312, the UE transmits, on PUCCH of pSCell at operation 2314, HARQ-ACK for scheduled downlink data at SCells.

As discussed above, if there is downlink data scheduled before receiving a response on PHICH regarding the RRC complete message in the specific SCell that has transmitted HARQ-ACK on PUCCH of the PCell, the UE defers transmission using PUCCH of the pSCell even after HARQ-ACK transmission for the SCells is reconfigured to PUCCH of the pSCell, and HARQ-ACK transmission regarding downlink data is performed using PUCCH of the PCell. Meanwhile, the reverse case is also applicable. Namely, if there is PDSCH scheduled before receiving a response on PHICH regarding the RRC complete message in the specific SCell that has transmitted HARQ-ACK on PUCCH of pSCell, the UE defers transmission using PUCCH of the PCell even after control information transmission for the SCells is reconfigured to PUCCH of the pSCell, and HARQ-ACK transmission regarding downlink data is performed using PUCCH of the pSCell.

In the second embodiment of this disclosure, after control information transmission regarding downlink data reception of the specific SCell is reconfigured to use PUCCH of the pSCell, namely if there is downlink data scheduled before the transmission of a response on PHICH regarding the RRC complete message at the specific SCells having to shift HARQ-ACK transmission to PUCCH of the pSCell even after the UE receives a response on PHICH regarding the RRC complete message, a method for transmitting HARQ-ACK on PUCCH of the pSCell is provided. PUCCH transmission resources regarding PDSCH of the SCell are determined through PDCCH for scheduling PDSCH. Additionally, since a response on PHICH regarding the RRC complete message is not transmitted yet, the eNB performs mapping of PUCCH transmission resources by assuming HARQ-ACK transmission of the UE using PUCCH of the PCell. Therefore, in order to prevent conflict with PUCCH transmission resources of another UE that is already transmitting PUCCH at the pSCell, the eNB should empty PUCCH resources of the pSCell corresponding to PUCCH resource index mapped by assuming HARQ-ACK transmission using PUCCH of the PCell. Through the above procedure, the UE can perform HARQ-ACK transmission using PUCCH of the pSCell without any conflict of PUCCH transmission resources, and it is possible to rapidly offload HARQ-ACK transmission regarding downlink data transmission of specific SCells from the PCell to the pSCell.

Figure 24A:
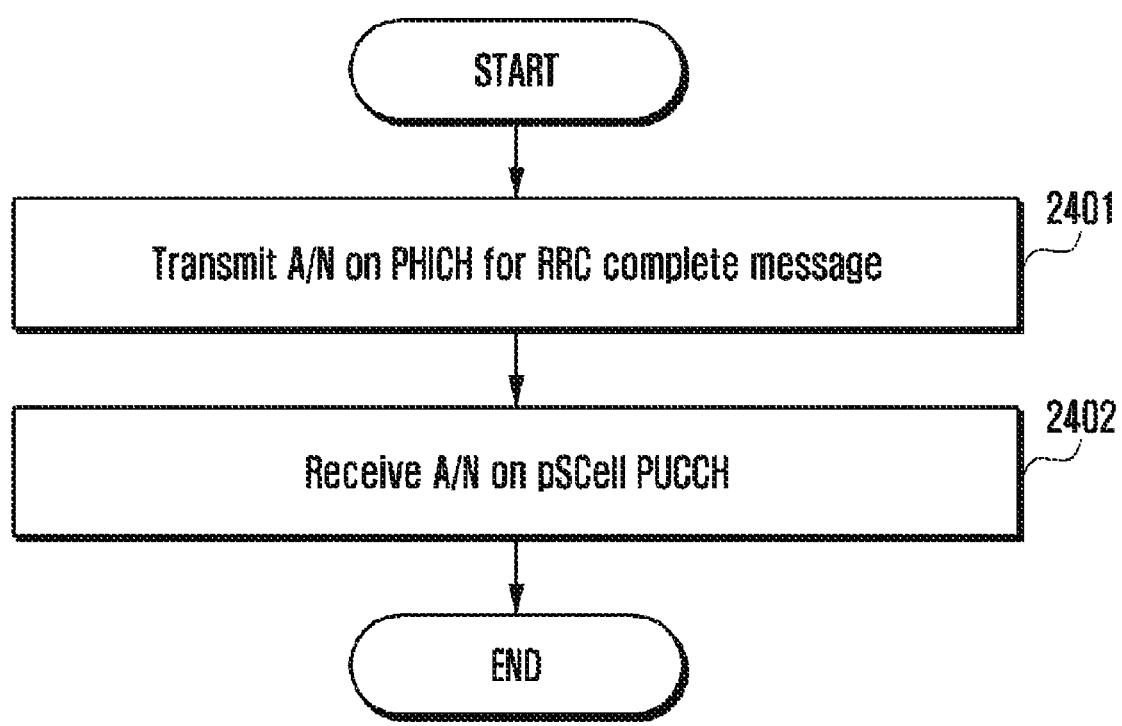
FIG. 24A is a flow diagram illustrating an operation of an eNB according to the second embodiment for maintaining data transmission of an SCell when a PUCCH transmission cell is reconfigured according to an embodiment of the present disclosure.

FIG. 24A is a flow diagram illustrating an operation of an eNB according to the second embodiment for maintaining data transmission of an SCell when a PUCCH transmission cell is reconfigured according to an embodiment of the present disclosure.

Referring to FIG. 24A, the eNB performs an RRC reconfiguration by transmitting, to a UE, an RRC reconfiguration message for shifting control information transmission of specific SCells from PUCCH of the PCell to PUCCH of the pSCell. If data transmission is performed continuously at the SCells, the eNB empties in advance PUCCH resources of the pSCell corresponding to the PCell PUCCH resource index mapped by assuming transmission using PUCCH of the PCell in order to prevent conflict between the pSCell PUCCH transmission resources regarding downlink data before response transmission on PHICH regarding the RRC configuration completion and the pSCell PUCCH transmission resources of another UE that is already transmitting PUCCH at the pSCell. The time to empty the resources may be during or before the RRC reconfiguration. At operation 2401, the eNB receives the RRC complete message from the UE and transmits an HARQ-ACK response on PHICH. At operation 2402, the eNB receives, on PUCCH of pSCell, HARQ-ACK regarding downlink data scheduled before transmitting a response on PHICH at the SCells having to shift control information transmission to PUCCH of the pSCell. Since the eNB empties in advance PUCCH resources at the pSCell corresponding to the PCell PUCCH resource index, a conflict of PUCCH transmission resources may be avoided.

Figure 24B:
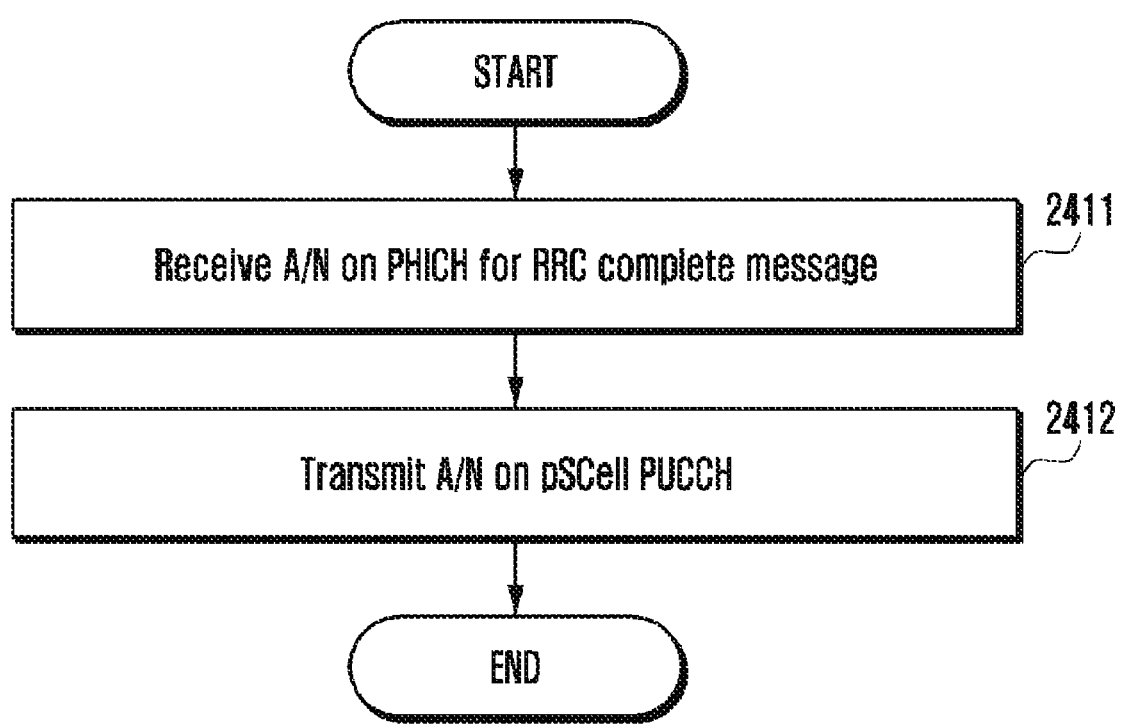
FIG. 24B is a flow diagram illustrating an operation of a UE according to the second embodiment for maintaining data transmission of an SCell when a PUCCH transmission cell is reconfigured according to an embodiment of the present disclosure.

FIG. 24B is a flow diagram illustrating an operation of a UE according to the second embodiment for maintaining data transmission of an SCell when a PUCCH transmission cell is reconfigured according to an embodiment of the present disclosure.

Referring to FIG. 24B, at operation 2411, the UE transmits, to an eNB, an RRC complete message regarding RRC reconfiguration instructions for shifting control information transmission for downlink data at a specific SCell from PUCCH of a PCell to PUCCH of a pSCell, and then receives, from the eNB, an HARQ-ACK response on PHICH. At operation 2412, the UE transmits, to PUCCH of the pSCell, HARQ-ACK regarding downlink data scheduled before receiving a response on PHICH at the SCells having to shift HARQ-ACK transmission. Since the eNB empties in advance PUCCH resources at the pSCell corresponding to the PCell PUCCH resource index, the UE can transmit HARQ-ACK on PUCCH of the pSCell while avoiding a conflict of PUCCH transmission resources.

As discussed above, after control information transmission regarding downlink data reception at a specific SCell which has transmitted HARQ-ACK on PUCCH of the PCell is reconfigured to use the pSCell, namely, even before a response to the RRC complete message is received on PHICH, the UE transmits, on PUCCH of the pSCell, HARQ-ACK for downlink data scheduled at the SCell. Meanwhile, the reverse case is also applicable. Namely, after HARQ-ACK transmission regarding downlink data reception at the specific SCell is reconfigured from PUCCH of the pSCell to PUCCH of the PCell and even before a response to the RRC complete message is received on PHICH, the UE transmits HARQ-ACK regarding downlink data scheduled at the SCell on PUCCH of the PCell. In this case, the eNB should empty in advance PUCCH resources at the PCell corresponding to the pSCell PUCCH resource index such that the UE can transmit HARQ-ACK on PUCCH of the PCell by avoiding a conflict of PUCCH transmission resources.

In the third embodiment of this disclosure, if there is downlink data scheduled before receiving a response on PHICH regarding the RRC complete message at a specific SCell, the UE determines, based on a PDSCH scheduled cell transmitting downlink, a cell in which HARQ-ACK for downlink data is transmitted. Therefore, even though transmission resources of a pSCell are not emptied in advance, it is possible to perform HARQ-ACK transmission on PUCCH of the pSCell without a conflict of PUCCH transmission resources. PUCCH transmission resources for PDSCH of the SCell are determined through PDCCH scheduling PDSCH. Therefore, if downlink data scheduling is performed through DCI being transmitted on PDCCH at the pSCell, the pSCell PDCCH and the pSCell PUCCH transmission resources are one-to-one mapped to each other, and thereby HARQ-ACK transmission on PUCCH of the pSCell can be performed without any conflict. However, if downlink data scheduling is performed at the PCell or at another SCell other than the pSCell, PUCCH transmission resources for downlink data are mapped to PUCCH transmission resources at the PCell. Therefore, HARQ-ACK is transmitted on PUCCH of PCell instead of PUCCH of the pSCell.

Figure 25A:
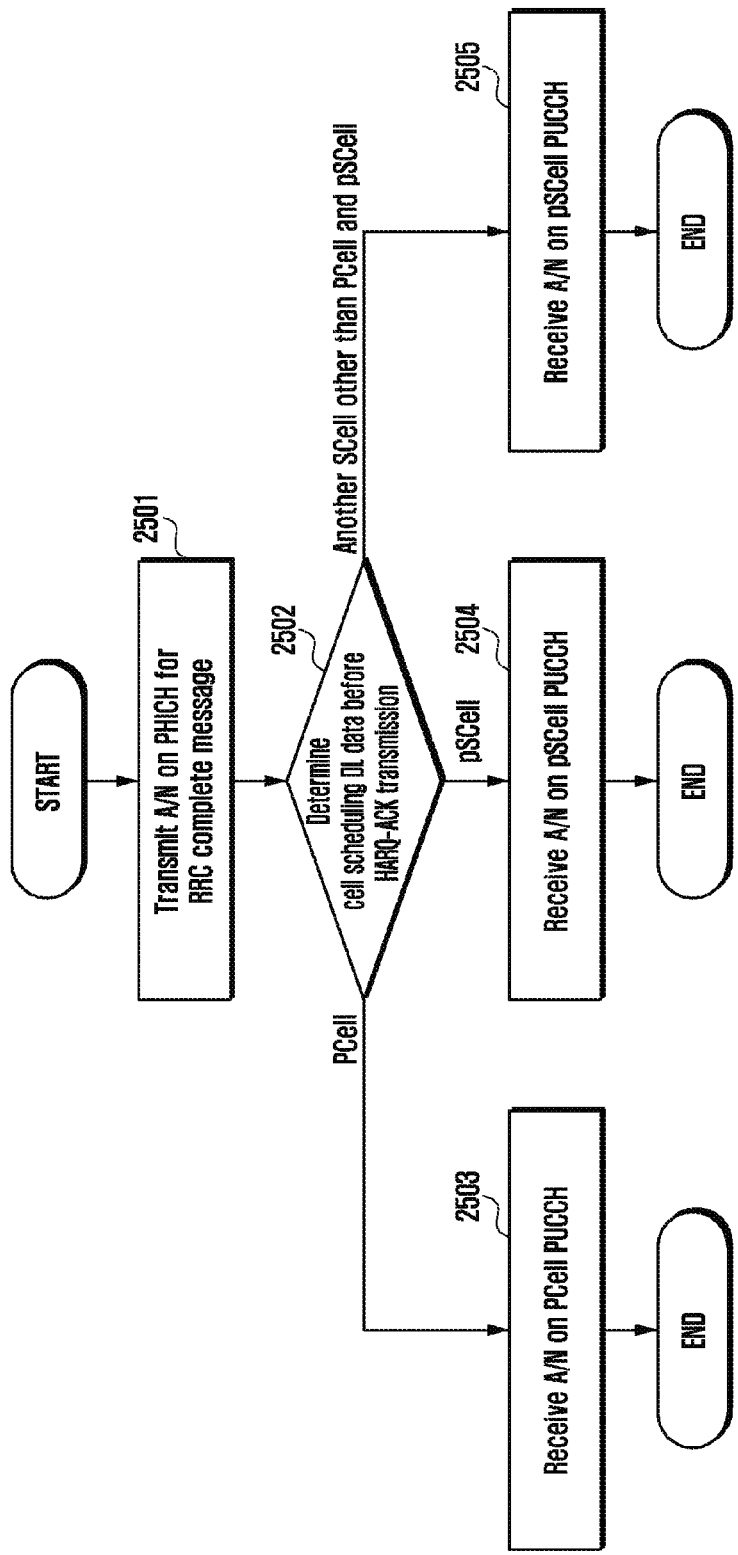
FIG. 25A is a flow diagram illustrating an operation of an eNB according to a third embodiment for maintaining data transmission of an SCell when a PUCCH transmission cell is reconfigured according to an embodiment of the present disclosure.

FIG. 25A is a flow diagram illustrating an operation of an eNB according to a third embodiment for maintaining data transmission of an SCell when a PUCCH transmission cell is reconfigured according to an embodiment of the present disclosure.

Referring to FIG. 25A, the eNB performs an RRC reconfiguration by transmitting, to a UE, an RRC reconfiguration message for shifting control information transmission of specific SCells from PUCCH of a PCell to PUCCH of a pSCell. At operation 2501, the eNB receives the RRC complete message from the UE and transmits an HARQ-ACK response on PHICH to the UE. At operation 2502, the eNB determines which cell schedules downlink data before transmission on PHICH regarding the RRC complete message transmitted at the SCells for shifting control information transmission to PUCCH of the pSCell. Namely, the eNB determines PDCCH of which cell transmits downlink control information for scheduling downlink data on PDSCH of the SCells. If downlink control information is transmitted on PDCCH of the PCell at operation 2502, the eNB receives, on PUCCH of the PCell, at operation 2503, HARQ-ACK regarding downlink data transmitted at the SCells. Thereafter, HARQ-ACK for downlink data scheduled to be transmitted at the SCells is received on PUCCH of the pSCell. If downlink control information is transmitted on PDCCH of the pSCell at operation 2502, the eNB receives, on PUCCH of the pSCell, at operation 2504, HARQ-ACK regarding downlink data scheduled to be transmitted at the SCells. If downlink control information is transmitted on PDCCH of another SCell other than the PCell and the pSCell at operation 2502, the eNB receives, on PUCCH of the PCell, at operation 2505, HARQ-ACK regarding downlink data scheduled to be transmitted at the SCells. Thereafter, HARQ-ACK for downlink data scheduled to be transmitted at the SCells is received on PUCCH of the pSCell.

Figure 25B:
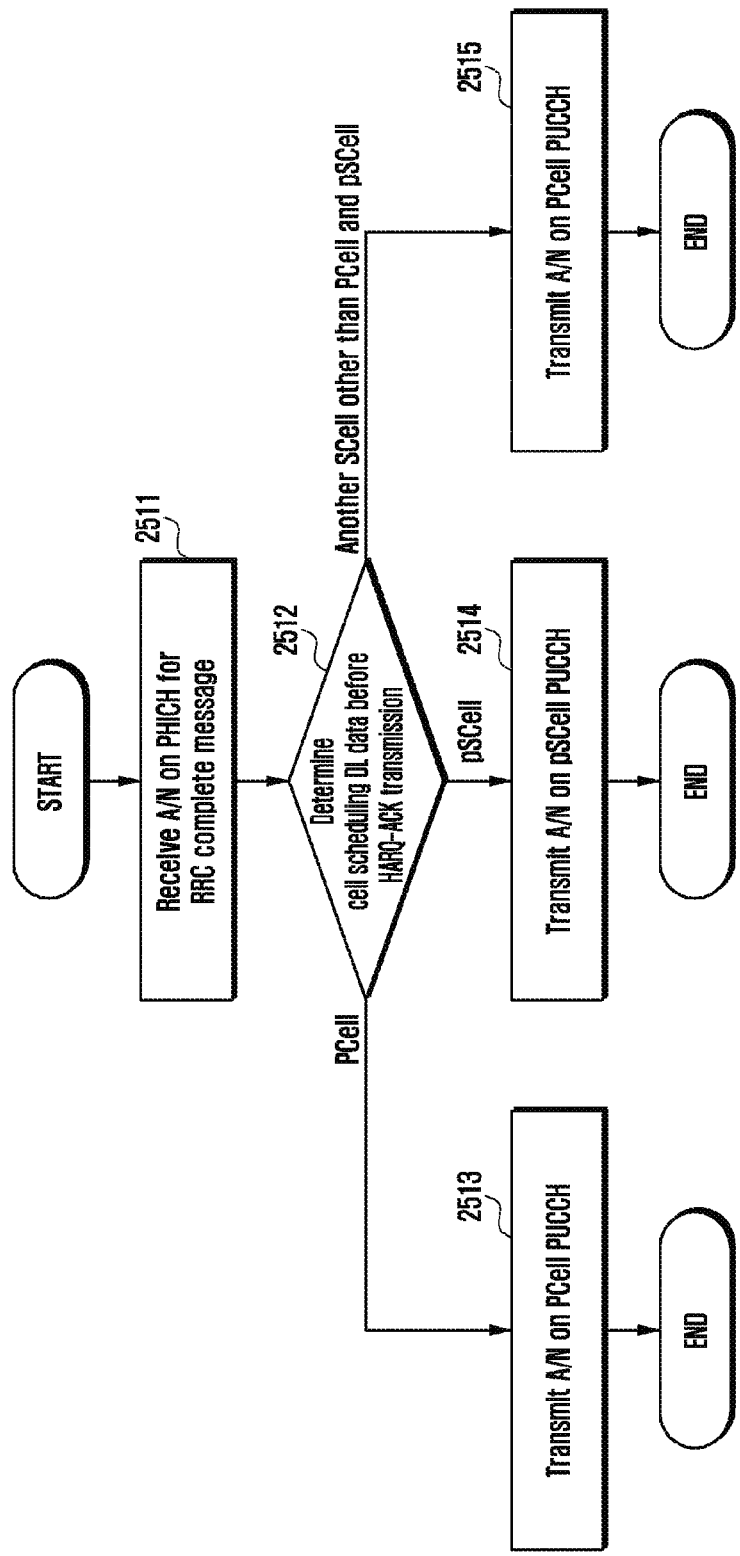
FIG. 25B is a flow diagram illustrating an operation of a UE according to the third embodiment for maintaining data transmission of an SCell when a PUCCH transmission cell is reconfigured according to an embodiment of the present disclosure.

FIG. 25B is a flow diagram illustrating an operation of a UE according to the third embodiment for maintaining data transmission of a SCell when a PUCCH transmission cell is reconfigured according to an embodiment of the present disclosure.

Referring to FIG. 25B, at operation 2511, the UE transmits, to eNB, an RRC complete message regarding RRC reconfiguration instructions for shifting control information transmission for downlink data at a specific SCell from PUCCH of a PCell to PUCCH of a pSCell, and then receives, from the eNB, an HARQ-ACK response on PHICH. At operation 2512, the UE determines which cell schedules downlink data before reception on PHICH regarding the RRC complete message transmitted at SCells for shifting transmission of HARQ-ACK to PUCCH of the pSCell. Namely, the UE determines PDCCH of which cell transmits downlink control information for scheduling downlink data of the SCells. If downlink control information is transmitted on PDCCH of the PCell at operation 2512, the UE transmits, on PUCCH of the PCell, at operation 2513, HARQ-ACK regarding downlink data transmitted at the SCells. Thereafter, HARQ-ACK for downlink data scheduled to be transmitted at the SCells is transmitted on PUCCH of the pSCell. If downlink control information is transmitted on PDCCH of the pSCell at operation 2512, the UE transmits, on PUCCH of the pSCell, at operation 2514, HARQ-ACK regarding downlink data scheduled to be transmitted at the SCells. If downlink control information is transmitted on PDCCH of another the SCell other than the PCell and the pSCell at operation 2512, the UE transmits, on PUCCH of the PCell, at operation 2515, HARQ-ACK regarding downlink data scheduled to be transmitted at the SCells. Thereafter, HARQ-ACK for downlink data scheduled to be transmitted at the SCells is received on PUCCH of the pSCell.

As discussed above, if scheduling for downlink data at the specific SCell for which the UE has transmitted control information on PUCCH of the PCell is performed on downlink control information transmitted on PDCCH of the pSCell, the pSCell PDCCH and the pSCell PUCCH transmission resources are one-to-one mapped to each other, and thereby HARQ-ACK transmission at the pSCell can be performed without any conflict of PUCCH transmission resources. If downlink data scheduling is performed at the PCell or at another SCell other than the pSCell, PUCCH transmission resources for PDCCH are mapped to PUCCH transmission resources at the PCell, and thereby HARQ-ACK can be transmitted on PUCCH of the PCell instead of PUCCH of the pSCell. Meanwhile, the reverse case is also applicable. Namely, if scheduling for downlink data at the specific SCell for which the UE has transmitted control information on PUCCH of the pSCell is performed at the PCell, the PCell PDCCH and the PCell PUCCH transmission resources are one-to-one mapped to each other, and thereby HARQ-ACK transmission at the PCell can be performed without any conflict of PUCCH transmission resources. If such scheduling is performed at the pSCell or at another SCell other than the pSCell, PUCCH transmission resources for PDCCH are mapped to PUCCH transmission resources at the pSCell, and thereby HARQ-ACK can be transmitted on PUCCH of the pSCell instead of PUCCH of PCell.

Figure 26:
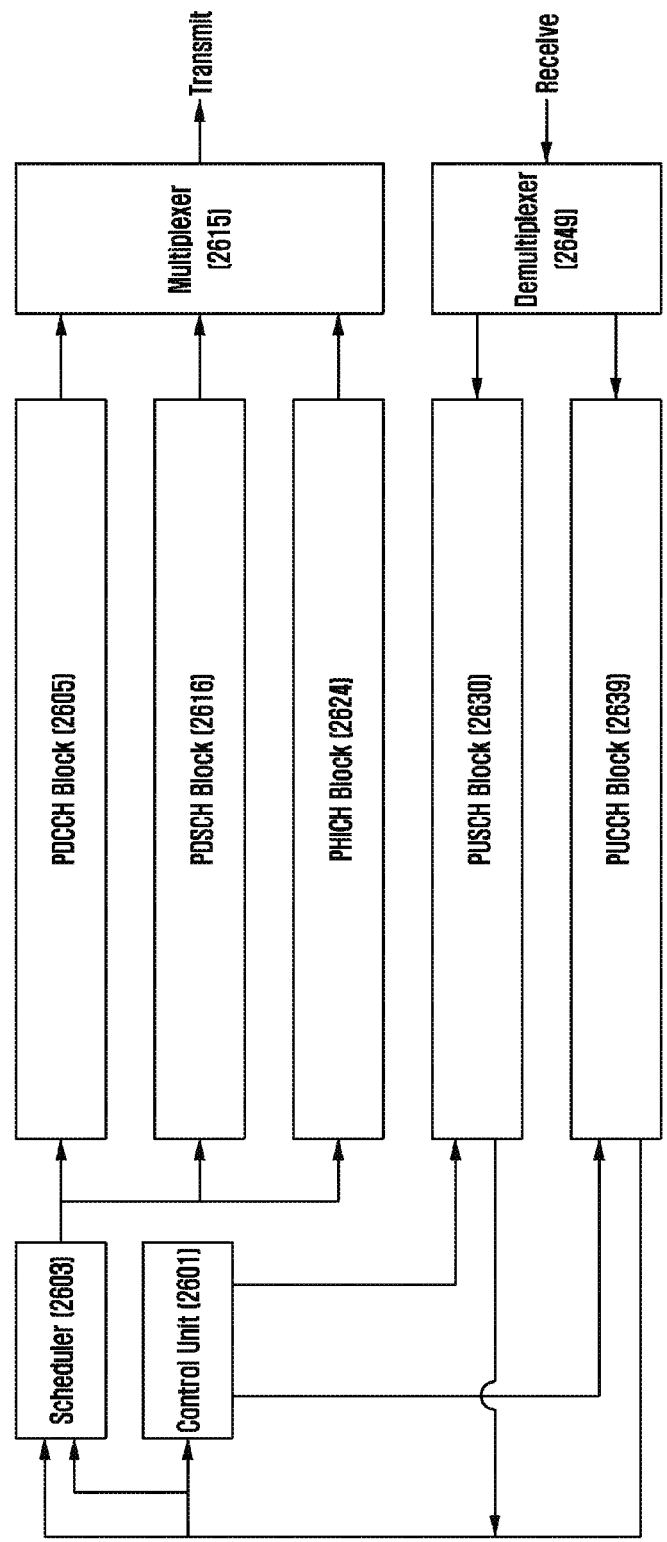
FIG. 26 is a diagram illustrating an eNB according to an embodiment of the present disclosure.

FIG. 26 is a diagram illustrating an eNB according to an embodiment of the present disclosure.

Referring to FIG. 26, the eNB includes a transmitting unit, a receiving unit, a control unit 2601, and a scheduler 2603. The transmitting unit is formed of a PDCCH block 2605, a PDSCH block 2616, a PHICH block 2624, and a multiplexer 2615. The receiving unit is formed of a PUSCH block 2630, a PUCCH block 2639, and a demultiplexer 2649. The control unit 2601 is configured to control downlink/uplink (DL/UL) HARQ-ACK transmission/reception timing and to control a cell to transmit control information on PUCCH. Here, DL/UL HARQ-ACK transmission/reception timing includes HARQ-ACK transmission timing on PUCCH regarding downlink data transmission on PDSCH, including an eNB operation for determining a cell to transmit HARQ-ACK on PUCCH according to this disclosure. Although a plurality of transmitting units and a plurality of receiving units (excepting the PUCCH block) may be used for transmission and reception at a plurality of cells, only a single transmitting unit and a single receiving unit are exemplarily shown for clarity.

The control unit 2601 controlling DL/UL HARQ-ACK transmission/reception timing and determining a cell to transmit control information on PUCCH adjusts, by referring to the amount of data to be transmitted to a UE, the amount of available resources in the system, and the like, a timing relation between respective physical channels with regard to the UE to be scheduled, and then notifies the control information to the scheduler 2603, the PDCCH block 2605, the PDSCH block 2616, the PHICH block 2624, the PUSCH block 2630, and the PUCCH block 2639. The above operation of the control unit 2601 follows the above-discussed method in various embodiments.

The PDCCH block 2605 forms control information under the control of the scheduler 2603, and this control information is multiplexed with other signals in the multiplexer 2615.

The PDSCH block 2616 creates data under the control of the scheduler 2603, and this data is multiplexed with other signals in the multiplexer 2615.

The PHICH block 2624 creates HARQ ACK/NACK regarding uplink data on PUSCH received from the UE under the control of the scheduler 2603. This HARQ ACK/NACK is multiplexed with other signals in the multiplexer 2615.

The above multiplexed signals are transmitted in the form of OFDM signals to UE.

The PUSCH block 2630 obtains data with regard to signals received from the UE. In addition, the PUSCH block 2630 adjusts DL HARQ ACK/NACK creation by notifying error about results of decoding data on PUSCH to the scheduler 2603. Further, by offering such error to the control unit 2601, the PUSCH block 2630 enables the control unit 2601 to adjust DL HARQ ACK/NACK transmission timing.

The PUCCH block 2639 obtains UL ACK/NACK or CQI from a signal received from the UE at a cell that transmits control information on PUCCH according to DL/UL HARQ-ACK transmission/reception timing. The obtained UL AACK/NACK or CQI is offered to the scheduler 2603 and then used for determining MCS (Modulation and Coding Scheme) and further determining whether to retransmit PDSCH. Additionally, the obtained UL ACK/NACK is offered to the control unit 2601 to adjust transmission timing of downlink data on PDSCH.

Figure 27:
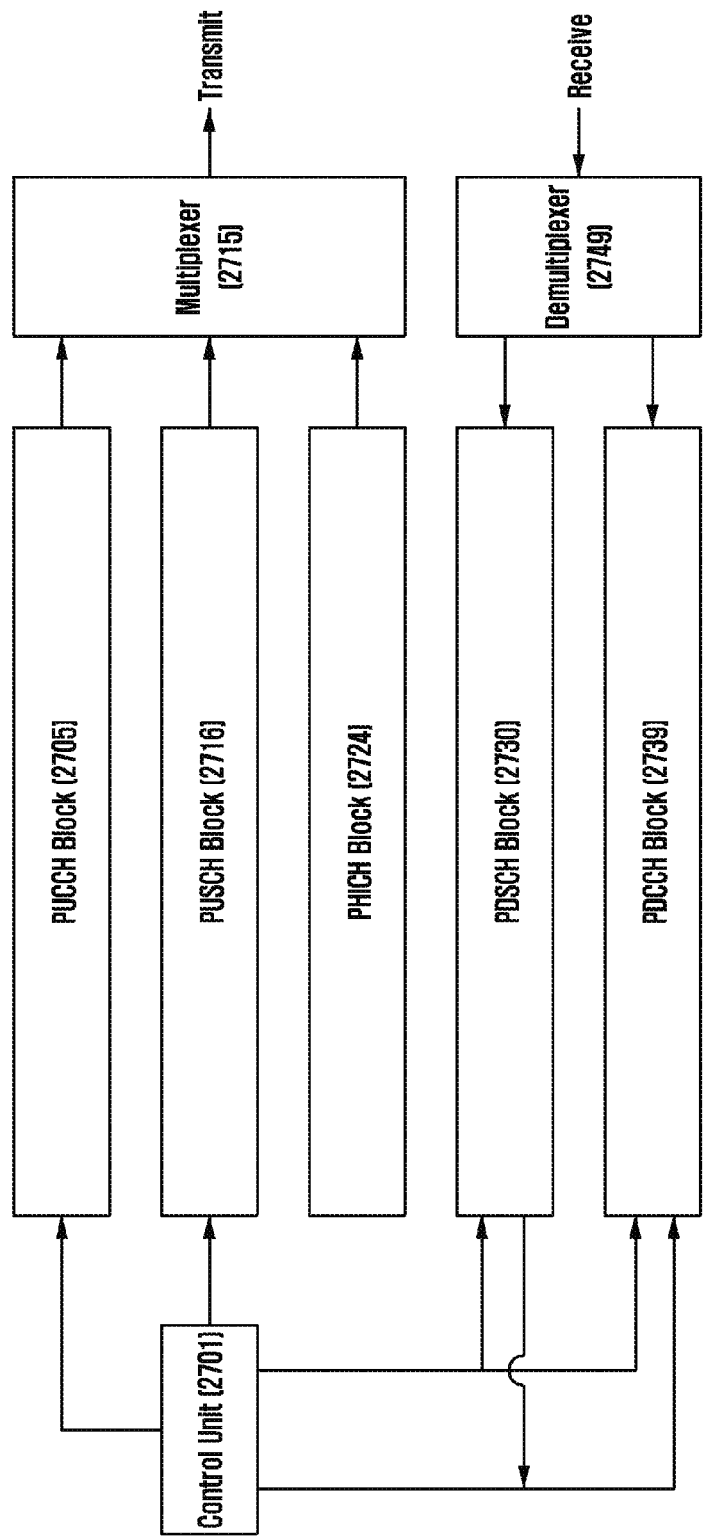
FIG. 27 is a diagram illustrating a UE according to an embodiment of the present disclosure.

FIG. 27 is a diagram illustrating a UE according to an embodiment of the present disclosure.

Referring to FIG. 27, the UE includes a transmitting unit, a receiving unit, and a control unit 2701. The transmitting unit is formed of a PUCCH block 2705, a PUSCH block 2716, and a multiplexer 2715. The receiving unit is formed of a PHICH block 2724, a PDSCH block 2730, a PDCCH block 2739, and a demultiplexer 2749. The control unit 2701 is configured to receive downlink data from eNBs and determine a cell to transmit control information by using PUCCH. Although a plurality of transmitting units and a plurality of receiving units (excepting the PUCCH block) may be used for transmission and reception at a plurality of cells, only a single transmitting unit and a single receiving unit are exemplarily shown for clarity.

The control unit 2701 determining a cell to transmit control information by using PUCCH and controlling the transmission of control information notifies, based on downlink control information received from eNBs, to the PUCCH block 2705, the PDSCH block 2730, and the PDCCH block 2739, how much downlink data will be received from which cell of which eNB at the time of self-scheduling or cross carrier scheduling. The above operation of the control unit 2701 follows the above-discussed method in various embodiments.

The PUCCH block 2705 forms HARQ ACK/NACK or CQI as uplink control information under the control of the control unit 2701 for controlling downlink data to be stored in a soft buffer. This HARQ ACK/NACK or CQI is multiplexed with other signals in the multiplexer 2715 and then transmitted at a cell for transmitting uplink control information.

The PUSCH block 2716 extracts data to be transmitted, and the extracted data is multiplexed with other signals in the multiplexer 2715.

The above multiplexed signals are transmitted in the form of SC-FDMA (Single Carrier Frequency Division Multiple Access) signals to the eNB.

The PHICH block 2724 separates, through the demultiplexer 2749, an HARQ-ACK signal from a signal received from the eNB according to DL/UL HARQ-ACK transmission/reception timing, and then obtains HARQ ACK/NACK regarding uplink data.

The PDSCH block 2730 separates a downlink data signal through the demultiplexer 2749 from a signal received from the eNB, and obtains downlink data. In addition, the PDSCH block 2730 adjusts UL HARQ ACK/NACK creation by notifying error about results of decoding such data to the PUCCH block 2705. Further, by offering such error to the control unit 2701, the PDSCH block 2730 enables the control unit 2701 to adjust UL HARQ ACK/NACK transmission timing.

The PDCCH block 2739 separates a downlink control information signal through the demultiplexer 2749, performs decoding of DCI format, and then obtains downlink control information from the decoded signal.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting and receiving a signal at an evolved Node B (eNB) of a mobile communication system, the method comprising:

transmitting a first message to a first mobile management entity (MME);

receiving a reroute command message based on the first message from the first MME, the reroute command message comprising the first message, at least one MME identifier, and a user equipment (UE) identifier, the at least one MME identifier and the UE identifier being a globally unique MME identity (MMEGI) and an additional globally unique temporary UE identity (GUTI), respectively;

determining, based on the MMEGI and the additional GUTI contained in the reroute command message, a second MME; and transmitting a second message to the second MME based on the reroute command message.

2. The method of claim 1, further comprising:

receiving the first message from a UE.

3. The method of claim 2, wherein the first message transmitted from the UE to the eNB is contained in a Radio Resource Control (RRC) connection setup complete message, and wherein the first message transmitted from the eNB to the first MME is contained in an initial UE message.

4. The method of claim 1, wherein the first message comprises an attach request message or a tracking area update request message, and wherein the second message comprises an initial UE message.

5. A method for transmitting and receiving a signal at a first mobile management entity (MME) of a mobile communication system, the method comprising:

receiving a first message from an evolved Node B (eNB); and transmitting a reroute command message based on the first message to the eNB, the reroute command message comprising the first message, at least one MME identifier, and a user equipment (UE) identifier, the at least one MME identifier and the UE identifier being a globally unique MME identity (MMEGI) and an additional globally unique temporary UE identity (GUTI), respectively, wherein the eNB is configured to:

determine, based on the MMEGI and the additional GUTI contained in the reroute command message, a second MME, and transmit, based on the reroute command message, a second message to the second MME.

6. The method of claim 5, wherein the eNB receives the first message from a UE.

7. The method of claim 6, wherein the first message transmitted from the UE to the eNB is contained in a Radio Resource Control (RRC) connection setup complete message, and wherein the first message transmitted from the eNB to the first MME is contained in an initial UE message.

8. The method of claim 5, wherein the first message comprises an attach request message or a tracking area update request message, and wherein the second message comprises an initial UE message.

9. An evolved Node B (eNB) for transmitting and receiving a signal in a mobile communication system, the eNB comprising:

a transceiver configured to transmit and receive a signal; and a processor configured to control the transceiver to:

transmit a first message to a first mobile management entity (MME), receive a reroute command message based on the first message from the first MME, the reroute command message comprising the first message, at least one MME identifier, and a user equipment (UE) identifier, the at least one MME identifier and the UE identifier being a globally unique MME identity (MMEGI) and an additional globally unique temporary UE identity (GUTI), respectively, determine, based on the MMEGI and the additional GUTI contained in the reroute command message, a second MME, and transmit a second message to the second MME based on the reroute command message.

10. The eNB of claim 9, wherein the processor is further configured to control the transceiver to receive the first message from a UE.

11. The eNB of claim 10, wherein the first message transmitted from the UE to the eNB is contained in a Radio Resource Control (RRC) connection setup complete message, and wherein the first message transmitted from the eNB to the first MME is contained in an initial UE message.

12. The eNB of claim 9, wherein the first message comprises an attach request message or a tracking area update request message, and wherein the second message comprises an initial UE message.

13. A first mobile management entity (MME) for transmitting and receiving a signal in a mobile communication system, the first MME comprising:

a transceiver configured to transmit and receive a signal; and a processor configured to control the transceiver to:

receive a first message from an evolved Node B (eNB), and transmit a reroute command message based on the first message to the eNB, the reroute command message comprising the first message, at least one MME identifier, and a user equipment (UE) identifier, the at least one MME identifier and the UE identifier being a globally unique MME identity (MMEGI) and an additional globally unique temporary UE identity (GUTI), respectively, wherein the eNB is configured to:

determine, based on the MMEGI and the additional GUTI contained in the reroute command message, a second MME, and transmit, based on the reroute command message, a second message to the second MME.

14. The first MME of claim 13, wherein the eNB is further configured to receive the first message from a UE.

15. The first MME of claim 14, wherein the first message transmitted from the UE to the eNB is contained in a Radio Resource Control (RRC) connection setup complete message, and wherein the first message transmitted from the eNB to the first MME is contained in an initial UE message.

16. The first MME of claim 13, wherein the first message comprises an attach request message or a tracking area update request message, and wherein the second message comprises an initial UE message.

17. The method of claim 1, wherein the reroute command message further comprises an MME group identifier.

18. The method of claim 5, wherein the reroute command message further comprises an MME group identifier.

19. The eNB of claim 9, wherein the reroute command message further comprises an MME group identifier.

20. The first MME of claim 13, wherein the reroute command message further comprises an MME group identifier.

* * * * *